United States Patent
Choi et al.

(10) Patent No.: US 12,354,803 B2
(45) Date of Patent: Jul. 8, 2025

(54) MULTILAYER ELECTRONIC COMPONENT HAVING STRUCTURE FOR IMPROVED ADHESION FORCE AND MOISTURE PROTECTION

(71) Applicant: SAMSUNG ELECTRO-MECHANICS CO., LTD., Suwon-si (KR)

(72) Inventors: Hyung Jong Choi, Suwon-si (KR); Yoo Jeong Lee, Suwon-si (KR); Chung Yeol Lee, Suwon-si (KR); Kwang Yeun Won, Suwon-si (KR); So Jung An, Suwon-si (KR); Kang Ha Lee, Suwon-si (KR); Woo Kyung Sung, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 176 days.

(21) Appl. No.: 17/972,722

(22) Filed: Oct. 25, 2022

(65) Prior Publication Data

US 2023/0223195 A1 Jul. 13, 2023

(30) Foreign Application Priority Data

Jan. 7, 2022 (KR) .......................... 10-2022-0002964

(51) Int. Cl.
*H01G 4/232* (2006.01)
*H01G 4/012* (2006.01)
(Continued)

(52) U.S. Cl.
CPC ............ *H01G 4/2325* (2013.01); *H01G 4/012* (2013.01); *H01G 4/224* (2013.01); *H01G 4/30* (2013.01)

(58) Field of Classification Search
CPC ........ H01G 4/2325; H01G 4/012; H01G 4/224; H01G 4/30; H01G 2/065; H01G 4/1227;
(Continued)

(56) References Cited

U.S. PATENT DOCUMENTS

2008/0297977 A1* 12/2008 Togashi ................. H01G 4/232
361/306.3
2010/0157506 A1* 6/2010 Togashi ................... H01G 4/30
361/303

(Continued)

FOREIGN PATENT DOCUMENTS

| JP | 2016-178219 A | 10/2016 |
| KR | 10-2014-0053562 A | 5/2014 |
| KR | 10-2018-0057105 A | 5/2018 |

*Primary Examiner* — Nathan Milakovich
*Assistant Examiner* — Daniel M Dubuisson
(74) *Attorney, Agent, or Firm* — Morgan, Lewis & Bockius LLP

(57) ABSTRACT

A multilayer electronic component includes: a body including a dielectric layer and internal electrodes alternately disposed while having the dielectric layer interposed therebetween; a first external electrode including a first connection portion and first and third band portions extending from ends of the first connection portion; a second external electrode including a second connection portion and second and fourth band portions extending from the second connection portion; an insulating layer disposed on the first and second connection portions and covering a top surface of the body and the third and fourth band portions; first and second plating layers disposed on the first and second band portions, respectively. An end of the plating layer and an end of the insulating layer contact with each other, and a thickness of
(Continued)

the end of the plating layer and a thickness of the end of the insulating layer decreases toward the contact point.

31 Claims, 25 Drawing Sheets

(51) Int. Cl.
  *H01G 4/224* (2006.01)
  *H01G 4/30* (2006.01)
(58) Field of Classification Search
  CPC ...... H01G 4/002; H01G 4/005; H01G 4/1209; Y02E 60/13
  See application file for complete search history.

(56) References Cited

U.S. PATENT DOCUMENTS

| | | |
|---|---|---|
| 2014/0116766 A1 | 5/2014 | Jeon et al. |
| 2015/0084481 A1* | 3/2015 | Mori ...................... H01G 4/252 29/829 |
| 2015/0084487 A1* | 3/2015 | Mori ...................... H01G 4/248 336/200 |
| 2016/0276104 A1 | 9/2016 | Nishisaka et al. |
| 2017/0271081 A1* | 9/2017 | Maki ...................... H01G 4/248 |
| 2017/0278633 A1* | 9/2017 | Kato ..................... H01G 4/2325 |
| 2018/0068795 A1* | 3/2018 | Park ...................... H01G 4/2325 |
| 2018/0075970 A1* | 3/2018 | Sato ........................ H01G 4/12 |
| 2018/0144864 A1 | 5/2018 | Park et al. |
| 2018/0160541 A1* | 6/2018 | Fujita .................... H01G 4/248 |
| 2019/0066923 A1* | 2/2019 | Jung ...................... H01G 4/008 |
| 2019/0096583 A1* | 3/2019 | Sasaki ................... H01G 4/232 |
| 2020/0066444 A1* | 2/2020 | Yang ..................... H01G 4/232 |
| 2020/0066447 A1* | 2/2020 | Murai .................... H01G 4/30 |
| 2020/0126725 A1* | 4/2020 | Cho ....................... H01G 4/30 |
| 2020/0168400 A1* | 5/2020 | Nakamoto ............. H01G 4/30 |
| 2021/0020377 A1* | 1/2021 | Kurosu ................... H01G 4/12 |
| 2021/0183581 A1* | 6/2021 | Nakano ................ H01G 4/1218 |
| 2021/0375549 A1* | 12/2021 | Okada ................... H05K 1/181 |
| 2022/0301778 A1* | 9/2022 | Suga ..................... H05K 1/181 |
| 2022/0301779 A1* | 9/2022 | Take ..................... H01G 4/2325 |
| 2022/0301781 A1* | 9/2022 | Takei ..................... H01G 4/30 |

* cited by examiner

P1

P1'

MULTILAYER ELECTRONIC COMPONENT HAVING STRUCTURE FOR IMPROVED ADHESION FORCE AND MOISTURE PROTECTION

CROSS-REFERENCE TO RELATED APPLICATION(S)

This application claims benefit of priority to Korean Patent Application No. 10-2022-0002964 filed on Jan. 7, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multi-layered ceramic capacitor (MLCC), one of multilayer electronic components, may be a chip-type condenser which is mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The MLCC may be used as a component of any of various electronic apparatuses because the MLCC is small, has high capacity, and is easily mounted. There has been increasing demand for the MLCC to have a smaller size and higher capacitance as each of various electronic devices such as a computer and a mobile device has a smaller size and higher output.

In addition, in recent years, the MCLL has also been required to have high reliability to be used for a vehicle or an infotainment system in accordance with an increased interest in an electrical component for a vehicle in a related field.

In this regard, Patent Document 1 illustrates a multilayer electronic component mounted on a board by using a solder, the multilayer electronic component including a glass layer positioned directly on a sintered body layer positioned on each end surface of the body to be extended in a direction perpendicular to one main surface and side surfaces of the body, thereby forming a portion of a surface of an external electrode, and a plating layer positioned on a surface of the external electrode, which is not covered by the glass layer in order to suppress cracking occurring from the body due to tensile stress caused by thermal contraction of a solder fillet.

In order to have the smaller size and the higher capacitance, it may be necessary for the MLCC to have the increased number of stacks by including internal electrodes and dielectric layers made thinner, and to have increased effective volume fractions required to implement the capacitance by allowing a portion unrelated to capacitance formation to have a minimum volume.

In addition, it may be necessary to minimize a space in which the MLCC is mounted in order to mount as many components as possible in a limited area of a board.

In addition, the MLCC having the smaller size and the higher capacitance may have a margin made thinner, and thus be vulnerable to penetration of external moisture or penetration of a plating solution, thus having lower reliability. Accordingly, required is a need for a method for protecting the MLCC from the penetration of external moisture or the penetration of a plating solution.

SUMMARY

An aspect of the present disclosure may provide a multilayer electronic component having improved capacitance per unit volume.

Another aspect of the present disclosure may provide a multilayer electronic component having higher reliability.

Another aspect of the present disclosure may provide a multilayer electronic component which may be mounted in a minimum space.

Another aspect of the present disclosure may provide a multilayer electronic component which may prevent a reduction in bonding force at a portion at which a plating layer and a glass layer are in contact with each other when including the glass layer forming a portion of a surface of its external electrode, and the plating layer disposed on a surface of the external electrode, which is not covered by the glass layer.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion onto a portion of the first surface, and a third band portion extending from the first connection portion onto a portion of the second surface; a second external electrode including a second connection portion disposed on the fourth surface, a second band portion extending from the second connection portion onto a portion of the first surface, and a fourth band portion extending from the second connection portion onto a portion of the second surface; an insulating layer disposed on the first and second connection portions, and covering the second surface and the third and fourth band portions; a first plating layer disposed on the first band portion; and a second plating layer disposed on the second band portion, wherein an end of the first or second plating layer and an end of the insulating layer are in contact with each other at their contact point on the first or second external electrode, and the end of the first or second plating layer and the end of the insulating layer each have a smaller thickness toward the contact point.

A multilayer electronic component comprising: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion onto a portion of the first surface; a second external electrode including a second connection portion disposed on the fourth surface and a second band portion extending from the second connection portion onto a portion of the first surface; an insulating layer disposed on the second surface, and extended to the first and second connection portions; a first plating layer disposed on the first band portion; and a second plating layer disposed on the second band portion, wherein an end of the first or second plating layer and an end of the insulating layer are in contact with each other at their contact point on the first or second external electrode, and the end of the first or second plating layer and the end of the insulating layer each have a thickness smaller toward the contact point.

A multilayer electronic component comprising: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion onto a portion of the first surface, and a first corner portion extending from the first connection portion onto a corner connecting the second and third surfaces to each other; a second external electrode including a second connection portion disposed on the fourth surface, a second band portion extending from the second connection portion onto a portion of the first surface, and a second corner portion extending from the second connection portion onto a corner connecting the second and fourth surfaces to each other; an insulating layer disposed on the first and second connection portions, and covering the second surface and the first and second corner portions; a first plating layer disposed on the first band portion; and a second plating layer disposed on the second band portion, wherein $B3 \leq G1$ and $B4 \leq G2$ when B3 indicates an average size of the first corner portion in the second direction, measured from an extension line of the third surface to an end of the corner portion, B4 indicates an average size of the second corner portion in the second direction, measured from an extension line of the fourth surface to an end of the corner portion, G1 indicates an average size in the second direction of a region where the third surface and the second internal electrode are spaced apart from each other, and G2 indicates an average size in the second direction of a region where the fourth surface and the first internal electrode are spaced apart from each other, and an end of the first or second plating layer and an end of the insulating layer are in contact with each other at their contact point on the first or second external electrode, and the end of the first or second plating layer and the end of the insulating layer each have a thickness smaller toward the contact point.

A multilayer electronic component comprising: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface, and a first band electrode disposed on the first surface and connected to the first connection electrode; a second external electrode including a second connection electrode disposed on the fourth surface, and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode, an end of the first or second plating layer and an end of the first or second insulating layer are in contact with each other at their contact point on the first or second external electrode, and the end of the first or second plating layer and the end of the first or second insulating layer each have a thickness smaller toward the contact point.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
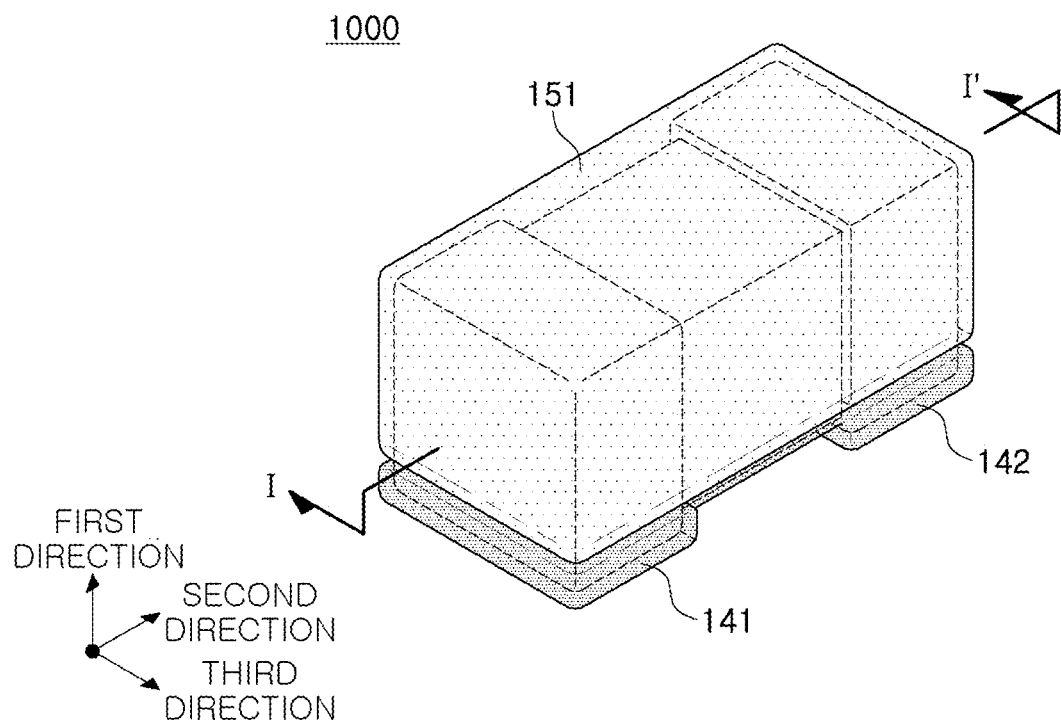
FIG. 1 is a perspective view schematically illustrating a multilayer electronic component according to an exemplary embodiment of the present disclosure.

Hereinafter, exemplary embodiments of the present disclosure will now be described in detail with reference to the accompanying drawings.

In the drawings, a first direction may indicate a stack direction or thickness (T) direction, a second direction may indicate a length (L) direction, and a third direction may indicate a width (W) direction.

Figure 2:
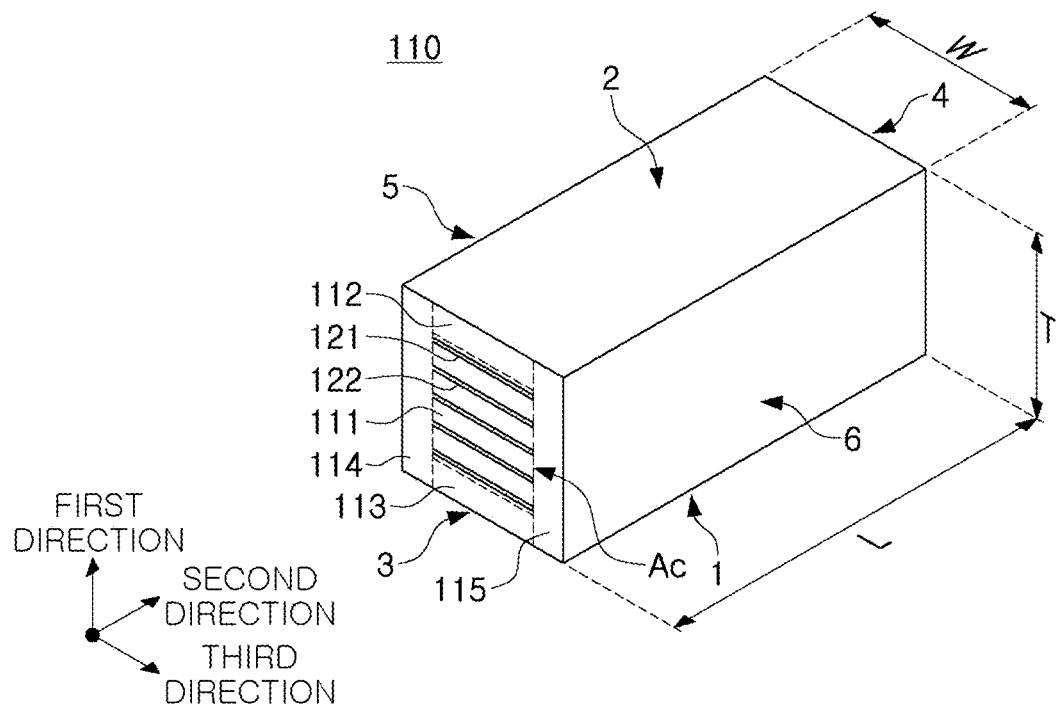
FIG. 2 is a perspective view schematically illustrating a body of the multilayer electronic component of FIG. 1.
Figure 3:
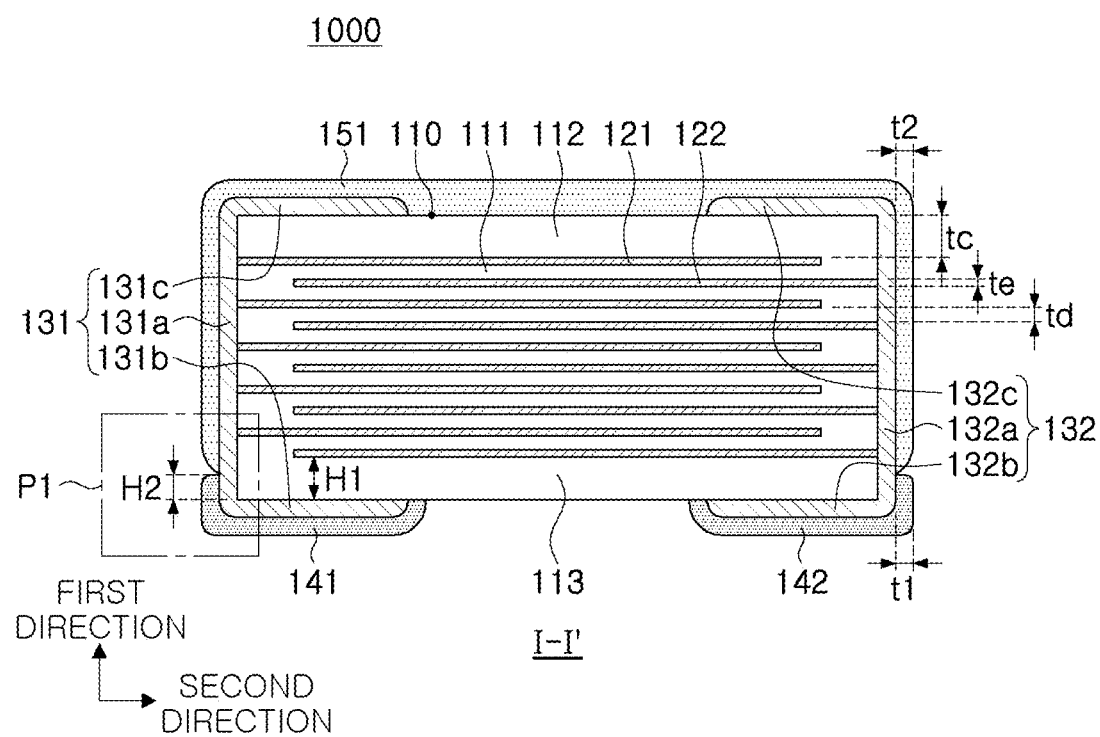
FIG. 3 is a cross-sectional view taken along line I-I' of FIG. 1.
Figure 4:
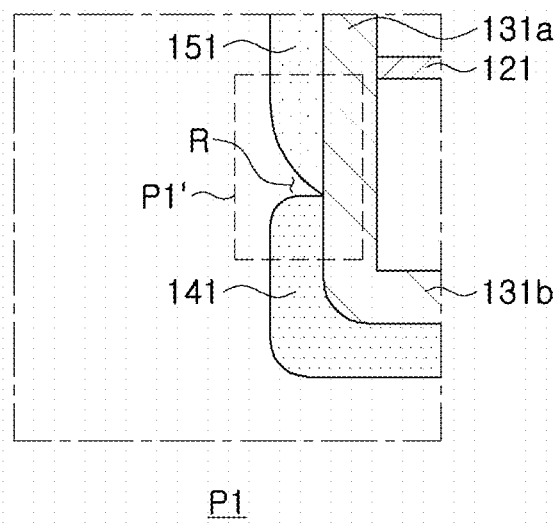
FIG. 4 is an enlarged view of region P1 of FIG. 3.
Figure 5:
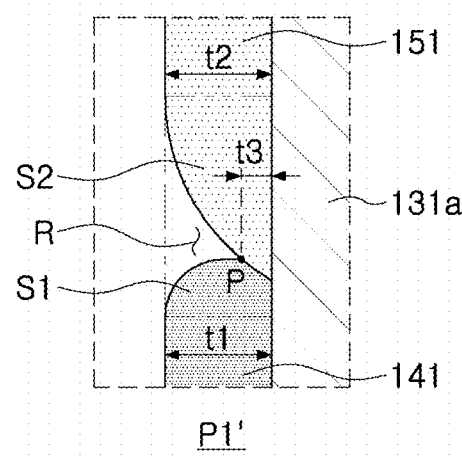
FIG. 5 is an enlarged view of region P1' of FIG. 4.
Figure 6:
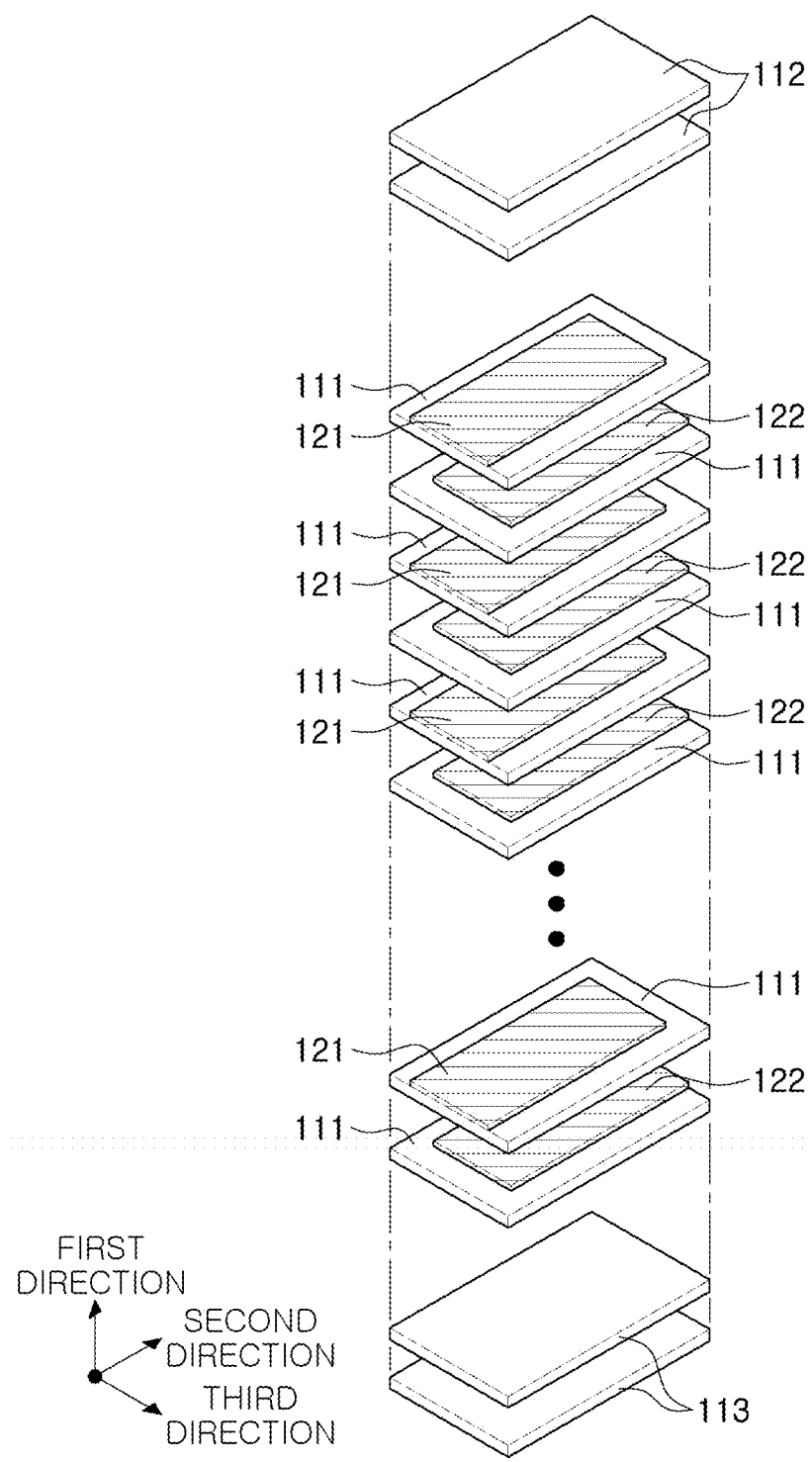
FIG. 6 is an exploded perspective view schematically illustrating an exploded body of FIG. 2.
Figure 7:
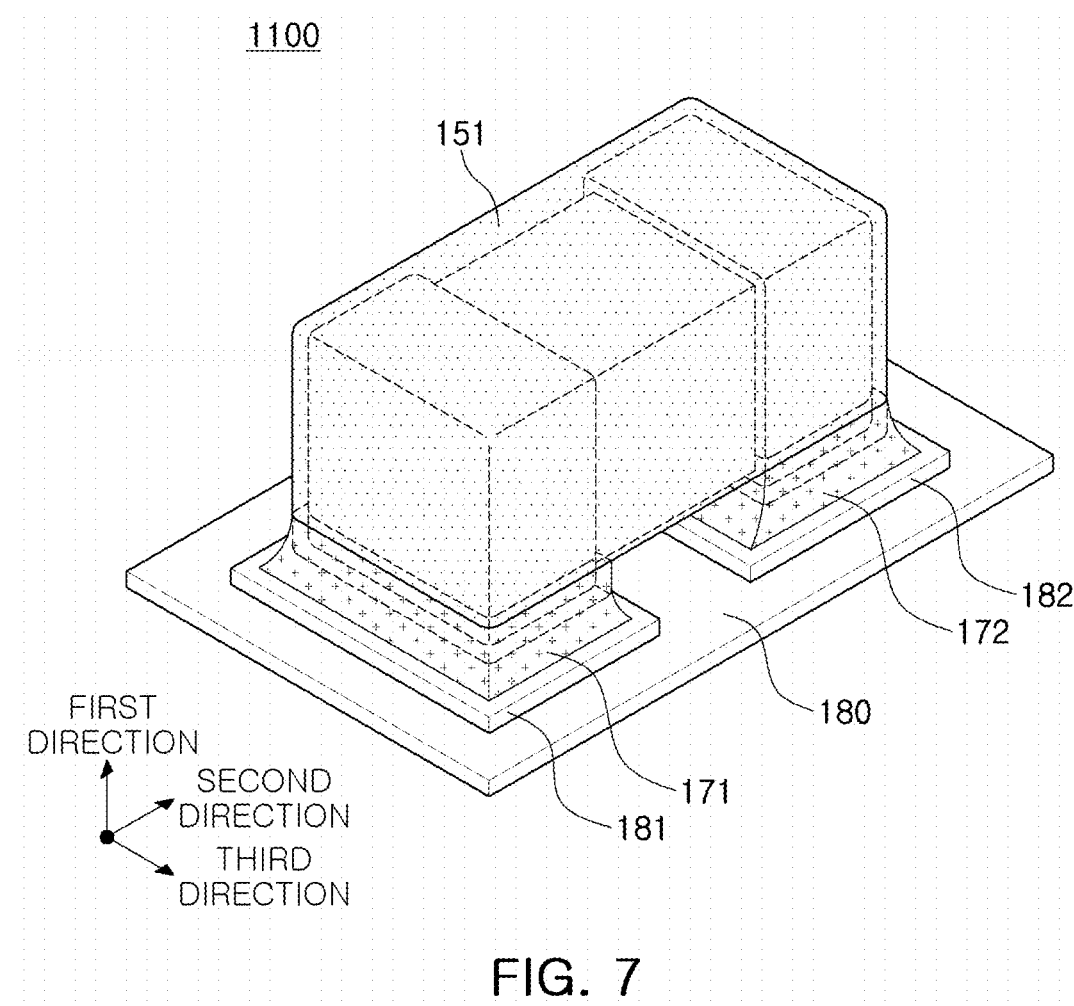
FIG. 7 is a perspective view illustrating a body of the multilayer electronic component of FIG. 1.

FIG. 1 is a perspective view schematically illustrating a multilayer electronic component according to an exemplary embodiment of the present disclosure; FIG. 2 is a perspective view schematically illustrating a body of the multilayer electronic component of FIG. 1; FIG. 3 is a cross-sectional view taken along line I-I' of FIG. 1; FIG. 4 is an enlarged view of region P1 of FIG. 3; FIG. 5 is an enlarged view of region P1' of FIG. 4; FIG. 6 is an exploded perspective view schematically illustrating an exploded body of FIG. 2; and FIG. 7 is a perspective view illustrating a body of the multilayer electronic component of FIG. 1.

Hereinafter, a multilayer ceramic capacitor 1000 according to an exemplary embodiment of the present disclosure is described with reference to FIGS. 1 through 7.

The multilayer electronic component 1000 according to an exemplary embodiment of the present disclosure may include: a body 110 including a dielectric layer 111 and first and second internal electrodes 121 and 122 alternately disposed while having the dielectric layer interposed therebetween, and including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 131 including a first connection portion 131a disposed on the third surface, a first band portion 131b extending from the first connection portion onto a portion of the first surface, and a third band portion 131c extending from the first connection portion onto a portion of the second surface; a second external electrode 132 including a second connection portion 132a disposed on the fourth surface, a second band portion 132b extending from the second connection portion onto a portion of the first surface, and a fourth band portion 132c extending from the second connection portion onto a portion of the second surface; an insulating layer 151 disposed on the first and second connection portions, and covering the second surface and the third and fourth band portions 131c and 132c; a first plating layer 141 disposed on the first band portion 131b; and a second plating layer 142 disposed on the second band portion 132b, wherein an end S1 of the first or second plating layer 141 and 142 and an end of the insulating layer 151 are in contact with each other at their contact point on the first and second external electrodes 131 and 132, and the ends of the insulating layer 151 and the plating layer 141 or 142 may have a smaller thickness toward the contact point.

The body 110 may include the dielectric layer 111 and the internal electrodes 121 and 122, which are alternately stacked on each other.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powders included in the body 110 in a sintering process, the body 110 may have substantially the hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an exemplary embodiment, the body 110 may have a 1-3 corner connecting the first and third surfaces to each other, a 1-4 corner connecting the first and fourth surfaces to each other, a 2-3 corner connecting the second and third surfaces to each other, and a 2-4 corner connecting the second surface and the fourth surface to each other, wherein the 1-3 corner and the 2-3 corner have a contracted shape toward a center of the body in the first direction as being closer to the third surface, and the 1-4 corner and the 2-4 corner have a contracted shape toward the center of the body in the first direction as being closer to the fourth surface.

Margin regions in which none of the internal electrodes 121 and 122 is disposed may overlap each other on the dielectric layer 111, and a step difference may thus occur due to thicknesses of the internal electrodes 121 and 122. Accordingly, the corners connecting the first surface and the third to sixth surfaces to each other and/or the corners connecting the second surface and the third to sixth surfaces to each other may be contracted toward the center of the body 110 in the first direction, based on the first surface or the second surface. Alternatively, due to a contraction phenomenon in the sintering process of the body, the corners connecting the first surface 1 and the third to sixth surfaces 3, 4, 5 and 6 to each other and/or the corners connecting the second surface 2 and the third to sixth surfaces 3, 4, 5 and 6 to each other may be contracted toward the center of the body 110 in the first direction, based on the first surface or the second surface. Alternatively, a separate rounding process may be performed to round the corners connecting respective surfaces of the body 110 to each other in order to prevent a chipping defect or the like, and the corners connecting the first and third to sixth surfaces to each other and/or the corners connecting the second surface and the third to sixth surfaces to each other may thus each have a round shape.

The corners may include the 1-3 corner connecting the first surface and the third surface to each other, the 1-4 corner connecting the first surface and the fourth surface to each other, the 2-3 corner connecting the second surface and the third surface to each other, and the 2-4 corner connecting the second surface and the fourth surface to each other. In addition, the corners may include a 1-5 corner connecting the first surface and the fifth surface to each other, a 1-6 corner connecting the first surface and the sixth surface to each other, a 2-5 corner connecting the second surface and the fifth surface to each other, and a 2-6 corner connecting the second surface and the sixth surface to each other. The first to sixth surfaces of the body 110 may generally be flat surfaces, and non-flat regions may be the corners. Hereinafter, an extension line of each surface may indicate a line extended based on a flat portion of each surface.

Here, a region of the external electrode 131 or 132, disposed on the corner of the body 110 may be a corner portion, a region thereof disposed on the third or fourth surface of the body 110 may be the connection portion, and a region thereof disposed on the first or second surface of the body 110 may be the band portion.

Meanwhile, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both sides of a capacitance formation portion Ac in the third direction (i.e., width direction) to form margin portions 114 and 115. In this case, the corner connecting the first surface and the fifth or sixth surface to each other and the corner connecting the second surface and the fifth or sixth surface to each other may not be contracted.

The plurality of dielectric layers 111 included in the body 110 may be in a sintered state, and adjacent dielectric layers 111 may be integrated with each other so that boundaries therebetween are not readily apparent without using a scanning electron microscope (SEM).

According to an exemplary embodiment of the present disclosure, a raw material of the dielectric layer 111 is not particularly limited as long as sufficient capacitance is obtained from the raw material. For example, the dielectric layer may use a material such as a barium titanate-based material, a lead composite perovskite-based material or a strontium titanate-based material. The barium titanate-based material may include barium titanate ($BaTiO_3$)-based ceramic powders, and the ceramic powders may be, for example, $BaTiO_3$ or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), in which calcium (Ca), zirconium (Zr) or the like is partially dissolved in $BaTiO_3$.

In addition, the raw material of the dielectric layer 111 may be prepared by adding various ceramic additives, organic solvents, binders, dispersing agents and the like, to the powders such as the barium titanate ($BaTiO_3$) powders, based on an object of the present disclosure.

Meanwhile, an average thickness td of the dielectric layer 111 is not particularly limited.

However, the multilayer electronic component may generally have lower reliability when the dielectric layer has a low thickness of less than 0.6 µm, in particular, when the dielectric layer has a thickness of 0.35 µm or less.

The multilayer electronic component according to an exemplary embodiment of the present disclosure may include the insulating layer 151 disposed on the connection portion of the external electrode, and the plating layer 141 or 142 disposed on the band portion of the external electrode to prevent penetration of external moisture, penetration of a plating solution or the like, thereby having higher reliability and thus ensuring excellent reliability even when the dielectric layer 111 has the average thickness of 0.35 µm or less.

Therefore, when the dielectric layer 111 has the average thickness of 0.35 µm or less, the multilayer electronic component according to the present disclosure may reveal more significantly improved reliability.

The average thickness td of the dielectric layer 111 may indicate an average thickness of the dielectric layer 111 disposed between the first and second internal electrodes 121 and 122.

The average thickness of the dielectric layer 111 may be measured by scanning an image of a cross section of the body 110 in a length-thickness (L-T) direction by using the scanning electron microscope (SEM) with a magnification of 10,000. In more detail, an average value of the dielectric layer may be measured by measuring a thickness of one dielectric layer at thirty equally spaced points in the length direction in the scanned image. The thirty equally spaced points may be designated in the capacitance formation portion Ac. In addition, it is possible to obtain an average thickness of the dielectric layer further generalized when the average thickness of ten or more dielectric layers is measured.

The body 110 may further include the capacitance formation portion Ac disposed in the body 110, and forming capacitance of the capacitor by including the first and second internal electrodes 121 and 122 disposed to oppose each other while having the dielectric layer 111 interposed therebetween, and include cover portions 112 and 113 disposed on the upper and lower surfaces of the capacitance formation portion Ac in the first direction.

In addition, the capacitance formation portion Ac may be a portion contributing to forming the capacitance of the capacitor, and formed by repeatedly stacking the plurality of first and second internal electrodes 121 and 122 on each other while having the dielectric layer 111 interposed therebetween.

The cover portions 112 and 113 may include the upper cover portion 112 disposed on the upper surface of the capacitance formation portion Ac in the first direction and the lower cover portion 113 disposed on the lower surface of the capacitance formation portion Ac in the first direction.

The upper cover portion 112 and the lower cover portion 113 may be formed by stacking one dielectric layer or two or more dielectric layers on the upper and lower surfaces of the capacitance formation portion Ac in the thickness direction, respectively, and may basically serve to prevent damage to the internal electrodes, caused by physical or chemical stress.

The upper and lower cover portions 112 and 113 may include no internal electrode and may include the same material as the dielectric layer 111.

That is, the upper and lower cover portions 112 and 113 may include a ceramic material such as a barium titanate ($BaTiO_3$)-based ceramic material.

Meanwhile, an average thickness of the cover portion 112 or 113 is not particularly limited. However, 15 μm or less may be an average thickness tc of the cover portion 112 or 113 in order for the multilayer electronic component to more easily have a smaller size and higher capacitance. In addition, the multilayer electronic component according to an exemplary embodiment of the present disclosure may include the insulating layer disposed on the connection portion of the external electrode, and the plating layer 141 or 142 disposed on the band portion of the external electrode to prevent the penetration of the external moisture, the penetration of the plating solution or the like, thereby having the higher reliability and thus ensuring the excellent reliability even when the cover portion 112 or 113 has an average thickness of 15 μm or less.

The average thickness tc of the cover portion 112 or 113 may indicate its size in the first direction, and may have a value obtained by averaging the sizes of the cover portions 112 and 113 in the first direction, measured at five equally spaced points on upper and lower surfaces of the capacitance formation portion Ac.

In addition, the margin portions 114 and 115 may each be disposed on a side surface of the capacitance formation portion Ac.

The margin portions 114 and 115 may be the first margin portion 114 disposed on the fifth surface 5 of the body 110 and the second margin portion 115 disposed on the sixth surface 6 of the body 110. That is, the margin portion 114 or 115 may be disposed on an end surface of the body 110 in the width direction.

As shown in FIG. 3, the margin portions 114 and 115 may each indicate a region between either end of the first and second internal electrodes 121 and 122 and a boundary surface of the body 110, based on a cross section of the body 110 cut in a width-thickness (W-T) direction.

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except its portion at which the margin portion is to be positioned.

Alternatively, in order to suppress the step difference occurring due to the internal electrode 121 or 122, the margin portion 114 or 115 may be formed by stacking the internal electrodes on each other, then cutting the internal electrodes to be exposed to the fifth and sixth surfaces 5 and 6 of the body, and then stacking one dielectric layer or two or more dielectric layers on both the sides of the capacitance formation portion Ac in the third direction (i.e., width direction).

Meanwhile, a width of the margin portion 114 or 115 is not particularly limited. However, 15 μm or less may be the average width of the margin portion 114 or 115 in order for the multilayer electronic component to more easily have the smaller size and the higher capacitance. In addition, the multilayer electronic component according to an exemplary embodiment of the present disclosure may include the insulating layer disposed on the connection portion of the external electrode, and the plating layer 141 or 142 disposed on the band portion of the external electrode to prevent the penetration of the external moisture, the penetration of the plating solution or the like, thereby having the higher reliability and thus ensuring the excellent reliability even when the margin portion 114 or 115 has an average width of 15 μm or less.

The average width of the margin portion 114 or 115 may indicate its size in the third direction, and may have a value obtained by averaging the sizes of the margin portions 114 and 115 in the third direction, measured at five equally spaced points on the side of the capacitance formation portion Ac.

The internal electrodes 121 and 122 may be alternately stacked on each other while having the dielectric layer 111 interposed therebetween.

The internal electrodes 121 and 122 may be the first internal electrode 121 and the second internal electrode 122. The first and second internal electrodes 121 and 122 may be alternately disposed to oppose each other while having the dielectric layer 111, included in the body 110, interposed therebetween, and may respectively be exposed to the third and fourth surfaces 3 and 4 of the body 110.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Accordingly, the first internal electrode 121 may be spaced apart from the fourth surface 4 by a predetermined distance, and the second internal electrode 122 may be spaced apart from the third surface 3 by the predetermined distance.

Here, the first and second internal electrodes 121 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed on each other and then sintering the same.

The material for forming the internal electrodes 121 and 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed by printing, on the ceramic green sheet, a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof. A method of printing the conductive paste for the internal electrodes may be a screen printing method, the gravure printing method or the like, and the present disclosure is not limited thereto.

Meanwhile, an average thickness to of the internal electrode 121 or 122 is not particularly limited.

However, the multilayer electronic component may generally have lower reliability when the internal electrode has a low thickness of less than 0.6 µm, in particular, when the internal electrode has a thickness of 0.35 µm or less.

The multilayer electronic component according to an exemplary embodiment of the present disclosure may include the insulating layer disposed on the connection portion of the external electrode, and the plating layer 141 or 142 disposed on the band portion of the external electrode to prevent the penetration of the external moisture, the penetration of the plating solution or the like, thereby having the higher reliability and thus ensuring the excellent reliability even when the internal electrode 121 or 122 has the average thickness of 0.35 µm or less.

Therefore, when the internal electrode 121 or 122 has the average thickness of 0.35 µm or less, the multilayer ceramic electronic component according to the present disclosure may have the more remarkably improved reliability, and may thus more easily have the smaller size and the higher capacitance.

The average thickness to of the internal electrode 121 or 122 may indicate the average thickness of the internal electrode 121 or 122.

The average thickness of the internal electrode 121 or 122 may be measured by scanning an image of the cross section of the body 110 in the length-thickness (L-T) direction by using the scanning electron microscope (SEM) with a magnification of 10,000. In more detail, the average value of the internal electrode may be measured by measuring a thickness of one internal electrode at thirty equally spaced points in the length direction in the scanned image. The thirty equally spaced points may be designated in the capacitance formation portion Ac. In addition, it is possible to obtain the more general average thickness of the internal electrode when measuring an average value thereof by extending a measurement target of the average value to ten internal electrodes.

The external electrodes 131 and 132 may respectively be disposed on the third surface 3 and fourth surface 4 of the body 110. The external electrodes 131 and 132 may be the first and second external electrodes 131 and 132 respectively disposed on the third and fourth surfaces 3 and 4 of the body 110, and respectively connected to the first and second internal electrodes 121 and 122.

The external electrodes 131 and 132 may be the first external electrode 131 including the first connection portion 131a disposed on the third surface and the first band portion 131b extending from the first connection portion onto a portion of the first surface, and the second external electrode 132 including the second connection portion 132a disposed on the fourth surface and the second band portion 132b extending from the second connection portion onto a portion of the first surface. The first connection portion 131a may be connected to the first internal electrode 121 on the third surface, and the second connection portion 132a may be connected to the second internal electrode 122 on the fourth surface.

In addition, the first external electrode 131 may include the third band portion 131c extended from the first connection portion 131a to a portion of the second surface, and the second external electrode 132 may include the fourth band portion 132c extended from the second connection portion 132a to a portion of the second surface. Further, the first external electrode 131 may include a first side band portion extended from the first connection portion 131a to portions of the fifth and sixth surfaces, and the second external electrode 132 may include a second side band portion extended from the second connection portion 132a to portions of the fifth and sixth surfaces.

Figure 44:
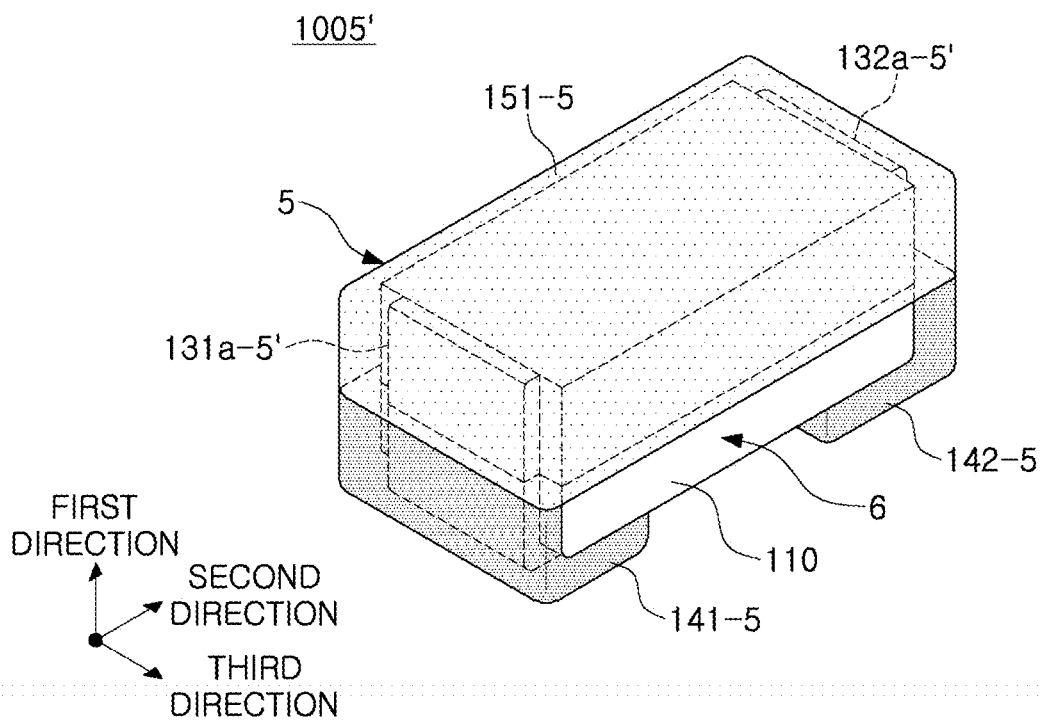
FIG. 44 illustrates another modified example of FIG. 18.
Figure 45:
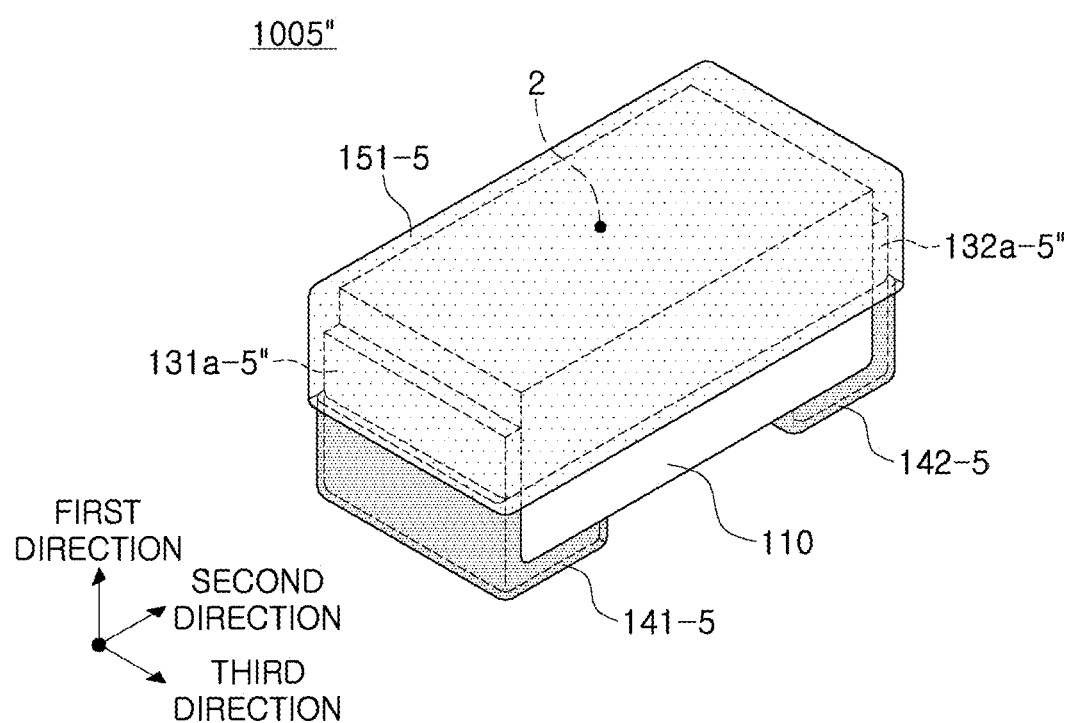
FIG. 45 illustrates still another modified example of FIG. 18.

However, the third band portion, the fourth band portion, the first side band portion and the second side band portion may not be components essential for the present disclosure. The first or second external electrode 131 or 132 may not be disposed on the second surface or may not be disposed on the fifth or sixth surface. As first or second external electrode 131 or 132 is not disposed on the second surface, the first or second external electrode 131 or 132 may be disposed below the extension line of the second surface of the body. In addition, referring to FIGS. 44 and 45 showing various exemplary embodiments of a multilayer ceramic electronic component 1005',1005" (modified examples of the multilayer ceramic electronic component 1005 in FIG. 18), the first or second connection portion 131a-5' or 132a-5' may be spaced apart from the fifth and sixth surfaces, and the first or second connection portion 131a-5" or 132a-5" may be spaced apart from the second surface. In addition, the first or second band portion 131b or 132b may also be spaced apart from the fifth and sixth surfaces.

Meanwhile, the drawings show that the insulating layer is disposed on the third or fourth band portion 131c or 132c when the first or second external electrode 131 or 132 includes the third or fourth band portion 131c or 132c. However, the present disclosure is not limited thereto, and the plating layer 141 or 142 may be disposed on the third or fourth band portion 131c or 132c for the multilayer electronic component to be more easily mounted on the board. In addition, the first and second external electrodes 131 and 132 may respectively include the third and fourth band portions 131c and 132c, and may not include the side band portions. In this case, the first and second connection portions 131a and 132a, and the first to fourth band portions 131b, 132b, 131c and 132c may be spaced apart from the fifth and sixth surfaces.

This exemplary embodiment describes that the multilayer ceramic electronic component 1000 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity such as metal, may use a specific material determined in consideration of an electrical characteristic, structural stability or the like, and may have a multilayer structure.

The external electrode 131 or 132 may be a fired electrode including conductive metal and glass, or a resin-based electrode including the conductive metal and resin.

In addition, the external electrode 131 or 132 may be made by sequentially forming the fired electrode and the resin-based electrode on the body. In addition, the external electrode 131 or 132 may be formed by transferring a sheet including the conductive metal to the body or by transferring the sheet including the conductive metal to the fired electrode.

The conductive metal included in the external electrode 131 or 132 may use the material having excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 131 or 132 may include at least one of nickel (Ni) and an alloy of nickel (Ni), thereby further improving its connectivity with the internal electrode 121 or 122 including nickel (Ni).

The insulating layer 151 may be disposed on the first and second connection portions 131a and 132a.

The first or second connection portion 131a or 132a may be a portion connected to the internal electrode 121 or 122, and thus be a pathway for the penetration of the plating solution in a plating process or the penetration of the moisture when the multilayer electronic component is actually used. In the present disclosure, the insulating layer 151 may be disposed on the connection portions 131a and 132a, thereby preventing the penetration of the external moisture or the penetration of the plating solution.

The insulating layer 151 may be in contact with the first and second plating layers 141 and 142. Here, the insulating layer 151 may be in contact with the first and second plating layers 141 and 142 to partially cover ends thereof, or the first and second plating layers 141 and 142 may be in contact with the insulating layer 151 to partially cover an end thereof.

The insulating layer 151 may be disposed on the first and second connection portions 131a and 132a, and may cover the second surface and the third and fourth band portions 131c and 132c. Here, the insulating layer 151 may cover a region of the second surface, where the third and fourth band portions 131c and 132c are not disposed, and the third and fourth band portions 131c and 132c. Accordingly, the insulating layer 151 may cover a region where an end of the third or fourth band portion 131c or 132c and the body 110 are in contact with each other to prevent the pathway for the penetration of the moisture, thereby further improving moisture resistance reliability of the multilayer electronic component.

The insulating layer 151 may be disposed on the second surface and extended to the first and second connection portions 131a and 132a. In addition, the insulating layer may cover the entire second surface when none of the external electrodes 131 and 132 is disposed on the second surface. Meanwhile, the insulating layer 151 may not be necessarily disposed on the second surface, the insulating layer 151 may not be disposed on the partial or entire second surface, and the insulating layer 151 may be separated into two layers and disposed on each of the first and second connection portions 131a and 132a. The insulating layer may be disposed below the extension line of the second surface when not disposed on the entire second surface. In addition, even when not disposed on the second surface, the insulating layer may be disposed on the first and second connection portions 131a and 132a extended to the fifth and sixth surfaces to be one insulating layer.

Further, the insulating layer 151 may partially cover the first and second side band portions and the fifth and sixth surfaces. Here, portions of the fifth and sixth surfaces, which are not covered by the insulating layer 151, may be externally exposed.

In addition, the insulating layer 151 may cover the first and second side band portions and entirely cover the fifth and sixth surfaces. In this case, none of the fifth and sixth surfaces may be externally exposed to improve the moisture resistance reliability, and none of the connection portions 131a and 132a may be directly and externally exposed to improve the reliability of the multilayer electronic component 1000. In more detail, the insulating layer may cover both the first and second side band portions, and cover all regions of the fifth and sixth surfaces except for regions where the first and second side band portions are formed.

The insulating layer 151 may serve to prevent the formation of the plating layers 141 and 142 on the external electrodes 131 and 132 on which the insulating layer 151 is disposed, and improve a sealing characteristic to minimize the penetration of the external moisture, plating solution or the like.

The insulating layer 151 may include, a glass material having excellent resistance to the plating solution, for example, a glass material including silicon (Si). However, the insulating layer is not limited thereto, and may include a material having strength to protect the multilayer electronic component 1000 from tensile stress which is caused by thermal contraction. In addition, the insulating layer 151 may include one component or a plurality of components, and may include one or more selected from titanium based oxide ($TiO_2$), barium titanate ($BaTiO_3$), aluminum oxide ($Al_2O_3$), silicon dioxide ($SiO_2$), barium oxide (BaO) or the like as an additive to improve a bonding force thereof with the body 110 or with the external electrodes 131 and 132.

A method of forming the insulating layer 151 may depend on its component and purpose. For example, the insulating layer may be formed in such a manner that a coating film is formed with an insulating paste by using a squeegee, and the external electrode 131 or 132 is then disposed on the body 110 to sequentially immerse each cross section of the body and then dried under a temperature of 150° C. In addition, the insulating layer may be formed using a sol-gel processing method, a chemical vapor deposition (CVD) method, an atomic layer deposition (ALD) method or the like. However, the present disclosure is not limited thereto, and may use another method of forming a thin and uniform insulating layer.

The first and second plating layers 141 and 142 may respectively be disposed on the first and second band portions 131b and 132b. The plating layers 141 and 142 may allow the multilayer electronic component to be more easily mounted on the board, be disposed on the band portions 131b and 132b to minimize a space in which the multilayer electronic component is mounted, and minimize the penetration of the plating solution to the internal electrodes, thereby improving the reliability of the multilayer electronic component. One end of the first and second plating layer 141 or 142 may be in contact with the first surface, and the other end thereof may be in contact with the insulating layer 151.

The plating layer 141 or 142 is not limited to a particular type, may include at least one of copper (Cu), nickel (Ni), tin (Sn), silver (Ag), gold (Au), palladium (Pd) and alloys thereof, or may include the plurality of layers.

As a more specific example of the plating layer 241 or 242, the plating layer 241 or 242 may be a nickel (Ni) plating layer or a tin (Sn) plating layer for example, and may have the Ni plating layer and the Sn plating layer sequentially formed on the first or second band portion 131b or 132b.

In order to suppress cracking occurring from a multilayer electronic component due to thermal contraction of a solder fillet, Patent Document 1 suggests a multilayer electronic component including a glass layer positioned directly on a sintered body layer positioned on each end surface of the body to be extended in a direction perpendicular to one main surface and side surfaces of the body, thereby forming a portion of a surface of an external electrode, and a metal layer covering a portion of the sintered body layer, other than the portion covered by the glass layer, thereby forming another portion of the surface of the external electrode in order for the electronic component is mounted on a board using the solder fillet.

The glass layer of Patent Document 1 is made of a glass material having excellent resistance to the plating solution, and including 20 mol % or more and 65 mol % or less of silicon (Si). Meanwhile, Patent Document 1 discloses that the glass layer may have insufficient resistance to the plating solution when the mole fraction of silicon (Si) is less than 20 mol %, and may have a higher glass softening point and lower wettability to the sintered body layer to be easily delaminated when the mole fraction of silicon (Si) is more than 65 mol %.

In general, the glass layer made of the glass material including silicon (Si) may include a material having insulating properties regardless of a content of silicon (Si), and thus have weak adhesion with the plating layer 141 or 142 made of a metal component or the external electrode. Accordingly, the delamination may occur in the multilayer electronic component due to residual stress or external impact occurring during a manufacturing process thereof, and the entire multilayer electronic component may thus have lower resistance to the external impact.

In particular, Patent Document 1 discloses that the glass layer and the metal layer are simply connected with each other by having the same or substantially the same thickness, and the above problems may occur more frequently, which may cause the multilayer electronic component to have a lower adhesion force when mounted on the board by using solder.

On the other hand, in the present disclosure, the multilayer electronic component may have improved total bonding force and adhesion force, by minimizing an area where the insulating layer and the plating layer 141 or 142 are in contact with each other.

In an exemplary embodiment, the end S1 of the first or second plating layer 141 or 142 and the end of the insulating layer 151 may be in contact with each other at their contact point on the first or second external electrode 131 or 132, and the end S1 of the first or second plating layer 141 or 142 and the end S2 of the insulating layer 151 may have the smaller thickness toward the contact point.

Accordingly, it is possible to minimize an area where the first or second plating layer 141 or 142 are in contact with the insulating layer 151 even when an average thickness t1 of the first or second plating layer 141 or 142 and an average thickness t2 of the insulating layer 151 are substantially the same as each other, thus improving the total bonding force of the multilayer electronic component 1000.

In detail, the first or second plating layer 141 or 142 may be disposed on the first or second external electrode, and include the end S1 in contact with the insulating layer 151, and the insulating layer 151 may be disposed on the first or second external electrode and include the end S2 in contact with the first or second plating layer 141 or 142.

The ends S1 and S2 can be in contact with each other, and the end S1 of the plating layer 141 or 142 may cover a portion of the end S2 of the insulating layer 151, or the end S2 of the insulating layer 151 may cover a portion of the end S1 of the plating layer 141 or 142. In either case, the end S1 of the plating layer 141 or 142 and the end S2 of the insulating layer 151 may have an overlapped portion in the second direction. Accordingly, the end S1 of the plating layer 141 or 142 and the end S2 of the insulating layer 151 may each have the thickness gradually smaller toward their contact point.

The present disclosure describes that the end S1 of the plating layer 141 or 142 covers a portion of the end S2 of the insulating layer 151, and is not limited thereto, and may also include a case where the end S2 of the insulating layer 151 covers a portion of the end S1 of the plating layer 141 or 142.

In an exemplary embodiment, the end S1 of the first or second plating layer 141 or 142 and the end S2 of the insulating layer 151 may be in contact with each other to form a recess R having a concave shape toward the body 110.

The bonding force may be lower due to a difference between a component of the plating layer 141 or 142 and a component of the insulating layer 151 when the area where the end S1 of the first or second plating layer and the end S2 of the insulating layer are in contact with each other is large. In detail, the plating layer 141 or 142 may include at least one of copper (Cu), nickel (Ni), tin (Sn), silver (Ag), gold (Au), platinum (Pt) and alloys thereof, and thus include a conductive material, whereas the insulating layer 151 may include an insulating material such as the glass material including silicon (Si), thereby making these layers have the reduction in bonding force therebetween. Therefore, the larger area where the first or second plating layer 141 or 142 and the insulating layer 151 are in contact with each other, the higher possibility in which the delamination occurs, which may cause the multilayer electronic component 1000 to have a lower the adhesion force. According to an exemplary embodiment of the present invention, the end S1 of the first or second plating layer and the end S2 of the insulating layer may be in contact with each other to form the concave recess R to minimize the area where the first or second plating layer 141 or 142 and the insulating layer 151 are in contact with each other, thereby reducing the possibility of occurrence of the delamination, and improving the adhesion force of the multilayer electronic component 1000.

In an exemplary embodiment, $1/20 \leq t3/t2 \leq 1/5$ when t2 indicates the average thickness of the insulating layer, and t3 indicates an average size of the insulating layer in the second direction, measured from a point P positioned on an outermost tip in the second direction among the contact points to an outer surface of the first or second external electrode.

The end S1 of the first or second plating layer 141 or 142 and the end of the insulating layer 151 may be in contact with each other at the contact point on the first or second external electrode 131 or 132. The contact point may indicate the contact point on a length-thickness direction cross section (i.e., L-T cross section) of the multilayer electronic component 1000. However, the contact point may not be limited to only one particular point, may be a tangent line including the plurality of contact points, and may be a surface on which the first or second plating layer 141 or 142 are in contact with the insulating layer 151 in the case of the multilayer electronic component rather than the cross section.

From this point of view, when viewed from the length-thickness section (i.e., L-T cross section), the area where the end S1 of the first or second plating layer 141 or 142 and the end S2 of the insulating layer may depend on a position of the point P positioned on the outermost tip among the plurality of contact points in the second direction.

Here, $t3/t2 > 1/55$ when t2 indicates the average thickness of the insulating layer, and t3 indicates an average size of the insulating layer in the second direction, measured from a point P positioned on an outermost tip in the second direction among the contact points to an outer surface of the first or second external electrode. In this case, the area where the first or second plating layer 141 or 142 and the insulating layer 151 are in contact with each other may be increased to lower the adhesion force of the multilayer electronic component 1000.

Meanwhile, a lower limit of t3/t2 is not particularly limited. However, t3/t2 may be 1/20 or more to prevent penetration of external moisture.

Therefore, according to an exemplary embodiment of the present disclosure, 1/20≤t3/t2≤1/5, thereby improving the adhesion force of the multilayer electronic component 1000 and the resistance to the penetration of the external moisture.

The average size t3 of the insulating layer in the second direction, measured from the point P positioned on the outermost tip in the second direction among the contact points to an outer surface of the first or second external electrode may have a value obtained by averaging values measured at five equally spaced points in the third direction on the cross section (i.e., L-T cross section) cut in the first and second directions. In detail, t3 may have the value obtained by averaging the sizes of the insulating layer in the second direction, measured from the point P positioned on the outermost tip in the second direction among the contact points on which the insulating layer and the plating layer 141 or 142 are in contact with each other on the first or second external electrode to an outer surface of the first or second external electrode.

There are various methods of forming the end S1 of the first or second plating layer 141 or 142 and the end S2 of the insulating layer 151 to have the thickness smaller toward the contact point or forming the recess. For example, when formed by using a dipping method, the insulating layer may be formed y making a plastic carrier plate or rubber jig which holds an upper portion of the multilayer electronic component to have a shape corresponding to that of the end of the insulating layer or plating layer. Additionally, it is possible to use a method of minimizing the contact surface t3/t2 between the plating layer and the insulating layer by applying a water-repellent material to the insulating layer.

In an exemplary embodiment, the end S1 of the first or second plating layer 141 or 142 and the end S2 of the insulating layer 151 may be in contact with each other below the extension line of the first surface. In this case, it is possible to prevent or minimize the formation of the solder fillet on the third and fourth surfaces of the multilayer electronic component mounted on the board, thereby reducing an occurrence rate of a short circuit due to solder between the multilayer electronic components. It is thus possible to further minimize a gap between the multilayer electronic components mounted on the board, thereby significantly improving mounting density of the multilayer electronic components on the board.

Figure 43:
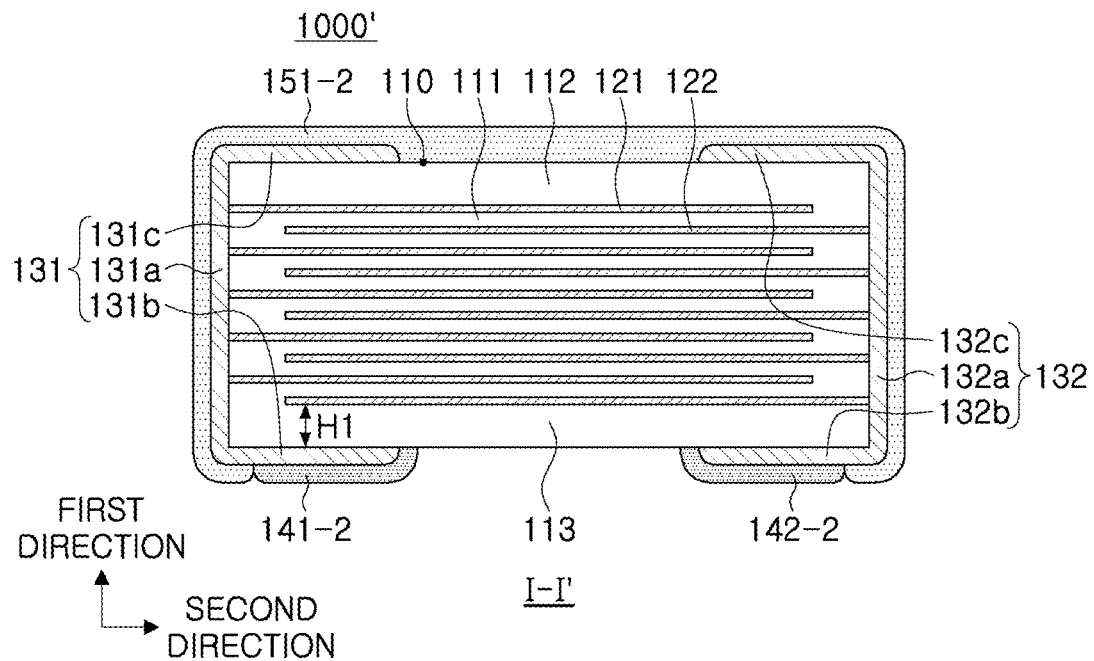
FIG. 43 is a cross-sectional view of a multilayer electronic component according to still another exemplary embodiment of the present disclosure.

Referring to FIG. 43 showing another exemplary embodiment of a multilayer electronic component 1000', the insulating layer 151-2 may be extended from the first or second connection portion 131a or 132a to a portion of the first or second band portion 131b or 132b. In this case, the end S1 of the first or second plating layer 141-2 or 142-2 and the end S2 of the insulating layer 151-2 may be in contact with each other at their contact point on the first or second band portion 131b or 132b. Accordingly, it is possible to prevent the solder fillet from being formed on the connection portion when the multilayer electronic component is mounted on the board, thereby further reducing the occurrence rate of the short circuit due to the solder between the multilayer electronic components. It is thus possible to further minimize the gap between the multilayer electronic components mounted on the board, thereby significantly improving the mounting density of the multilayer electronic components on the board.

In an exemplary embodiment, the first and second plating layers 141 and 142 may respectively be extended to partially cover the first and second connection portions 131a and 132a. H1>H2 when H1 indicates an average size of a region in the first direction, measured from the first surface 1 to the internal electrode disposed closest to the first surface 1 among the first and second internal electrodes 121 and 122, and H2 indicates an average size of the first or second plating layer 141 or 142 in the first direction, measured from the extension line of the first surface 1 to an end of the plating layer disposed on the first or second connection portion 131a or 132a. Accordingly, it is possible to suppress the plating solution from penetrating into the internal electrode during the plating process, thereby allowing the multilayer electronic component to have the improved reliability.

H1 and H2 may be values each obtained by averaging values measured in the cross section (i.e., L-T cross section) of the body 110, cut in the first and second directions, at five equally spaced points in the third direction. H1 may indicate an average of values measured at a point where the internal electrode, disposed closest to the first surface 1 in each cross section, is connected to the external electrode, H2 may indicate an average of values measured based on the end of the plating layer in contact with the external electrode, and the extension line of the first surface serving as a reference when measuring H1 and H2 may be the same.

In an exemplary embodiment, the first plating layer 141 may cover the end of the insulating layer 151, disposed on the first external electrode 131, and the second plating layer 142 may cover the end of the insulating layer 151, disposed on the second external electrode 132. Accordingly, it is possible to strengthen a bonding force of the insulating layer 151 and the plating layer 141 or 142, thereby improving the reliability of the multilayer electronic component 1000.

In an exemplary embodiment, the insulating layer 151 may cover an end of the first plating layer 141, disposed on the first external electrode 131, and the insulating layer 151 may cover an end of the second plating layer 142, disposed on the second external electrode 132. Accordingly, it is possible to strengthen the bonding force of the insulating layer 151 and the plating layer 141 or 142, thereby improving the reliability of the multilayer electronic component 1000.

In an exemplary embodiment, $0.2 \leq B1/L \leq 0.4$ and $0.2 \leq B2/L \leq 0.4$ when L indicates an average size of the body 110 in the second direction, B1 indicates an average size of the first band portion in the second direction, measured from the extension line of the third surface to an end of the band portion, and B2 indicates an average size of the second band portion in the second direction, measured from the extension line of the fourth surface to an end of the band portion.

When B1/L and B2/L are less than 0.2, it may be difficult to secure sufficient adhesion force. On the other hand, when B2/L is greater than 0.4, a leakage current may occur between the first band portion 131b and the second band portion 132b under a high-voltage current, and the first band portion 131b and the second band portion 132b may be electrically connected with each other due to plating spread or the like during the plating process.

B1, B2 and L may be values each obtained by averaging values measured in the cross section (i.e., L-T cross section) of the body 110, cut in the first and second directions at five equally spaced points in the third direction.

Referring to FIG. 7 illustrating a mounting board 1100 on which a multilayer electronic component 1000 is mounted, the plating layers 141 and 142 of the multilayer electronic component 1000 may be joined to the board 180 by electrode pads 181 and 182 and solders 171 and 172, disposed on the board 180.

Meanwhile, when the internal electrodes 121 and 122 are stacked on each other in the first direction, the multilayer electronic component 1000 may be horizontally mounted on the board 180 so that the internal electrodes 121 and 122 are parallel to a surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The multilayer electronic component 1000 is not limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 1000 having a size of 1005 (i.e., length×width of 1.0 mm×0.5 mm) or less may thus have more remarkably improved reliability and capacitance per unit volume according to the present disclosure.

Therefore, in consideration of a manufacturing error, a size of the external electrode and the like, when having a length of 1.1 mm or less and a width of 0.55 mm or less, the multilayer ceramic electronic component 1000 may have the more remarkably improved reliability according to the present disclosure. Here, the length of the multilayer electronic component 1000 may indicate a maximum size of the multilayer electronic component 1000 in the second direction, and the width of the multilayer electronic component 1000 may indicate a maximum size of the multilayer electronic component 1000 in the third direction.

Figure 8:
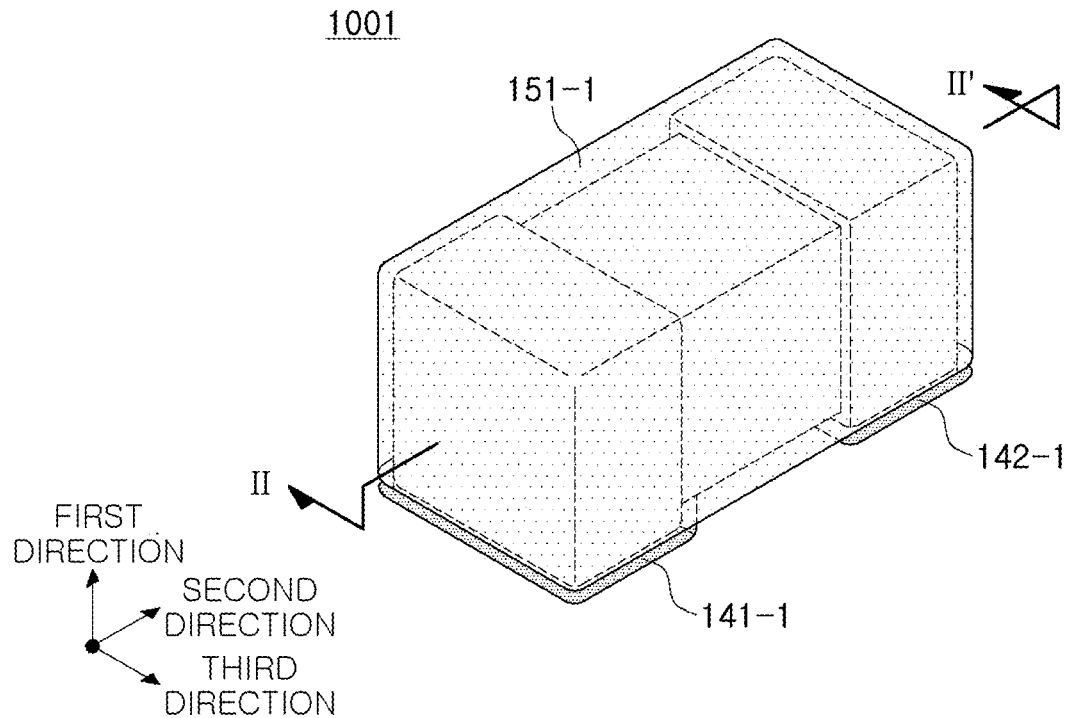
FIG. 8 is a perspective view schematically illustrating a multilayer electronic component according to another exemplary embodiment of the present disclosure.
Figure 9:
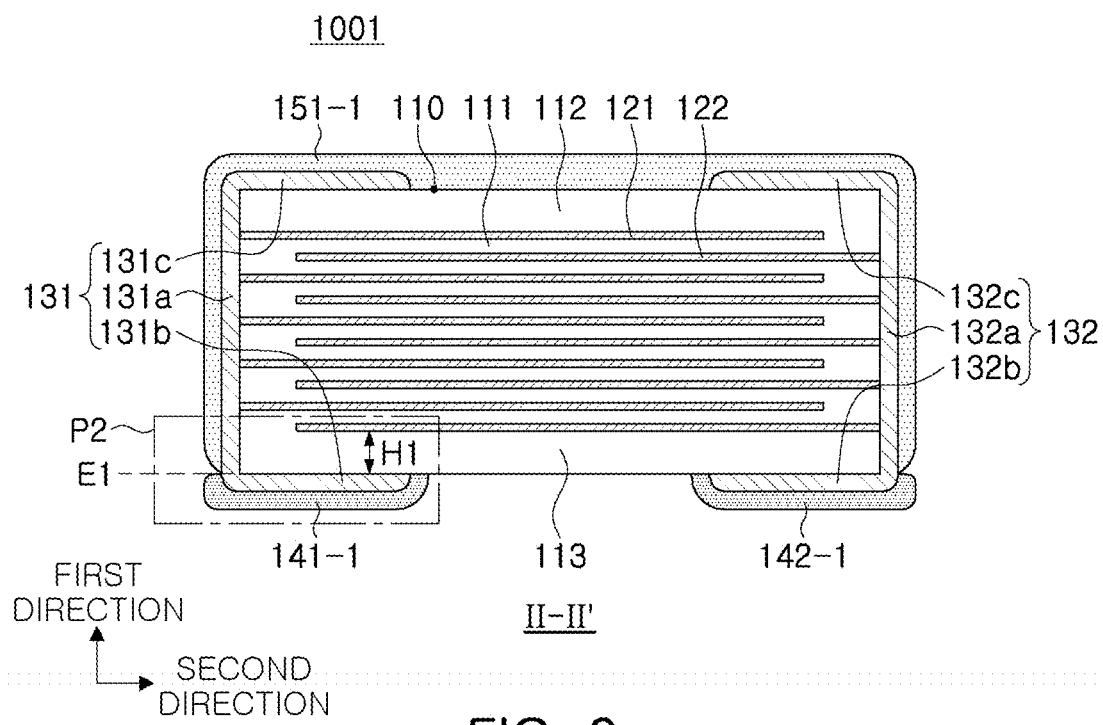
FIG. 9 is a cross-sectional view taken along line II-II' of FIG. 8.

FIG. 8 is a perspective view schematically illustrating a multilayer electronic component 1001 according to another exemplary embodiment of the present disclosure; and FIG. 9 is a cross-sectional view taken along line II-II' of FIG. 8.

Referring to FIGS. 8 and 9, the multilayer electronic component 1001 according to another exemplary embodiment of the present disclosure may have first and second plating layers 141-1 and 142-1 each disposed below the extension line E1 of the first surface. Accordingly, it is possible to minimize a height of the solder when the multilayer electronic component is mounted on the board and to minimize a space in which the multilayer electronic component is mounted.

In addition, an insulating layer 151-1 may be extended below the extension line E1 of the first surface to be in contact with the first and second plating layers 141-1 and 142-1.

Figure 10:
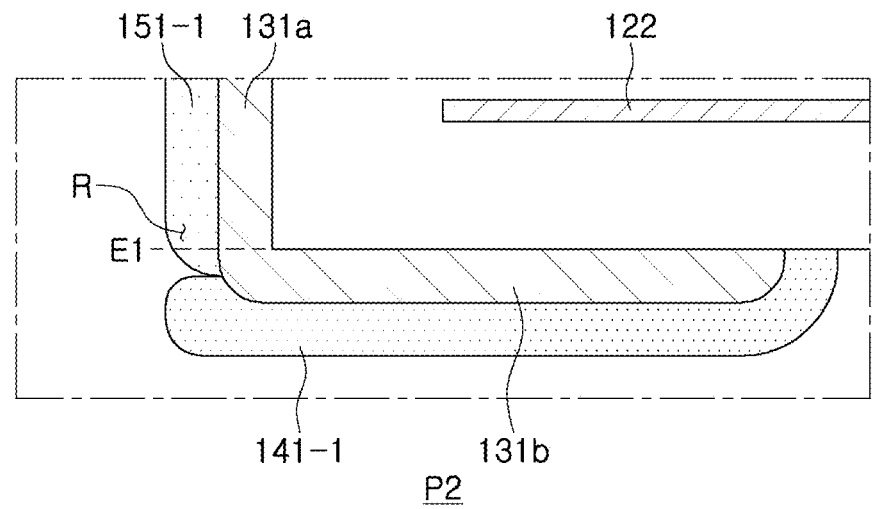
FIG. 10 is an enlarged view of region P2 of FIG. 9.

FIG. 10 is an enlarged view of region P2 of FIG. 9.

Referring to FIG. 10, a first or second plating layer 141-1 or 142-1 may be disposed below the extension line E1 of the first surface, or the insulating layer 151-1 may be extended to the extension line E1 of the first surface to be in contact with the first or second plating layer 141-1 or 142-1, and the recess R may thus also be disposed below the extension line E1 of the first surface. Accordingly, it is possible to improve the bonding force between the insulating layer 151-1 and the first or second plating layer 141-1 or 142-1 while minimizing a space in which the multilayer electronic component is mounted on the board, thereby improving the adhesion force of the multilayer electronic component when mounted on the board.

In addition, the recess R may be disposed below the extension line E1 of the first surface, and it is thus possible to suppress the moisture from reaching the capacity forming portion Ac even when the moisture penetrates through the recess R, thereby improving the moisture resistance reliability of the multilayer electronic component.

Figure 11:
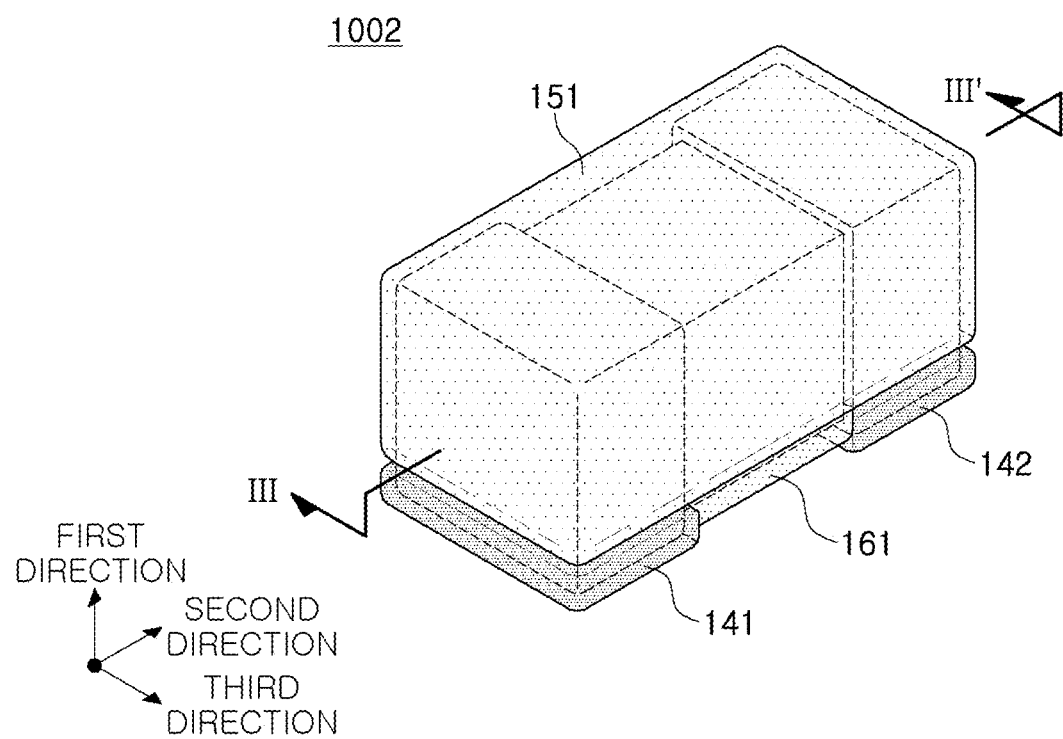
FIG. 11 is a perspective view schematically illustrating a multilayer electronic component according to another exemplary embodiment of the present disclosure.
Figure 12:
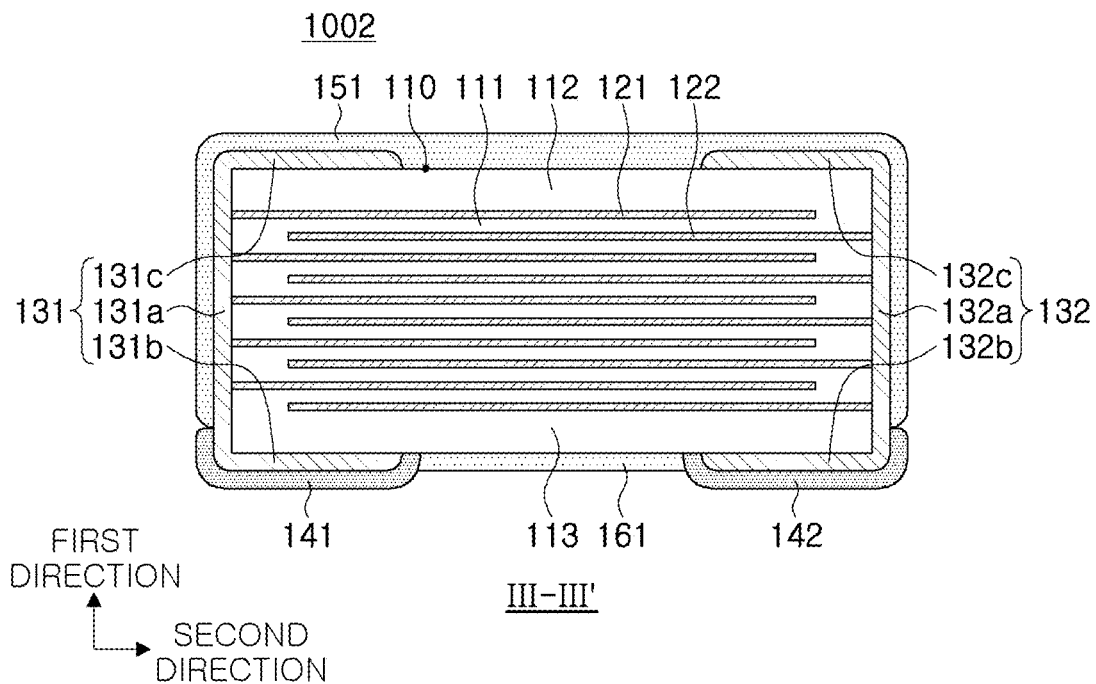
FIG. 12 is a cross-sectional view taken along line III-III' of FIG. 11.

FIG. 11 is a perspective view schematically illustrating a multilayer electronic component 1002 according to another exemplary embodiment of the present disclosure; and FIG. 12 is a cross-sectional view taken along line III-III' of FIG. 11.

Referring to FIGS. 11 and 12, the multilayer electronic component 1002 according to another exemplary embodiment of the present disclosure may further include an additional insulating layer 161 disposed on the first surface 1 and between the first band portion 131b and the second band portion 132b. Accordingly, it is possible to prevent the leakage current or the like which may occur between the first band portion 131b and the second band portion 132b under the high-voltage current.

The additional insulating layer 161 is not limited to a particular type. For example, the additional insulating layer 161 may include the glass material including silicon (Si) like the insulating layer 151. However, it is not necessary to limit the additional insulating layer 161 and the insulating layer 151 to the same material, and the insulating layers may be made of materials different from each other. For example, the insulating layer may include one or more selected from epoxy resin, acrylic resin, ethyl cellulose or the like. In addition, the additional insulating layer 161 may include one or more selected from titanium based oxide ($TiO_2$), barium titanate ($BaTiO_3$), silicon dioxide ($SiO_2$), aluminum oxide ($Al_2O_3$), barium oxide (BaO) or the like as an additive in addition to polymer resin. The additional insulating layer may thus have the improved bonding force with the body or the external electrode.

Figure 13:
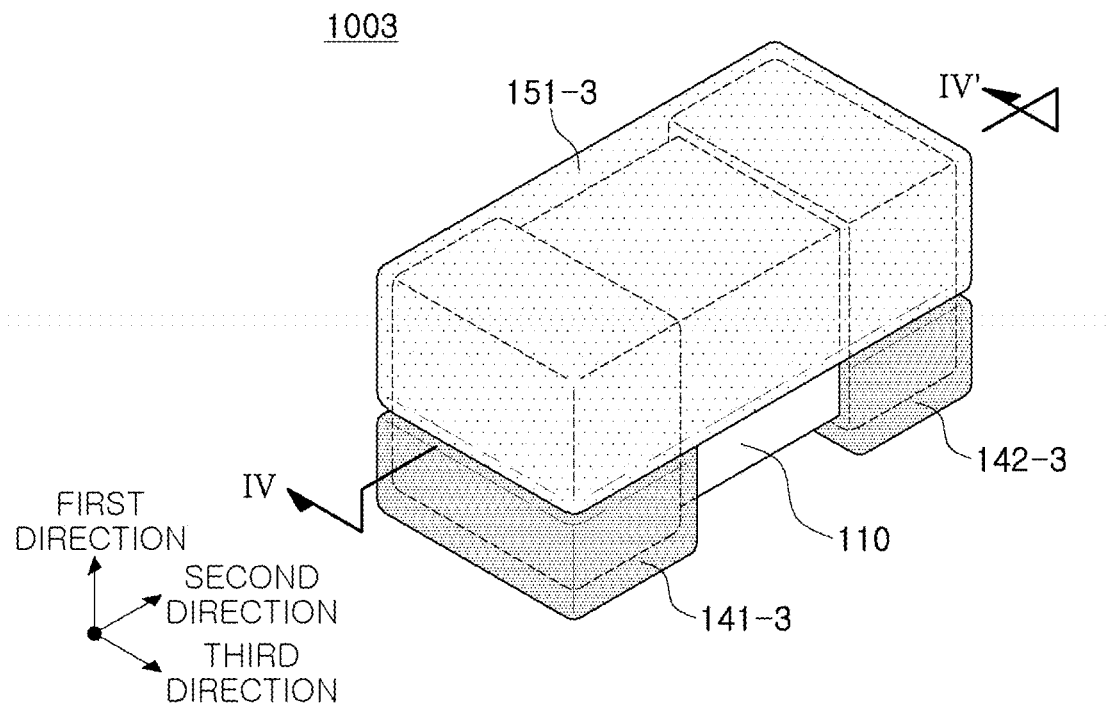
FIG. 13 is a perspective view schematically illustrating a multilayer electronic component according to another exemplary embodiment of the present disclosure.
Figure 14:
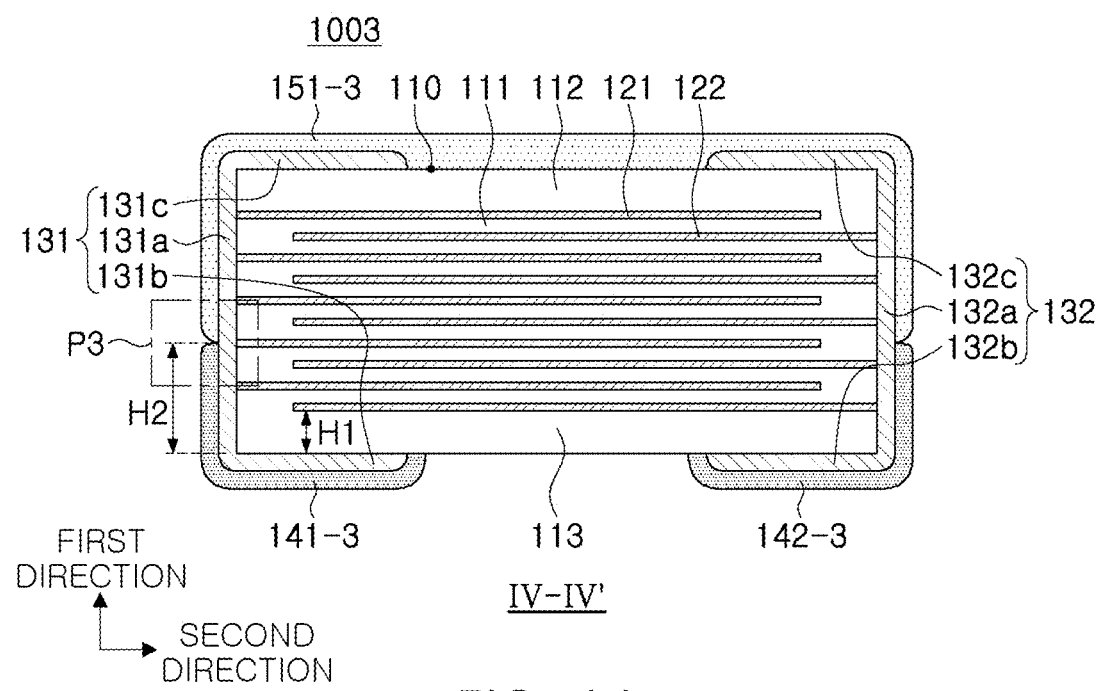
FIG. 14 is a cross-sectional view taken along line IV-IV' of FIG. 13.

FIG. 13 is a perspective view schematically illustrating a multilayer electronic component 1003 according to another exemplary embodiment of the present disclosure; and FIG. 14 is a cross-sectional view taken along line IV-IV' of FIG. 13.

Referring to FIGS. 13 and 14, in the multilayer electronic component 1003 according to another exemplary embodiment, H1<H2 when H1 indicates an average size of a region in the first direction, measured from the first surface 1 to the internal electrode disposed closest to the first surface 1 among the first and second internal electrodes 121 and 122, and H2 indicates an average size of a plating layer 141-3 or 142-3 in the first direction, measured from the extension line of the first surface 1 to an end of the plating layer 141-3 or 142-3 disposed on the first or second connection portion 131a or 132a. Accordingly, it is possible to improve the adhesion force by increasing an area where the multilayer electronic component is in contact with the solder when the multilayer electronic component is mounted on the board.

H2<T/2 when T indicates the average size of the body 110 in the first direction. That is, H1<H2<T/2. The reason is that the moisture resistance reliability improved by the insulating layer may be reduced when H2 is T/2 or more.

H1, H2 and T may be the values each obtained by averaging the values measured in the cross section (i.e., L-T cross section) of the body 110, cut in the first and second directions at five equally spaced points in the third direction. H1 may indicate the average of the values measured at the point where the internal electrode, disposed closest to the first surface 1 in each cross section, is connected to the external electrode, H2 may indicate the average of the values measured based on the end of the plating layer 141-3 or 142-3 in contact with the external electrode, and the extension line of the first surface serving as the reference when measuring H1 and H2 may be the same. In addition, T may be an average value after measuring a maximum size of the body 110 in the first direction in each cross section.

Figure 15:
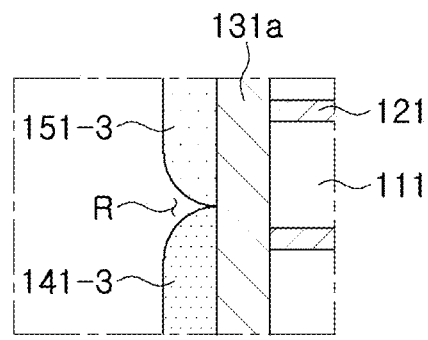
FIG. 15 is an enlarged view of region P3 of FIG. 14.

FIG. 15 is an enlarged view of region P3 of FIG. 14.

Referring to FIG. 15, an end of the first or second plating layer 141-3 or 142-3 and an end of the insulating layer 151-3 may be in contact with each other at their contact point on the first or second external electrode 131 or 132, and the end of the first or second plating layer 141-3 or 142-3 and the end of the insulating layer 151-3 may each have a thickness smaller toward the contact point, thereby improving the adhesion force of the multilayer electronic component when mounted on the board. In addition, when H1<H2, it is possible to increase the area where the multilayer electronic component is in contact with the solder, thereby further improving the adhesion force of the multilayer electronic component.

In addition, when H1<H2<T/2, it is possible to maintain the improved moisture resistance reliability by the insulating layer, thereby preventing the moisture resistance reliability from being lower due to the formation of the recess R.

Figure 16:
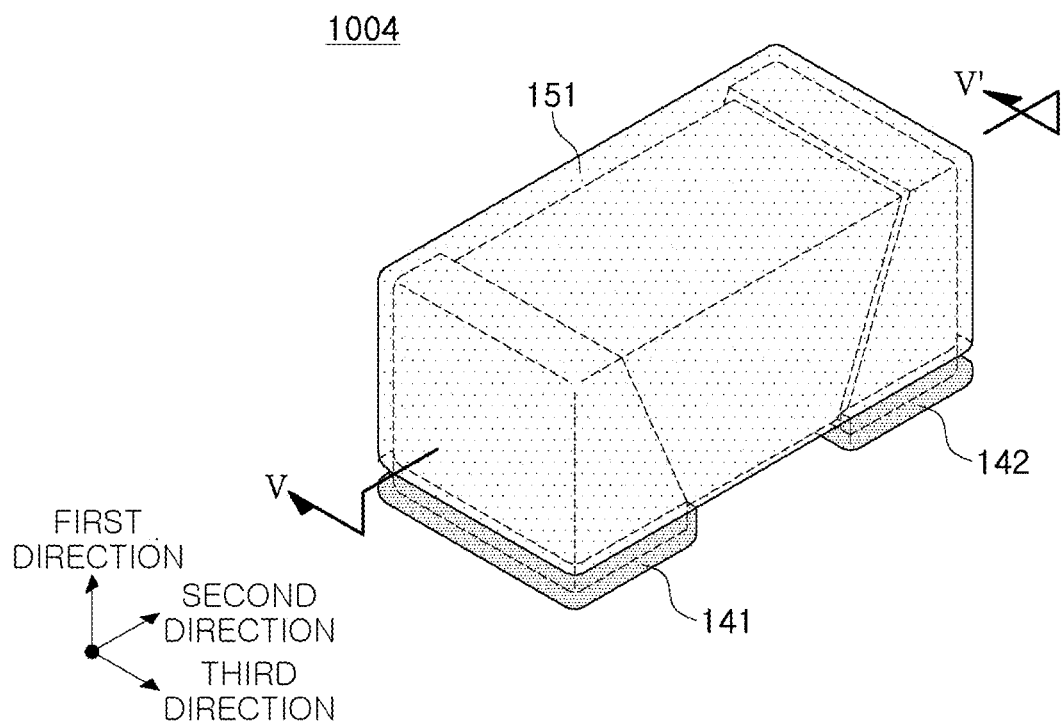
FIG. 16 is a perspective view schematically illustrating a multilayer electronic component according to another exemplary embodiment of the present disclosure.
Figure 17:
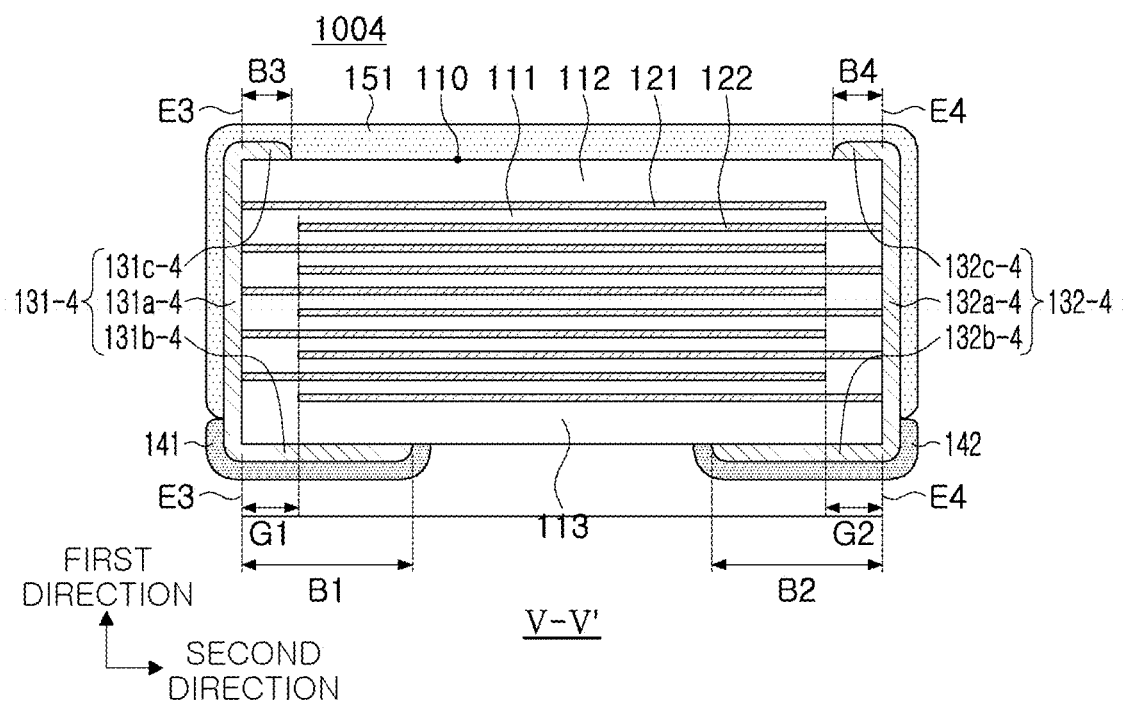
FIG. 17 is a cross-sectional view taken along line V-V' of FIG. 16.

FIG. 16 is a perspective view schematically illustrating a multilayer electronic component 1004 according to another exemplary embodiment of the present disclosure; and FIG. 17 is a cross-sectional view taken along line V-V' of FIG. 16.

Referring to FIGS. 16 and 17, in the multilayer electronic component 1004 according to another exemplary embodiment of the present disclosure, the average length B1 of the first band portion 131b-4 may be longer than an average length B3 of the third band portion 131c-4, and an average length of the second band portion 132b-4 may be longer than an average length B4 of the fourth band portion 132c-4. Accordingly, it is possible to improve the adhesion force by increasing the area where the multilayer electronic component is in contact with the solder when the multilayer electronic component is mounted on the board.

In more detail, B3<B1 and B4<B2 when B1 indicates an average size of the first band portion 131b-4 in the second direction, measured from the extension line of the third surface 3 to an end of the band portion, B2 indicates an average size of the second band portion 132b-4 in the second direction, measured from the extension line of the fourth surface 4 to an end of the band portion, B3 indicates an average size of the third band portion 131c-4 in the second direction, measured from the extension line of the third surface 3 to an end of the band portion, and B4 indicates an average size of the fourth band portion 132c-4 in the second direction, measured from the extension line of the fourth surface 4 to an end of the band portion.

Here, $0.2 \leq B1/L \leq 0.4$ and $0.2 \leq B2/L \leq 0.4$ when L indicates the average size of the body 110 in the second direction.

B1, B2, B3, B4 and L may be values each obtained by averaging values measured in the cross section (i.e., L-T cross section) of the body 110, cut in the first and second directions at five equally spaced points in the third direction.

In addition, the first external electrode 131-4 may include a first side band portion extended from the first connection portion 131a-4 to portions of the fifth and sixth surfaces, and the second external electrode 132-4 may include a second side band portion extended from the second connection portion 132a-4 to portions of the fifth and sixth surfaces. Here, the first or second side band portion may have a size gradually increased in the second direction as being closer to the first surface. That is, the first or second side band portion may have a tapered shape or a trapezoidal shape.

Further, $B3 \leq G1$ and $B4 \leq G2$ when B3 indicates the average size of the third band portion 131c-4 in the second direction, measured from the extension line of the third surface 3 to the end of the band portion, B4 indicates the average size of the fourth band portion 132c-4 in the second direction, measured from the extension line of the fourth surface 4 to the end of the band portion, G1 indicates an average size of a region in the second direction, where the third surface and the second internal electrode 122 are spaced apart from each other, and G2 indicates an average size of a region in the second direction, where the fourth surface and the first internal electrode 121 are spaced apart from each other. Accordingly, it is possible to minimize a volume of the external electrode, thereby increasing the capacitance of the multilayer electronic component 1004 per unit volume.

In the cross section cut in the first and second directions from a center of the body in the third direction, G1 may indicate a value obtained by averaging sizes of the region in the second direction, measured from any five second internal electrodes positioned in the center of the body in the first direction to the third surface spaced apart from the internal electrodes, and G2 may indicate a value obtained by averaging sizes of the region in the second direction, measured from any five first internal electrodes positioned in the center of the body in the first direction to the fourth surface spaced apart from the internal electrodes.

Further, G1 and G2 may indicate values each obtained from the cross section (i.e., L-T cross section) of the body 110, cut in the first and second directions at five equally spaced points in the third direction, and these values may further be generalized by taking G1 and G2 as their averages.

However, it is not intended to limit the present disclosure to $B3 \leq G1$ and $B4 \leq G2$, and a case where $B3 \geq G1$ and $B4 \geq G2$ may also be included as another exemplary embodiment of the present disclosure. Accordingly, in another exemplary embodiment, $B3 \geq G1$ and $B4 \geq G2$ when B3 indicates an average size of the third band portion in the second direction, measured from the extension line of the third surface 3 to an end of the band portion, B4 indicates an average size of the fourth band portion in the second direction, measured from the extension line of the fourth surface 4 to an end of the band portion, G1 indicates an average size of a region in the second direction, where the third surface and the second internal electrode are spaced apart from each other, and G2 indicates an average size of a region in the second direction, where the fourth surface and the first internal electrode are spaced apart from each other.

In another exemplary embodiment, $B1 \geq G1$ and $B2 \geq G2$ when B1 indicates an average size of the first band portion in the second direction, measured from the extension line E3 of the third surface to the end of the band portion, and B2 indicates an average size of the second band portion in the second direction, measured from the extension line of the fourth surface to an end of the band portion. Accordingly, it is possible to improve the adhesion force of the multilayer electronic component 1004 to the board 180.

Figure 18:
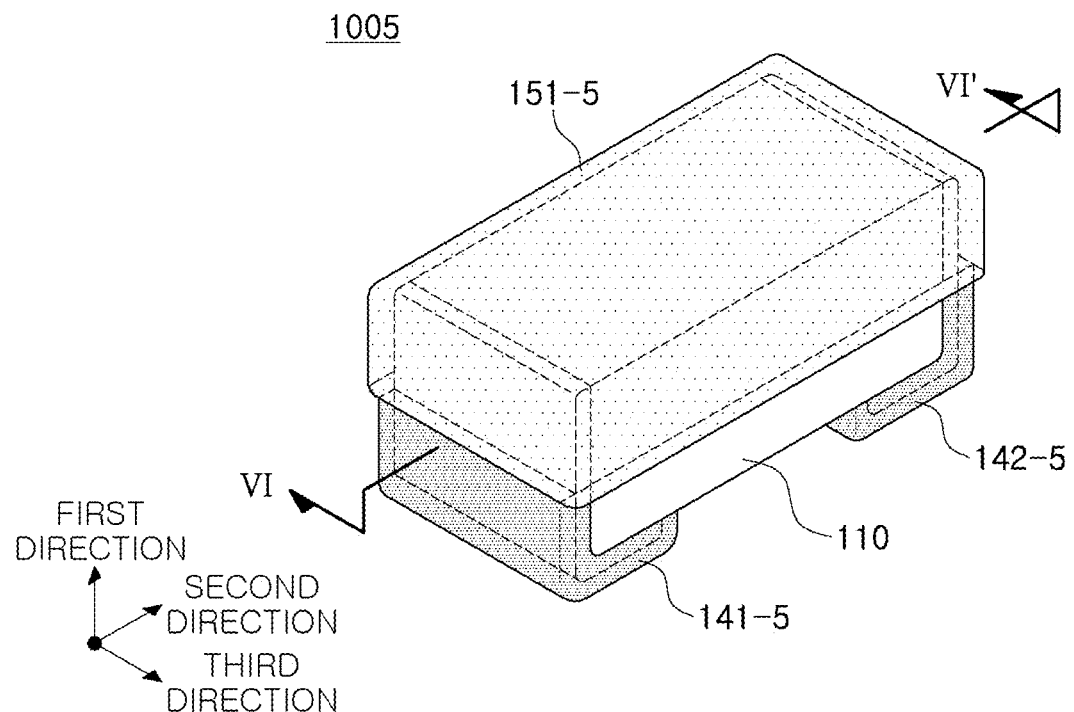
FIG. 18 is a perspective view schematically illustrating a multilayer electronic component according to another exemplary embodiment of the present disclosure.
Figure 19:
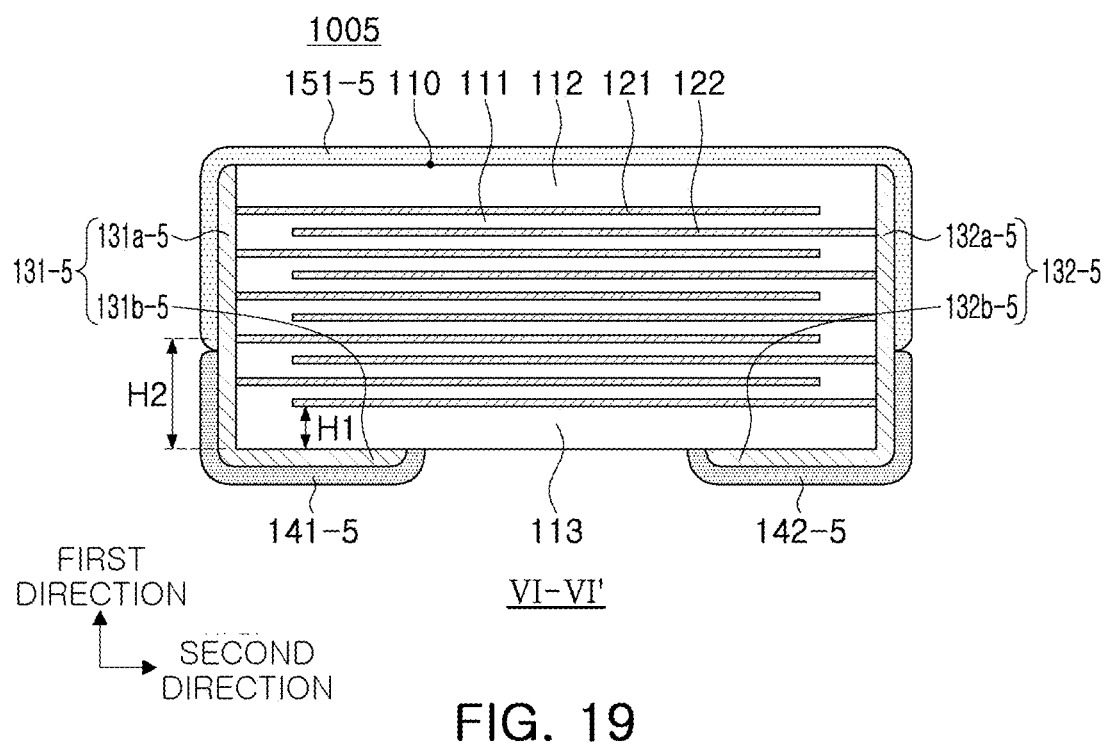
FIG. 19 is a cross-sectional view taken along line VI-VI' of FIG. 18.

FIG. 18 is a perspective view schematically illustrating a multilayer electronic component 1005 according to another exemplary embodiment of the present disclosure; and FIG. 19 is a cross-sectional view taken along line VI-VI' of FIG. 18.

Referring to FIGS. 18 and 19, first and second external electrodes 131-5 and 132-5 of the multilayer electronic component 1005 according to another exemplary embodiment of the present disclosure may not be disposed on the second surface and may be disposed on the third, fourth and first surfaces to each have an L-shape. That is, the first and second external electrodes 131-5 and 132-5 may be disposed below the extension line of the second surface.

The first external electrode 131-5 may include a first connection portion 131a-5 disposed on the third surface 3 and a first band portion 131b-5 extended from the first connection portion 131a-5 to a portion of the first surface 1, and the second external electrode 132-5 may include a second connection portion 132a-5 disposed on the fourth surface 4 and a second band portion 132b-5 extended from the second connection portion 132a-5 to a portion of the first surface 1. The external electrodes 131-5 and 132-5 may not be disposed on the second surface 2, and an insulating layer 151-5 may cover the entire second surface 2. Accordingly, it is possible to minimize volumes of the external electrodes 131-5 and 132-5, thereby further improving the capacitance of the multilayer electronic component 1005 per unit volume. However, the insulating layer 151-5 is not limited to covering the entire second surface 2.

In addition, the insulating layer 151-5 may partially cover the fifth and sixth surfaces, thereby further improving the reliability of the multilayer electronic component. Here, portions of the fifth and sixth surfaces, which are not covered by the insulating layer 151-5, may be externally exposed.

Further, the insulating layer 151-5 may entirely cover the fifth and sixth surfaces. In this case, none of the fifth and sixth surfaces may be externally exposed to further improve the moisture resistance reliability.

A first plating layer 141-5 may be disposed on the first band portion 131b-5, and a second plating layer 142-5 may be disposed on the second band portion 132b-5. The first and second plating layers 141-5 and 142-5 may respectively be extended to portions of the first and second connection portions 132a-5 and 132b-5.

Here, none of the external electrodes 131-5 and 132-5 may also be disposed on the fifth and sixth surfaces 5 and 6. That is, the external electrodes 131-5 and 132-5 may be disposed only on the third, fourth and first surfaces.

H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 141-5 or 142-5 in the first direction, measured from the extension line of the first surface 1 to an end of the plating layer 141-5 or 142-5 disposed on the first or second connection portion 131a-5 or 132a-5. Accordingly, it is possible to improve the adhesion force by increasing the area where the multilayer electronic component is in contact with the solder when the multilayer electronic component is mounted on the board, and to increase an area where the external electrode 131-5 or 132-5 and the plating layer 141-5 or 142-5 in contact with each other, thereby suppressing an increase in equivalent series resistance (ESR).

H2<T/2 when T indicates the average size of the body 110 in the first direction. That is, H1<H2<T/2. The reason is that the moisture resistance reliability improved by the insulating layer may be reduced when H2 is T/2 or more.

In addition, the first or second plating layer 141-5 or 142-5 may cover a portion of the insulating layer 151-1 on the third or fourth surface. That is, the plating layer 141-5 or 142-5 may cover an end of the insulating layer 151-5 on the third or fourth surface. Accordingly, it is possible to strengthen a bonding force of the insulating layer 151-5 and the plating layer 141-5 or 142-5, thereby improving the reliability of the multilayer electronic component 1005.

In addition, the insulating layer 151-5 may cover a portion of the first or second plating layer 141-5 or 142-5 on the third or fourth surface. That is, the insulating layer 151-5 may cover an end of the plating layer 141-5 or 142-5 on the third or fourth surface. Accordingly, it is possible to strengthen the bonding force of the insulating layer 151-5 and the plating layer 141-5 or 142-5, thereby improving the reliability of the multilayer electronic component 1005.

Figure 20:
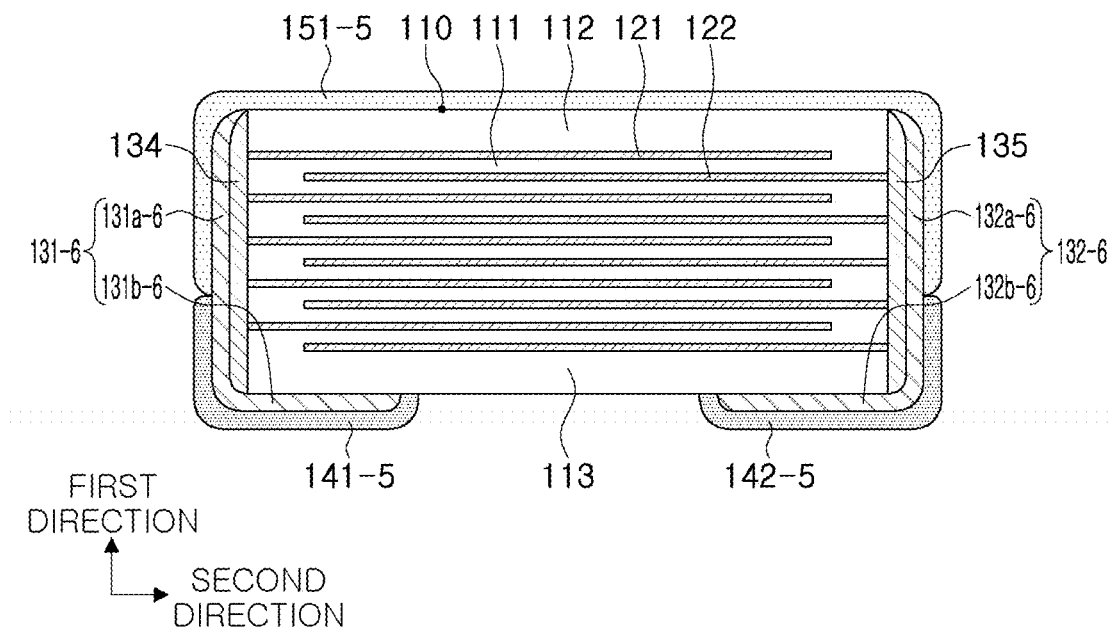
FIG. 20 illustrates a modified example of FIG. 18.

FIG. 20 illustrates a modified example 1006 of FIG. 18.

Referring to FIG. 20, in the modified example 1006 of the multilayer electronic component 1005 according to another exemplary embodiment of the present disclosure, a first additional electrode layer 134 may be disposed between a first connection portion 131a-6 and the third surface, and a second additional electrode layer 135 may be disposed between a second connection portion 132a-6 and the fourth surface. The first additional electrode layer 134 may be disposed not to deviate from the third surface, and the second additional electrode layer 135 may be disposed not to deviate from the fourth surface. The first and second additional electrode layers 134 and 135 may improve the electrical connectivity between the internal electrodes 121 and 122, and have excellent bonding forces with the external electrodes 131-6 and 132-6, and thus serve to further improve mechanical bonding forces of the external electrodes 131-6 and 132-6.

The first and second external electrodes 131-6 and 132-6 may each have an L-shape in which none of the first and second external electrodes is disposed on the second surface.

The first external electrode 131-6 may include a first connection portion 131a-6 disposed on the first additional electrode layer 134 and a first band portion 131b-6 extended from the first connection portion 131a-6 to a portion of the first surface 1, and the second external electrode 132-6 may include a second connection portion 132a-6 disposed on the second additional electrode layer 135 and a second band portion 132b-6 extended from the second connection portion 132a-6 to a portion of the first surface 1.

Meanwhile, the first and second additional electrode layers 134 and 135 may each be made of any material as long as the material has the electrical conductivity such as the metal, and may use the specific material determined in consideration of the electrical characteristic, the structural stability or the like. In addition, the first and second additional electrode layers 134 and 135 may each be the fired electrode including the conductive metal and glass, or the resin-based electrode including the conductive metal and resin. In addition, the first and second additional electrode layers 134 and 135 may be formed by transferring the sheet including the conductive metal to the body.

The conductive metal included in the first and second additional electrode layers 134 and 135 may use a material having the excellent electrical conductivity, and is not particularly limited. For example, the conductive metal may be at least one of copper (Cu), nickel (Ni), palladium (Pd), silver (Ag), tin (Sn), chromium (Cr) and alloys thereof. The first and second additional electrode layer 134 or 135 may include at least one of nickel (Ni) and an alloy of nickel (Ni), thereby further improving its connectivity with the internal electrode 121 or 122 including nickel (Ni).

Figure 21:
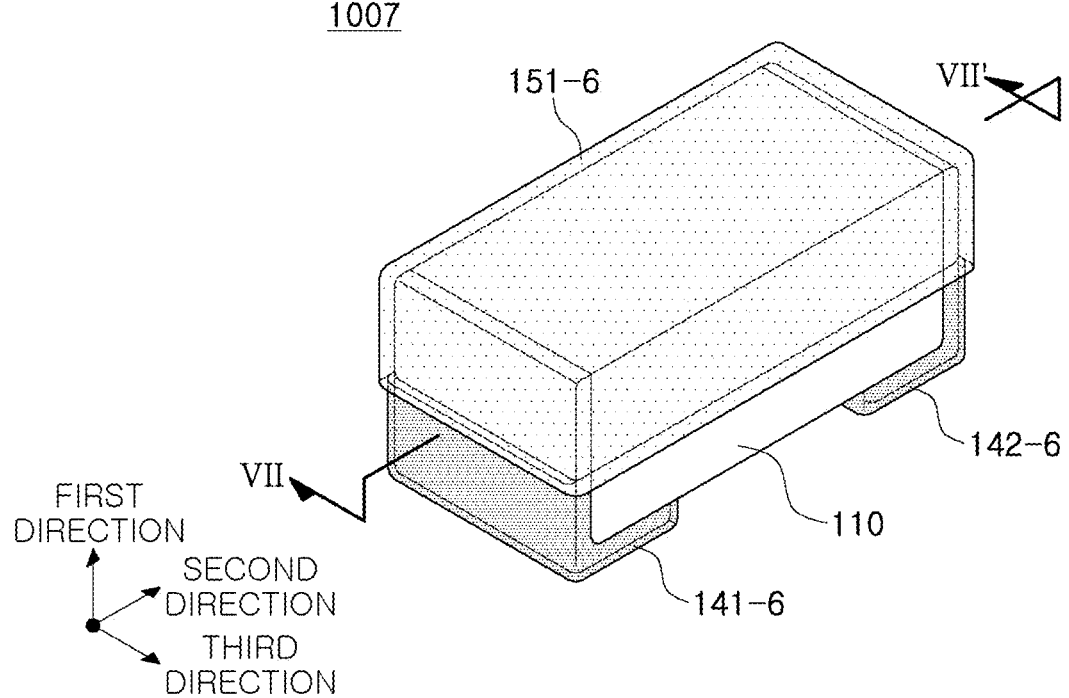
FIG. 21 is a perspective view schematically illustrating a multilayer electronic component according to another exemplary embodiment of the present disclosure.
Figure 22:
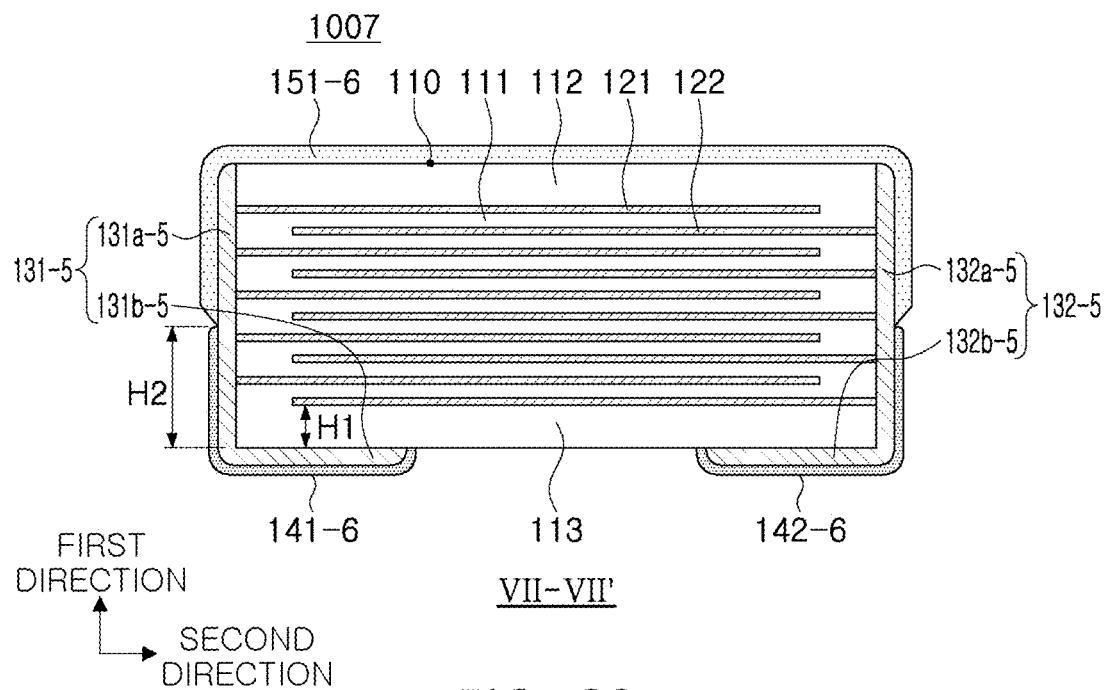
FIG. 22 is a cross-sectional view taken along line VII-VII' of FIG. 21.

FIG. 21 is a perspective view schematically illustrating a multilayer electronic component 1007 according to another exemplary embodiment of the present disclosure; and FIG. 22 is a cross-sectional view taken along line VII-VII' of FIG. 21.

Referring to FIGS. 21 and 22, in the multilayer electronic component 1007 according to another exemplary embodiment of the present disclosure, first or second plating layer 141-6 or 142-6 may have an average thickness t1 smaller than an average thickness t2 of an insulating layer 151-6.

The insulating layer 151-6 may serve to prevent the penetration of the external moisture or plating solution. However, the insulating layer 151-6 may have weak connectivity with the plating layer 141-6 or 142-6, which may cause delamination of the plating layer 141-6 or 142-6. When the plating layer is delaminated, adhesion force of the multilayer electronic component with the board 180 may be reduced. Here, the delamination of the plating layer 141-6 or 142-6 may indicate that the plating layer is partially dropped or physically separated from the external electrode 131-5 or 132-5. The connectivity between the plating layer and the insulating layer may be weak. In this case, it may increase a possibility that a gap between interfaces of the insulating layer and the plating layer is widened or that a foreign material may infiltrate, which may allow the plating layer to be vulnerable to an external impact and then delaminated.

According to another exemplary embodiment of the present disclosure, the plating layer may have the average thickness t1 made smaller than the average thickness t2 of the insulating layer, thereby reducing an area where the plating layer and the insulating layer are in contact with each other. It is thus possible to suppress the occurrence of the delamination, thereby improving the adhesion force of the multilayer electronic component 1000 with the board 180.

The average thickness t1 of the first or second plating layer 141-6 or 142-6 may be a value obtained by averaging its thicknesses measured at five equally spaced points on the first or second connection portion 131a-5 or 132a-5 or the first and second band portion 131b-5 or 132b-5, and the average thickness t2 of the insulating layer 151-6 may be a value obtained by averaging its thicknesses measured at five equally spaced points on the first or second connection portion 131a-5 or 132a-5.

Figure 23:
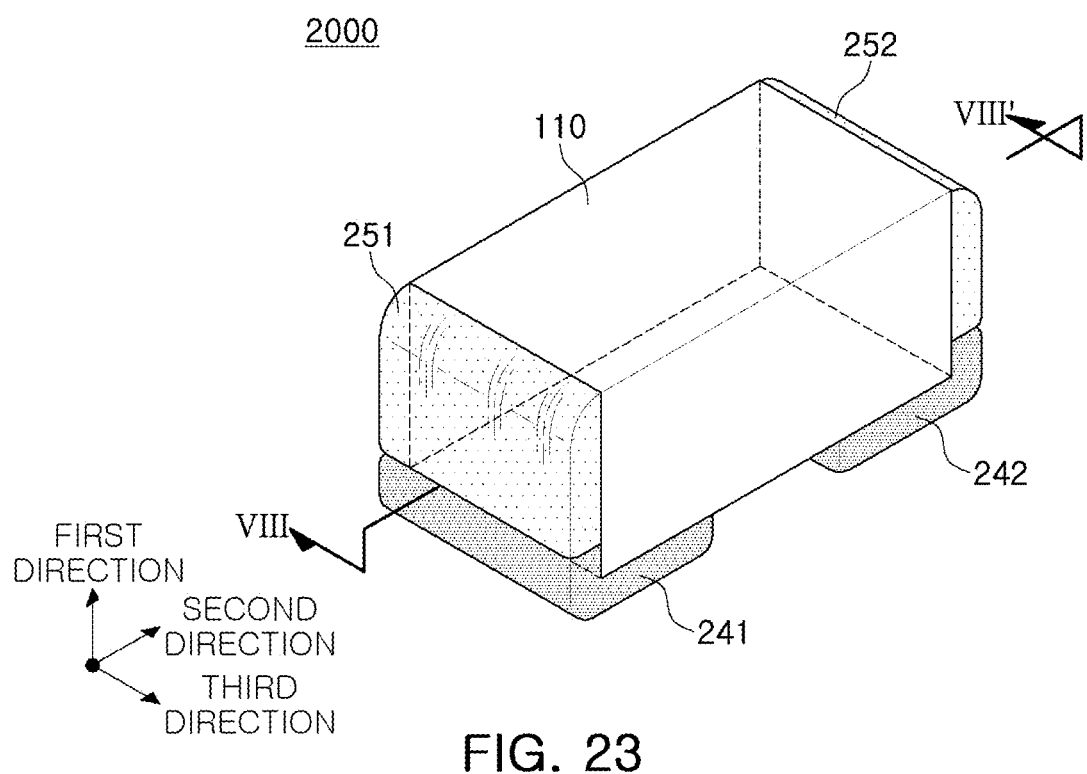
FIG. 23 is a perspective view schematically illustrating a multilayer electronic component according to another exemplary embodiment of the present disclosure.
Figure 24:
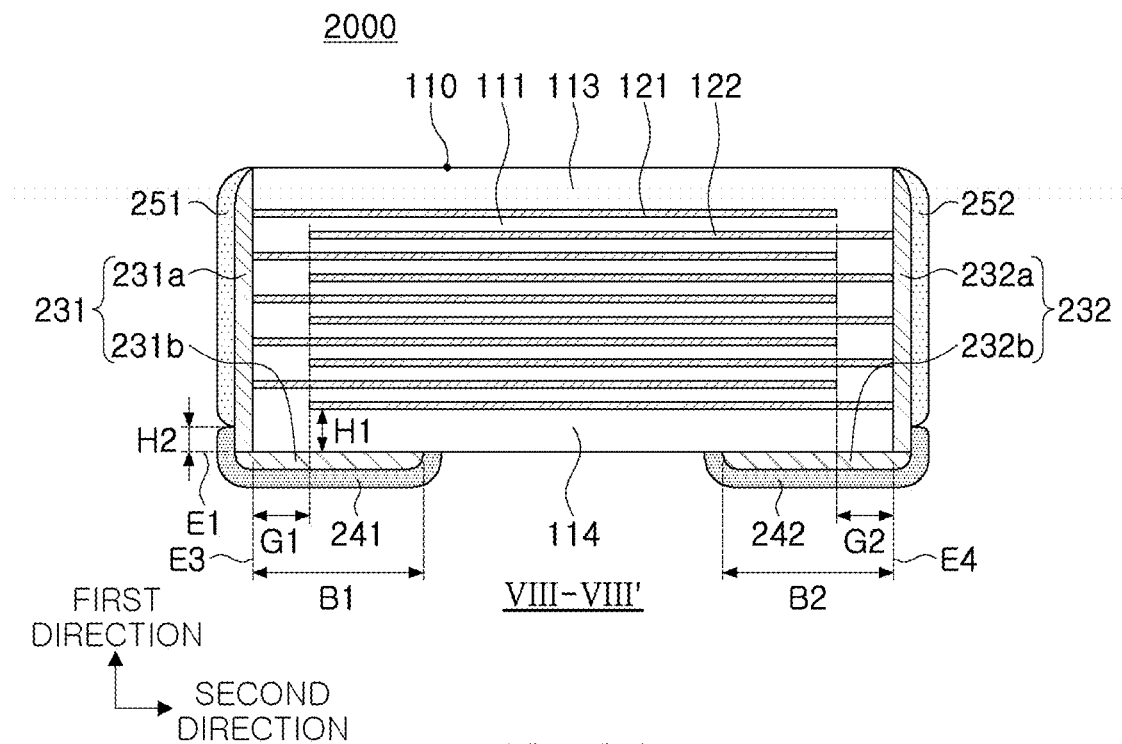
FIG. 24 is a cross-sectional view taken along line VIII-VIII' of FIG. 23.

FIG. 23 is a perspective view schematically illustrating a multilayer electronic component 2000 according to another exemplary embodiment of the present disclosure; and FIG. 24 is a cross-sectional view taken along line VIII-VIII' of FIG. 23.

Hereinafter, a multilayer electronic component 2000 according to another exemplary embodiment of the present disclosure is described in detail with reference to FIGS. 23 and 24. However, contents overlapping those described above are omitted to avoid redundant description.

The multilayer electronic component 2000 according to another exemplary embodiment of the present disclosure may include: a body 110 including a dielectric layer 111 and first and second internal electrodes 121 and 122 alternately disposed while having the dielectric layer interposed therebetween, and including first and second surfaces 1 and 2 opposing each other in the first direction, third and fourth surfaces 3 and 4 connected to the first and second surfaces and opposing each other in the second direction, and fifth and sixth surfaces 5 and 6 connected to the first to fourth surfaces and opposing each other in the third direction; a first external electrode 231 including a first connection electrode 231a disposed on the third surface and a first band electrode 231b disposed on the first surface and connected to the first connection electrode; a second external electrode 232 including a second connection electrode 232a disposed on the fourth surface and a second band electrode 232b disposed on the first surface and connected to the second connection electrode; a first insulating layer 251 disposed on the first connection electrode; a second insulating layer 252 disposed on the second connection electrode; a first plating layer 241 disposed on the first band electrode; and a second plating layer 242 disposed on the second band electrode, wherein an end of the first or second plating layer and an end of the first or second insulating layer are in contact with each other at their contact point on the first or second external electrode, and the end of the first or second plating layer and the end of the first or second insulating layer may each have a thickness smaller toward the contact point.

The first connection electrode 231a may be disposed on the third surface 3 to be connected to the first internal electrode 121, and the second connection electrode 232a may be disposed on the fourth surface 4 to be connected to the second internal electrode 122. In addition, the first insulating layer 251 may be disposed on the first connection electrode 231a, and the second insulating layer 252 may be disposed on the second connection electrode 232a.

Conventionally, the external electrode may be mainly formed using a paste including the conductive metal, i.e., a method in which an exposed surface of the internal electrode of the body is dipped into the paste. However, the external electrode formed by the dipping method may have an excessive thickness in a central portion thereof in the thickness direction. In addition, even excluding this thickness imbalance problem of the external electrode formed by the dipping method, the internal electrode may be exposed to the third or fourth surface of the body. Therefore, the external electrode disposed on the third or fourth surface may have a predetermined thickness or more to suppress the penetration of moisture and the plating solution through the external electrode.

On the other hand, the present disclosure may include the insulating layer 251 or 252 disposed on the connection electrode 231a or 232a, thereby ensuring sufficient reliability even when the connection electrode 231a or 232a on the third or fourth surface to which the internal electrode is exposed has a smaller thickness.

The first and second connection electrodes 231a and 232a may each have a shape corresponding to those of the third and fourth surfaces, and the surfaces of the first and second connection electrode 231a or 232a, facing the body 110, may each have the same area as those of the third and fourth surfaces of the body 110. The first and second connection electrodes 231a and 232a may each be disposed not to deviate from the third and fourth surfaces 3 and 4. The connection electrode 231a or 232a may not be extended to the first, second, fifth or sixth surface 1, 2, 5 or 6 of the body 110. In detail, the first or second connection electrode 231a or 232a in another exemplary embodiment may be spaced apart from the fifth and sixth surfaces. Accordingly, it is possible to minimize the volume of the external electrode while ensuring sufficient connectivity between the internal electrode 121 or 122 and the external electrode 231 or 232, thereby increasing the capacitance of the multilayer electronic component 2000 per unit volume.

In this regard, the first or second connection electrode 231*a* or 232*a* may be spaced apart from the second surface 2. That is, none of the external electrodes 231 and 232 may be disposed on the second surface to further minimize the volumes of the external electrodes 231 and 232, thereby further increasing the capacitance of the multilayer electronic component 2000 per unit volume.

However, the connection electrode 231*a* or 232*a* may include a corner portion extended to a corner of the body 110. That is, in another exemplary embodiment, the first connection electrode may include the corner portions (not shown) extended to the 1-3 corner and the 2-3 corner, and the second connection electrode may include the corner portions (not shown) extend to the 1-4 corner and the 2-4 corner.

In addition, the connection electrode 231*a* or 232*a* may have a uniform and low thickness compared to the external electrode formed by the conventional dipping method.

A method of forming the connection electrode 231*a* or 232*a* is not particularly limited. For example, the connection electrode may be formed by transferring a sheet including the conductive metal or an organic material such as a binder on the third or fourth surface. However, the connection electrode is not limited thereto, and may be formed by plating the conductive metal on the third or fourth surface. That is, the connection electrode 231*a* or 232*a* may be a fired layer formed by firing the conductive metal or the plating layer.

The thickness of the connection electrode 231*a* or 232*a* is not particularly limited, and may be 2 to 7 μm for example. Here, the thickness of the connection electrode 231*a* or 232*a* may indicate a maximum thickness, and indicate a size of the connection electrode 231*a* or 232*a* in the second direction.

In another exemplary embodiment, the first and second connection electrode 231*a* or 232*a* may include the same metal and glass as those included in the internal electrode 121 or 122. The first and second connection electrode 231*a* or 232*a* may include the same metal as the metal included in the internal electrode 121 or 122, thus having improved electrical connectivity with the internal electrodes 121 and 122, and the first and second connection electrode 231*a* or 232*a* may include glass, thus having improved bonding force with the body 110 and/or the insulating layer 251 or 252. Here, nickel (Ni) may be the same metal as the metal included in the internal electrode 121 or 122.

The first and second insulating layers 251 and 252 may each be disposed on the first and second connection electrodes 231*a* and 232*a*, thus serving to prevent the plating layer from being formed on the first and second connection electrodes 231*a* and 232*a*. In addition, the first or second insulating layer 251 or 252 may improve a sealing characteristic, thus serving to minimize the penetration of the external moisture or the plating solution.

The first or second insulating layer 251 or 252 may include a glass material having the excellent resistance to the plating solution, for example, the glass material including silicon (Si). However, the insulating layer is not limited thereto, and may include a material having strength to protect the multilayer electronic component 1000 from the tensile stress which is caused by the thermal contraction. In addition, the insulating layer 251 or 252 may include one component or a plurality of components, and may include one or more selected from titanium based oxide ($TiO_2$), barium titanate ($BaTiO_3$), aluminum oxide ($Al_2O_3$), silicon dioxide ($SiO_2$), barium oxide (BaO) or the like as an additive to improve a bonding force thereof with the body 110 or with the external electrodes 231 and 232.

The first or second band electrode 231*b* or 232*b* may be disposed on the first surface 1 of the body 110. The first and second band electrodes 231*b* and 232*b* may each be in contact with the first and second connection electrodes 231*a* and 232*a*, and thus each be electrically connected to the first and second internal electrodes 121 and 122.

The external electrode formed by the conventional dipping method may have a large thickness on the third or fourth surface, also be partially extended to the first, second, fifth and sixth surfaces, and thus have difficulty in securing a high effective volume ratio.

On the other hand, another exemplary embodiment of the present disclosure may have the first and second connection electrode 231*a* or 232*a* disposed on the surface to which the internal electrode is exposed, and the first or second band electrode 231*b* or 232*b* disposed on the surface on which the multilayer electronic component is mounted on the board, thereby ensuring the high effective volume ratio.

Meanwhile, when the internal electrodes 121 and 122 are stacked on each other in the first direction, the multilayer electronic component 2000 may be horizontally mounted on the board so that the internal electrodes 121 and 122 are parallel to the surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The first or second band electrode 231*b* or 232*b* may be made of any material as long as the material has the electrical conductivity such as the metal, and may use the specific material determined in consideration of the electrical characteristic, the structural stability or the like. For example, the first or second band electrode 231*b* or 232*b* may be a fired electrode including the conductive metal and glass, and formed using a method of applying a paste including the conductive metal and glass to the first surface of the body. However, the band electrode is not limited thereto, and may be a plating layer in which the conductive metal is plated on the first surface of the body.

The conductive metal included in the first or second band electrode 231*b* or 232*b* may use the material having the excellent electrical conductivity, and is not particularly limited. For example, the conductive metal may be at least one of nickel (Ni), copper (Cu) and alloys thereof, and may include the same metal as the metal included in the internal electrode 121 or 122.

In another exemplary embodiment, an end of the first or second plating layer 241 or 242 and an end of the first or second insulating layer 251 or 252 may be in contact with each other at their contact point on the first or second external electrode 231 or 232, and the end of the first or second plating layer 241 or 242 and the end of the first or second insulating layer 251 or 252 may each have a thickness smaller toward the contact point.

Accordingly, it is possible to minimize an area where the first or second plating layer 241 or 242 are in contact with the first or second insulating layer 251 or 252 even when an average thickness of the first or second plating layer 241 or 242 and an average thickness of the first or second insulating layer 251 or 252 are substantially the same as each other, thus improving the total bonding force of the multilayer electronic component 2000.

In another exemplary embodiment, the end of the first or second plating layer 241 or 242 and the end of the first or second insulating layer 251 or 252 may be in contact with each other to form a recess having a concave shape toward the body 110. Accordingly, it is possible to minimize the area where the first or second plating layer 241 or 242 and the insulating layer 251 or 252 are in contact with each other, thereby reducing the possibility of occurrence of the delamination, and improving the adhesion force of the multilayer electronic component 2000.

In another exemplary embodiment, $1/20 \le t3/t2 \le 1/5$ when t2 indicates an average thickness of the insulating layer, and t3 indicates an average size of the insulating layer in the second direction, measured from a point positioned on an outermost tip in the second direction among the contact points to an outer surface of the first or second external electrode. Accordingly, it is possible to improve the adhesion force of the multilayer electronic component 2000 and the resistance to the penetration of the external moisture.

In another exemplary embodiment, the end of the first or second plating layer 241 or 242 and the end of the first or second insulating layer 251 or 252 may be in contact with each other below the extension line of the first surface. In this case, it is possible to prevent or minimize the formation of the solder fillet on the third and fourth surfaces of the multilayer electronic component mounted on the board, thereby reducing the occurrence rate of a short circuit due to solder between the multilayer electronic components. It is thus possible to further minimize the gap between the multilayer electronic components mounted on the board, thereby significantly improving the mounting density of the multilayer electronic components on the board.

In another exemplary embodiment, the first or second insulating layer 251 or 252 may be extended from the first or second connection electrode 231a or 232a to a portion of the first or second band electrode 231b or 232b. In this case, the end of the first or second plating layer 241 or 242 and the end of the first or second insulating layer 251 or 252 may be in contact with each other at their contact point on the first or second band electrode 231b or 232b. Accordingly, it is possible to prevent the formation of the solder fillet on the connection portion when the multilayer electronic component is mounted on the board, thereby further reducing the occurrence rate of the short circuit due to the solder between the multilayer electronic components. It is thus possible to further minimize the gap between the multilayer electronic components mounted on the board, thereby significantly improving the mounting density of the multilayer electronic components on the board.

Meanwhile, in another exemplary embodiment, in order to ensure the sealing characteristic and a higher strength, the first external electrode 231 may further include a third band electrode (not shown) disposed on the second surface 2 and connected to the first connection electrode 231a, and the second external electrode 232 may further include a fourth band electrode (not shown) disposed on the second surface 2 and connected to the second connection electrode 232a.

In another exemplary embodiment, $B1 \le G1$, $B3 \le G1$, $B2 \ge G2$ and $B4 \le G2$ when B1 indicates a distance from the extension line E3 of the third surface to an end of the first band electrode 231b, B2 indicates a distance from the extension line E4 of the fourth surface to an end of the second band electrode 232b, B3 indicates a distance from the extension line of the third surface to an end of the third band electrode (not shown), B4 indicates a distance from the extension line of the fourth surface to an end of the fourth band electrode (not shown), G1 indicates an average size of a region in the second direction, where the third surface and the second internal electrode 122 are spaced apart from each other, and G2 indicates an average size of a region in the second direction, where the fourth surface and the first internal electrode 121 are spaced apart from each other. Accordingly, it is possible to minimize the volume of the external electrode, thereby increasing the capacitance of the multilayer electronic component 2000 per unit volume and to simultaneously increase the area where the multilayer electronic component is in contact with the solder when the multilayer electronic component is mounted on the board, thereby improving the adhesion force.

However, it is not intended to limit the present disclosure to $B1 \ge G1$, $B3 \le G1$, $B2 \ge G2$ and $B4 \le G2$, and a case where $B1 \ge G1$, $B3 \ge G1$, $B2 \ge G2$ and $B4 \ge G2$ may also be included as another exemplary embodiment of the present disclosure. Accordingly, in another exemplary embodiment, $B1 \ge G1$, $B3 \ge G1$, $B2 \ge G2$, and $B4 \ge G2$ when B1 indicates the distance from the extension line E3 of the third surface to the end of the first band electrode 231b, B2 indicates the distance from the extension line E4 of the fourth surface to the end of the second band electrode 232b, B3 indicates the distance from the extension line of the third surface to the end of the third band electrode (not shown), B4 indicates the distance from the extension line of the fourth surface to the end of the fourth band electrode (not shown), G1 indicates the average size of the region in the second direction, where the third surface and the second internal electrode 122 are spaced apart from each other, and G2 indicates the average size of the region in the second direction, where the fourth surface and the first internal electrode 121 are spaced apart from each other.

The first or second plating layer 241 or 242 may be disposed on the first or second band electrode 231b or 232b. The first or second plating layer 241 or 242 may allow the multilayer electronic component to be more easily mounted on the board. The plating layer 241 or 242 is not limited to a particular type, may include at least one of nickel (Ni), tin (Sn), palladium (Pd) and alloys thereof, or may include a plurality of layers.

As a more specific example of the plating layer 241 or 242, the plating layer 241 or 242 may be a nickel (Ni) plating layer or a tin (Sn) plating layer for example, and may have the Ni plating layer and the Sn plating layer sequentially formed on the first or second band electrode 231b or 232b.

In another exemplary embodiment, the first and second plating layers 241 and 242 may respectively be extended to partially cover the first and second connection electrodes 231a and 232a.

$H1 > H2$ when H1 indicates the average size of the region in the first direction, measured from the first surface 1 to the internal electrode disposed closest to the first surface 1 among the first and second internal electrodes 121 and 122, and H2 indicates an average size of the first or second plating layer 241 or 242 in the first direction, measured from the extension line of the first surface 1 to an end of the plating layer disposed on the first or second connection electrode 231a or 232a. Accordingly, it is possible to suppress the plating solution from penetrating into the internal electrode during the plating process, thereby allowing the multilayer electronic component to have the improved reliability.

In another exemplary embodiment, the first and second insulating layers 251 and 252 may respectively be in direct contact with the first and second connection electrodes 231a and 232a, and the first or second connection electrode 231a or 232a may include the conductive metal and glass.

Accordingly, none of the plating layers 241 and 242 may be disposed in a region where the insulating layer 251 or 252 is disposed on the outer surface of the first or second connection electrode 231a or 232a, thereby effectively suppressing the erosion of the external electrode by the plating solution.

In another exemplary embodiment, the first and second insulating layers 251 and 252 may respectively be in direct contact with the first and second connection electrodes 231a and 232a, and the first or second connection electrode 231a or 232a may include the conductive metal and resin. Accordingly, none of the plating layers 241 and 242 may be disposed in the region where the insulating layer 251 or 252 is disposed on the outer surface of the first or second connection electrode 231a or 232a, thereby effectively suppressing the erosion of the external electrode by the plating solution.

In another exemplary embodiment, the first plating layer 241 may cover the end of the first insulating layer 251, disposed on the first external electrode 231, and the second plating layer 242 may cover the end of the second insulating layer 252, disposed on the second external electrode 232. Accordingly, it is possible to strengthen a bonding force of the insulating layer 251 or 252 and the plating layer 241 or 242, thereby improving the reliability of the multilayer electronic component 2000. In addition, it is possible to first form first or second insulating layer 251 or 252 before forming the plating layer 241 or 242 on the external electrode 231 or 232, thereby more reliably suppressing the penetration of the plating solution in the process of forming the plating layer. As the insulating layer is formed before the plating layer, the plating layer 241 or 242 may cover the end of the insulating layer 251 or 252.

In another exemplary embodiment, the first insulating layer 251 may cover an end of the first plating layer 241, disposed on the first external electrode 231, and the second insulating layer 252 may cover an end of the second plating layer 242, disposed on the second external electrode 232. Accordingly, it is possible to strengthen the bonding force of the insulating layer 251 or 252 and the plating layer 241 or 242, thereby improving the reliability of the multilayer electronic component 2000.

Figure 25:
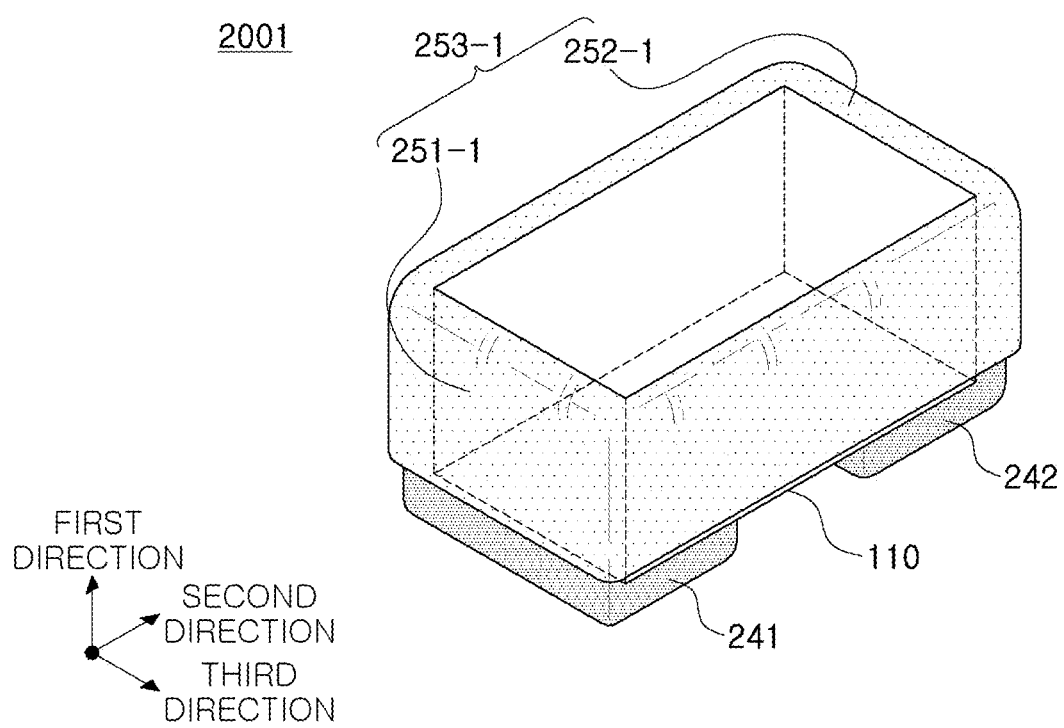
FIG. 25 illustrates a modified example of FIG. 23.

FIG. 25 illustrates a modified example 2001 of FIG. 23.

Referring to FIG. 25, in the modified example 2001 of the multilayer electronic component 2000 according to another exemplary embodiment of the present disclosure, first and second insulating layers 251-1 and 252-1 may be extended to the fifth and sixth surfaces 5 and 6 and connected to each other to be one insulating layer 253-1. Here, the insulating layer 253-1 formed by connecting the first and second insulating layers to each other may partially cover the fifth and sixth surfaces.

Figure 26:
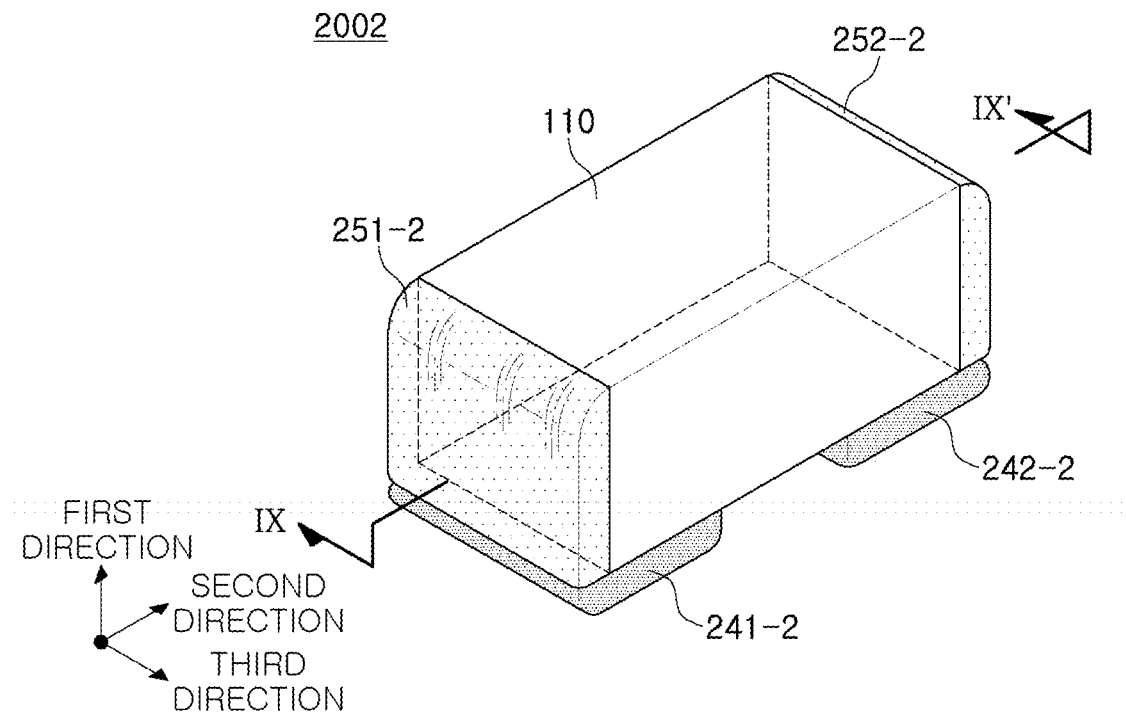
FIG. 26 is a perspective view schematically illustrating a multilayer electronic component according to another exemplary embodiment of the present disclosure.
Figure 27:
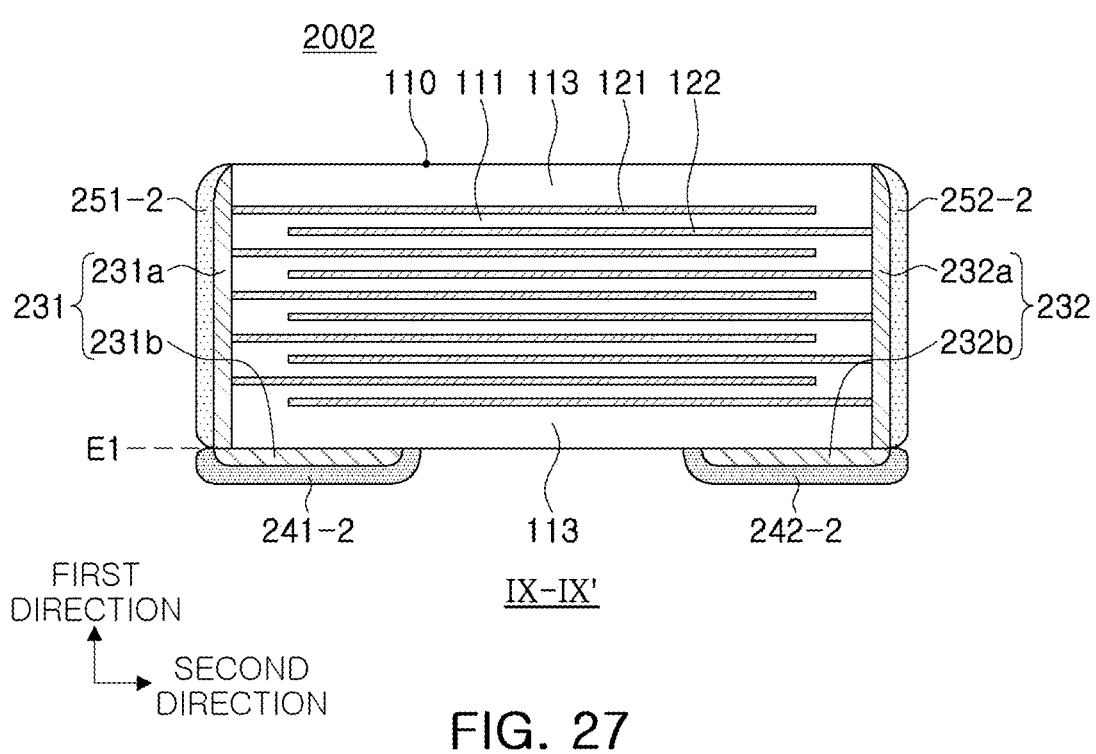
FIG. 27 is a cross-sectional view taken along line IX-IX' of FIG. 26.

FIG. 26 is a perspective view schematically illustrating a multilayer electronic component 2002 according to another exemplary embodiment of the present disclosure; and FIG. 27 is a cross-sectional view taken along line IX-IX' of FIG. 26.

Referring to FIGS. 26 and 27, the multilayer electronic component 2002 according to another exemplary embodiment of the present disclosure may have first and second plating layers 241-2 and 242-2 each disposed below the extension line of the first surface. Accordingly, it is possible to minimize the height of the solder when the multilayer electronic component is mounted on the board and to minimize the space in which the multilayer electronic component is mounted.

In addition, first and second insulating layers 251-2 and 252-2 may each be extended to below the extension line of the first surface to be in contact with the first and second plating layers 241-2 and 242-2.

Figure 28:
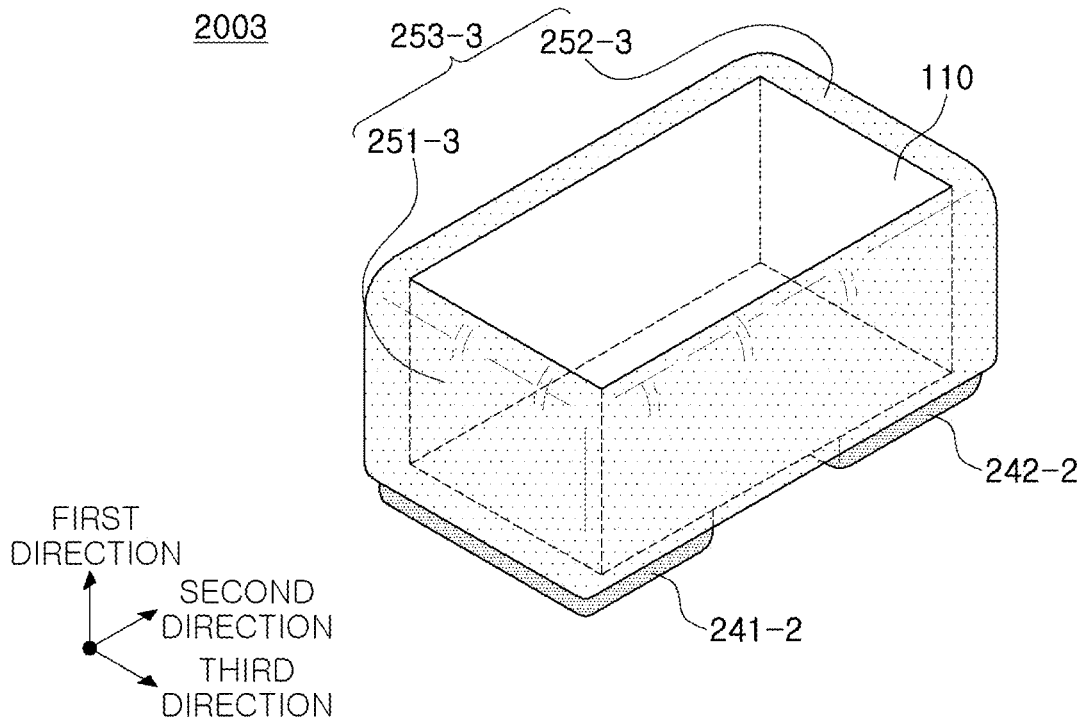
FIG. 28 illustrates a modified example of FIG. 26.

FIG. 28 illustrates a modified example 2003 of FIG. 26.

Referring to FIG. 28, in the modified example 2003 of the multilayer electronic component 2002 according to another exemplary embodiment of the present disclosure, first and second insulating layers 251-3 and 252-3 may be extended to the fifth and sixth surfaces 5 and 6 and connected to each other to be one insulating layer 253-3. Here, the insulating layer 253-3 formed by connecting the first and second insulating layers to each other may entirely cover the fifth and sixth surfaces.

Figure 29:
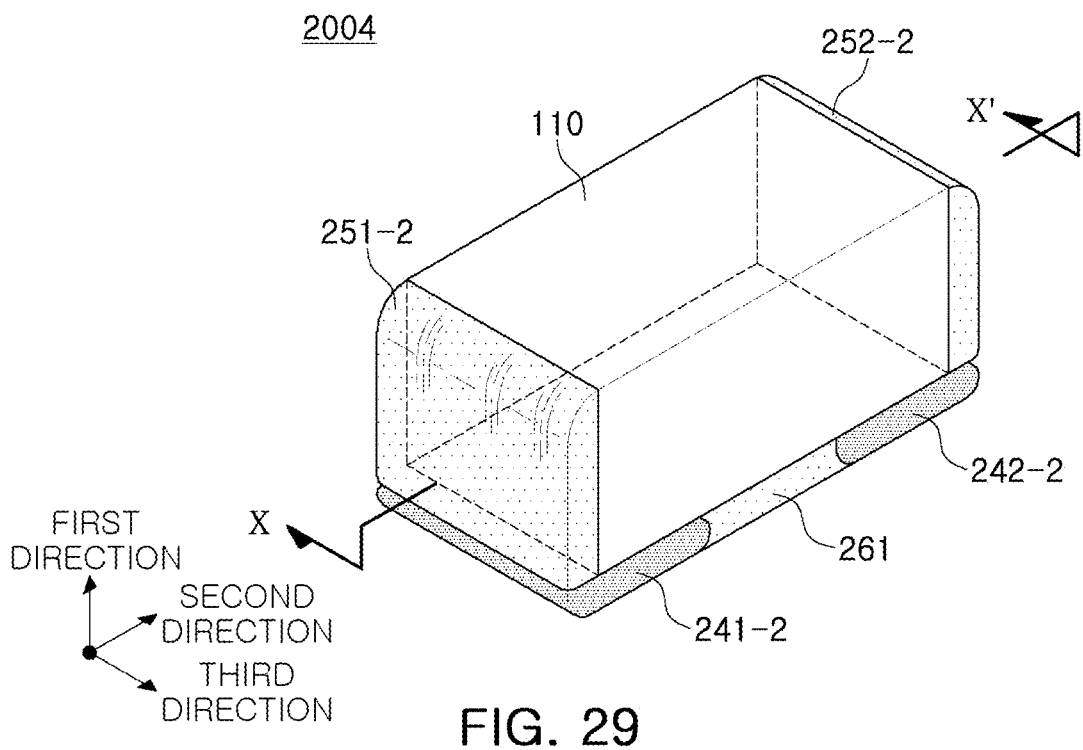
FIG. 29 is a perspective view schematically illustrating a multilayer electronic component according to another exemplary embodiment of the present disclosure.
Figure 30:
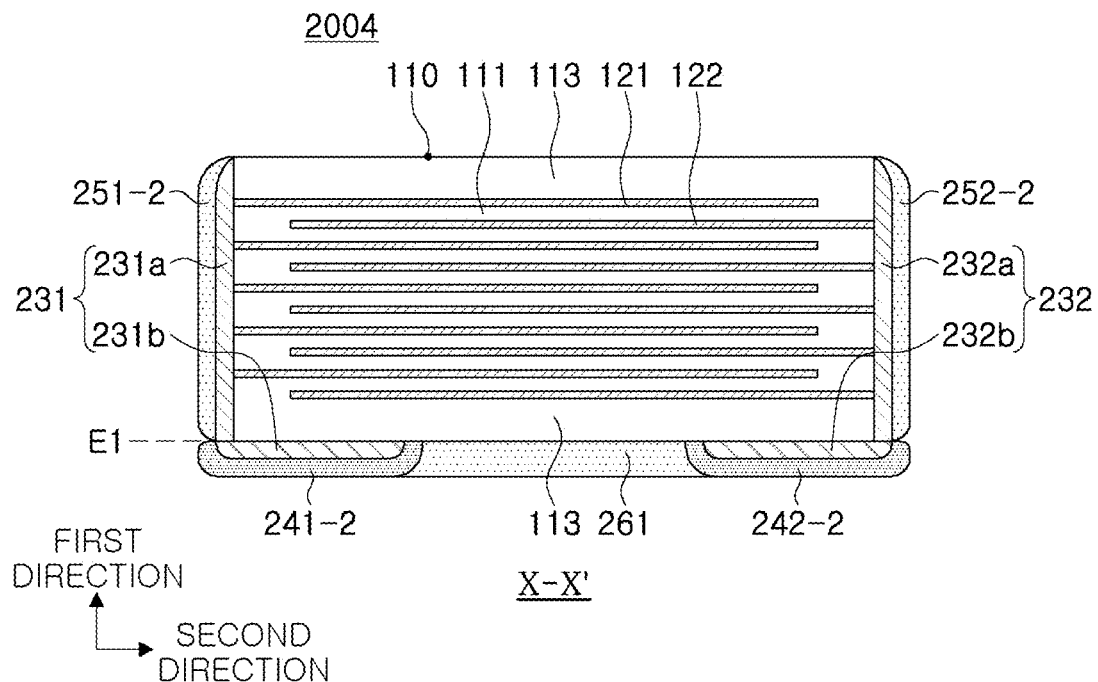
FIG. 30 is a cross-sectional view taken along line X-X' of FIG. 29.

FIG. 29 is a perspective view schematically illustrating a multilayer electronic component 2004 according to another exemplary embodiment of the present disclosure; and FIG. 30 is a cross-sectional view taken along line X-X' of FIG. 29.

Referring to FIGS. 29 and 30, the multilayer electronic component 2004 according to another exemplary embodiment of the present disclosure may further include an additional insulating layer 261 disposed on the first surface 1 and between the first band electrode 231b and the second band electrode 232b. Accordingly, it is possible to prevent the leakage current or the like which may occur between the first band electrode 231b and the second band electrode 232b under the high-voltage current.

The additional insulating layer 261 is not limited to a particular type. For example, the additional insulating layer 261 may include the glass material including silicon (Si) like the insulating layer 251. However, it is not necessary to limit the additional insulating layer 261 and the first or second insulating layer 251-2 or 252-2 to the same material, and the insulating layers may be made of materials different from each other. For example, the insulating layer may include one or more selected from epoxy resin, acrylic resin, ethyl cellulose or the like. In addition, the additional insulating layer 261 may include one or more selected from titanium based oxide ($TiO_2$), barium titanate ($BaTiO_3$), silicon dioxide ($SiO_2$), aluminum oxide ($Al_2O_3$), barium oxide (BaO) or the like as the additive in addition to the polymer resin. The additional insulating layer may thus have the improved bonding force with the body or the external electrode.

Figure 31:
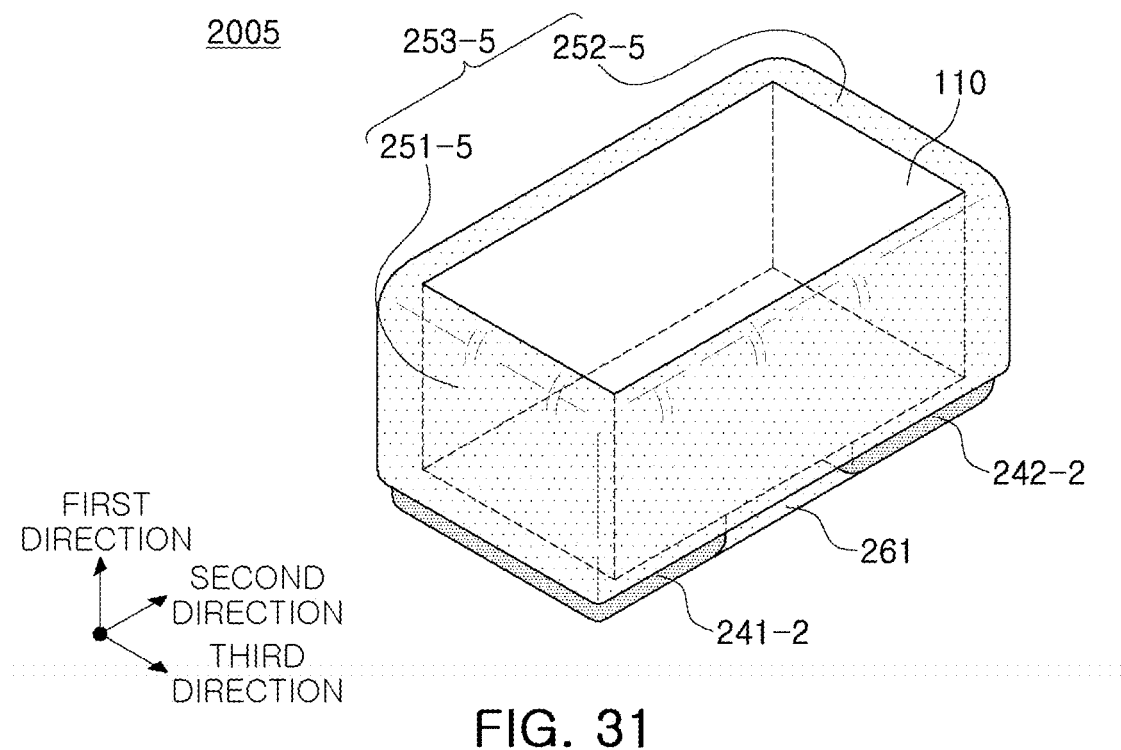
FIG. 31 illustrates a modified example of FIG. 29.

FIG. 31 illustrates a modified example 2005 of FIG. 29.

Referring to FIG. 31, in the modified example 2005 of the multilayer electronic component 2004 according to another exemplary embodiment of the present disclosure, first and second insulating layers 251-5 and 252-5 may be extended to the fifth and sixth surfaces 5 and 6 and connected to each other to be one insulating layer 253-5.

Figure 32:
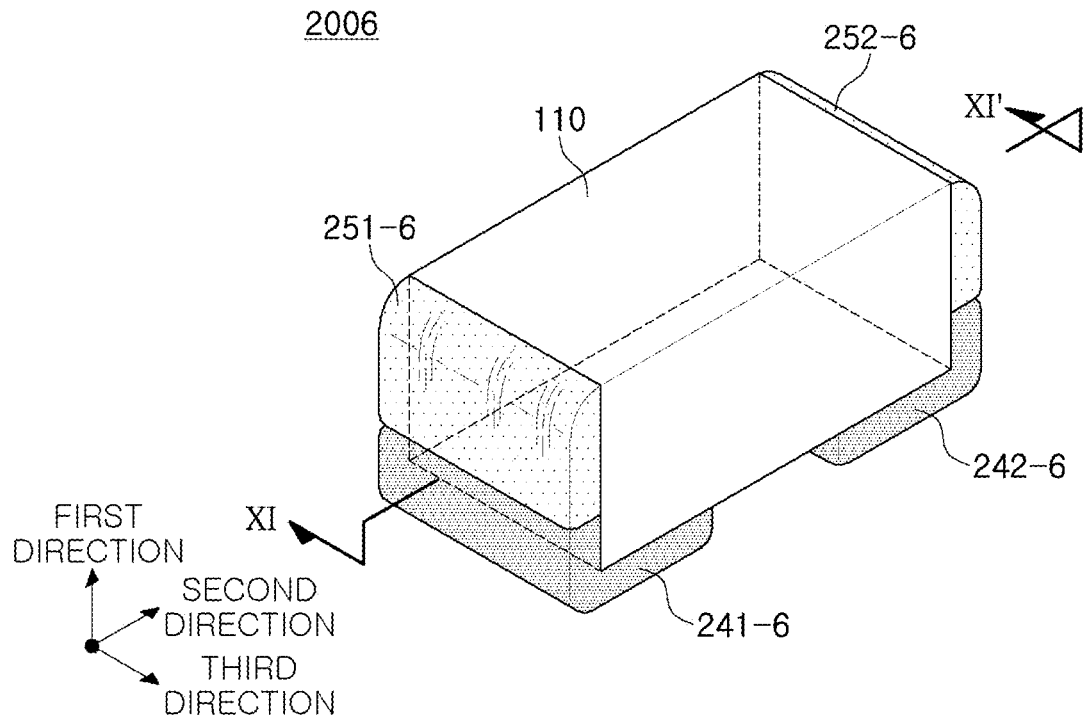
FIG. 32 is a perspective view schematically illustrating a multilayer electronic component according to another exemplary embodiment of the present disclosure.
Figure 33:
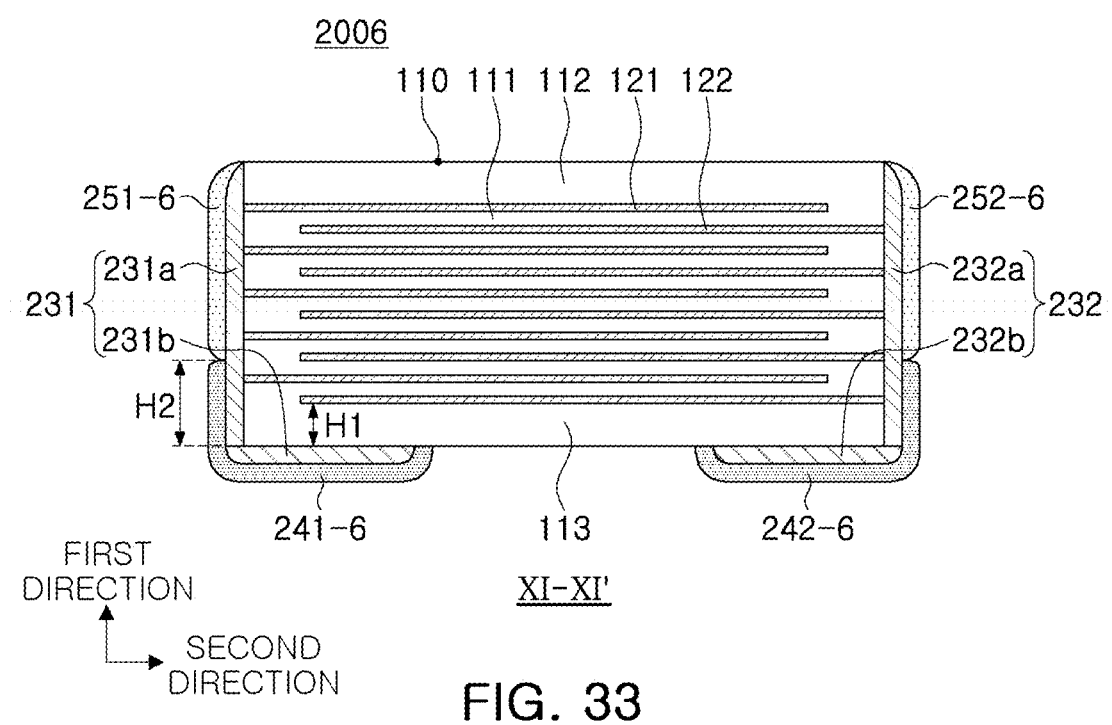
FIG. 33 is a cross-sectional view taken along line XI-XI' of FIG. 32.

FIG. 32 is a perspective view schematically illustrating a multilayer electronic component 2006 according to another exemplary embodiment of the present disclosure; and FIG. 33 is a cross-sectional view taken along line XI-XI' of FIG. 32.

Referring to FIGS. 32 and 33, the multilayer electronic component 2006 according to another exemplary embodiment may include a first insulating layer 251-6 disposed on the first connection electrode 231a and a second insulating layer 252-6 disposed on the second connection electrode 232a, wherein H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 241-6 or 242-6 in the first direction, measured from the extension line of the first surface 1 to an end of the plating layer disposed on the first or second connection electrode 231a or 232a. Accordingly, it is possible to improve the adhesion force by increasing the area where the multilayer electronic component is in contact with the solder when the multilayer electronic component is mounted on the board.

H2<T/2 when T indicates the average size of the body 110 in the first direction. That is, H1<H2<T/2. The reason is that the moisture resistance reliability improved by the insulating layer may be reduced when H2 is T/2 or more.

Figure 34:
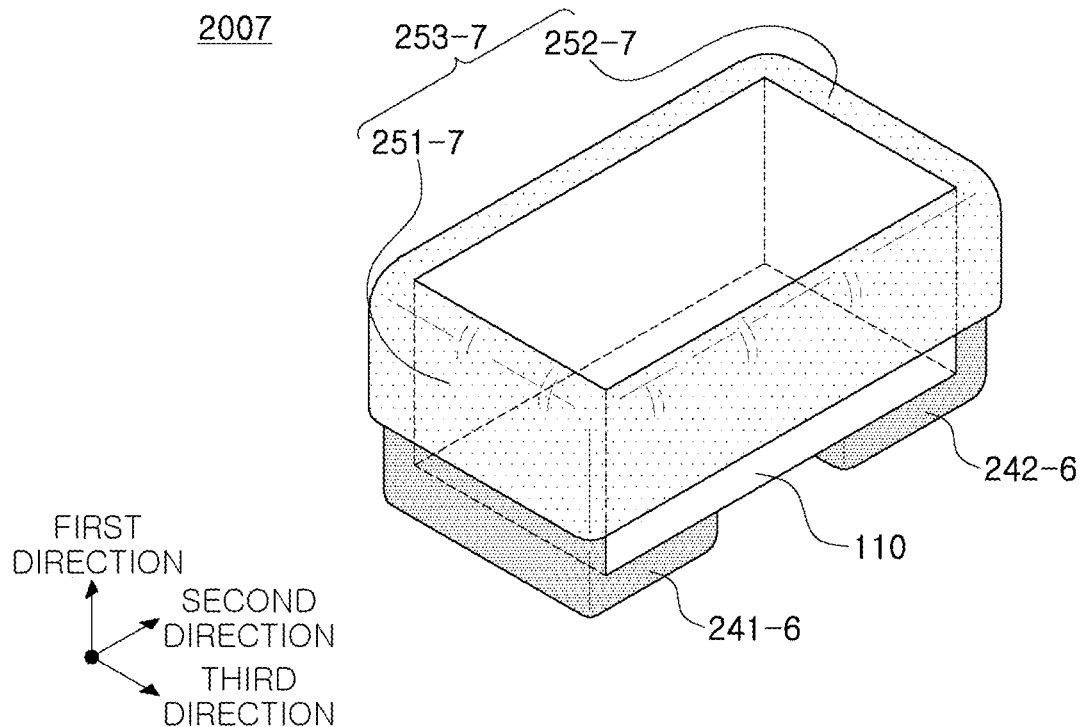
FIG. 34 illustrates a modified example of FIG. 32.

FIG. 34 illustrates a modified example 2007 of FIG. 32.

Referring to FIG. 34, in the modified example 2007 of the multilayer electronic component 2006 according to another exemplary embodiment of the present disclosure, first and second insulating layers 251-7 and 252-7 may be extended to the fifth and sixth surfaces 5 and 6 and connected to each other to be one insulating layer 253-7.

Figure 35:
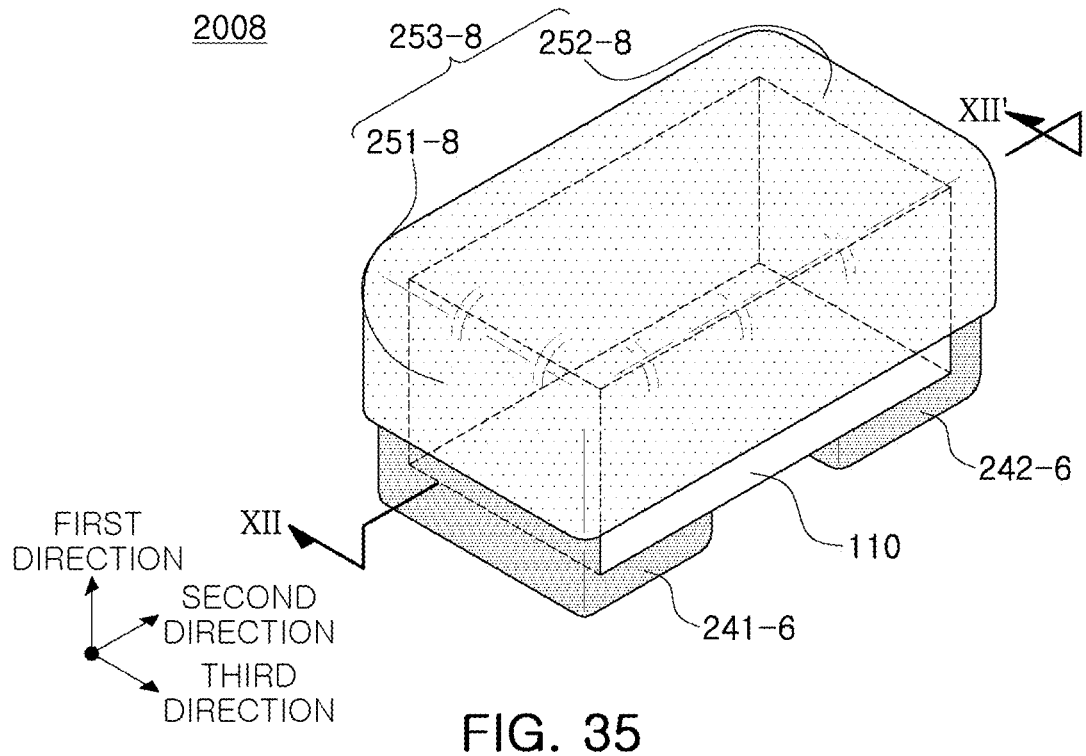
FIG. 35 is a perspective view schematically illustrating a multilayer electronic component according to another exemplary embodiment of the present disclosure.
Figure 36:
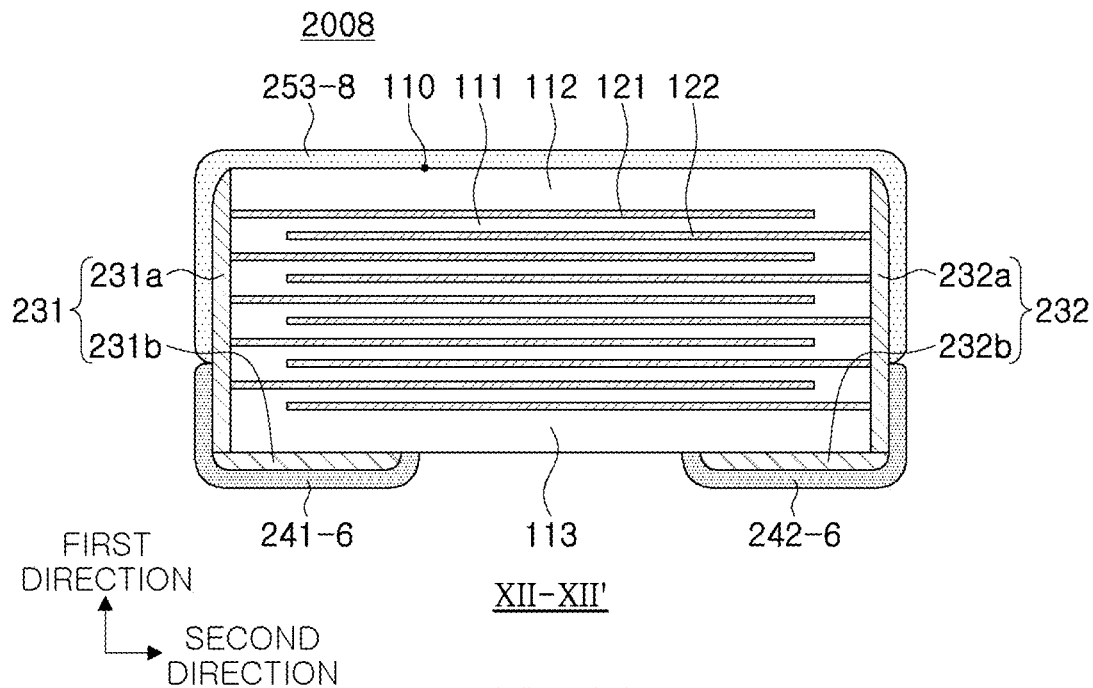
FIG. 36 is a cross-sectional view taken along line XII-XII' of FIG. 35.

FIG. 35 is a perspective view schematically illustrating a multilayer electronic component 2008 according to another exemplary embodiment of the present disclosure; and FIG. 36 is a cross-sectional view taken along line XII-XII' of FIG. 35.

Referring to FIGS. 35 and 36, in the multilayer electronic component 2008 according to another exemplary embodiment of the present disclosure, first and second insulating layers 251-8 and 252-8 may be extended to the second, fifth and sixth surfaces 2, 5 and 6 and connected to each other to be one insulating layer 253-8. As shown in FIG. 33, the insulating layer 253-8 may cover the entire second surface and the partial fifth and sixth surfaces.

Figure 37:
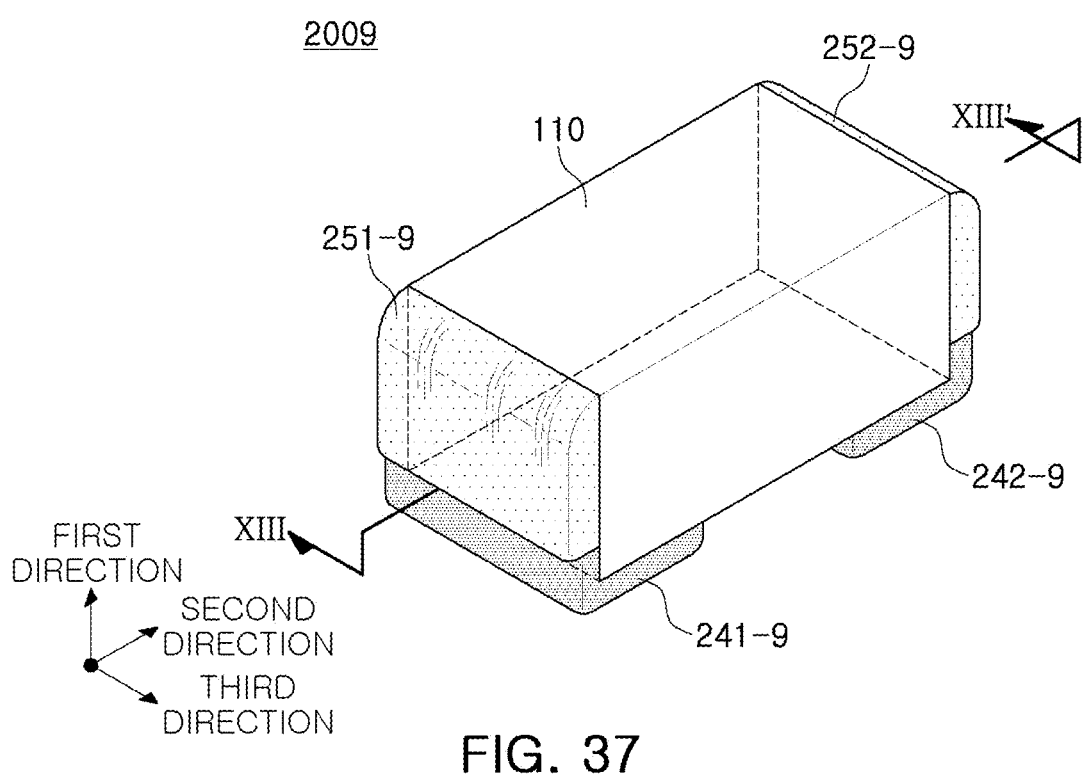
FIG. 37 is a perspective view schematically illustrating a multilayer electronic component according to another exemplary embodiment of the present disclosure.
Figure 38:
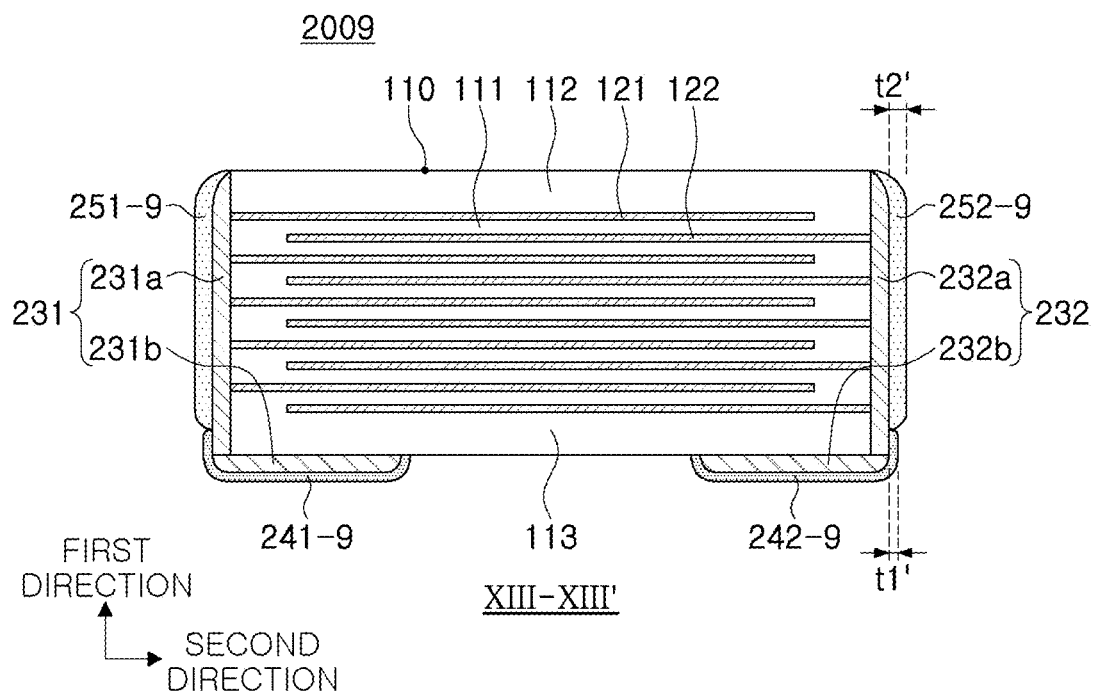
FIG. 38 is a cross-sectional view taken along line XIII-XIII' of FIG. 37.

FIG. 37 is a perspective view schematically illustrating a multilayer electronic component 2009 according to another exemplary embodiment of the present disclosure; and FIG. 38 is a cross-sectional view taken along line XIII-XIII' of FIG. 37.

Referring to FIGS. 37 and 38, in the multilayer electronic component 2009 according to another exemplary embodiment of the present disclosure, a first or second plating layer 241-9 or 242-9 may have an average thickness t1 smaller than an average thickness t2 of a first or second insulating layer 251-9 or 252-9.

According to another exemplary embodiment of the present disclosure, the first or second plating layer 241-9 or 242-9 may have the average thickness t1 made smaller than the average thickness t2 of the first or second insulating layer 251-9 or 252-9, thereby reducing the area where the plating layer and the insulating layer are in contact with each other. It is thus possible to suppress the occurrence of the delamination, thereby improving the adhesion force of the multilayer electronic component 2009 with the board 180.

The average thickness t1 of the first or second plating layer 241-9 or 242-9 may be a value obtained by averaging its thicknesses measured at five equally spaced points on the first or second connection electrode 231a or 232a, or the first or second band electrode 231b or 232b, and the average thickness t2 of the insulating layer 251-9 or 252-9 may be a value obtained by averaging its thicknesses measured at five equally spaced points on the first or second connection electrode 231a or 232a.

Figure 39:
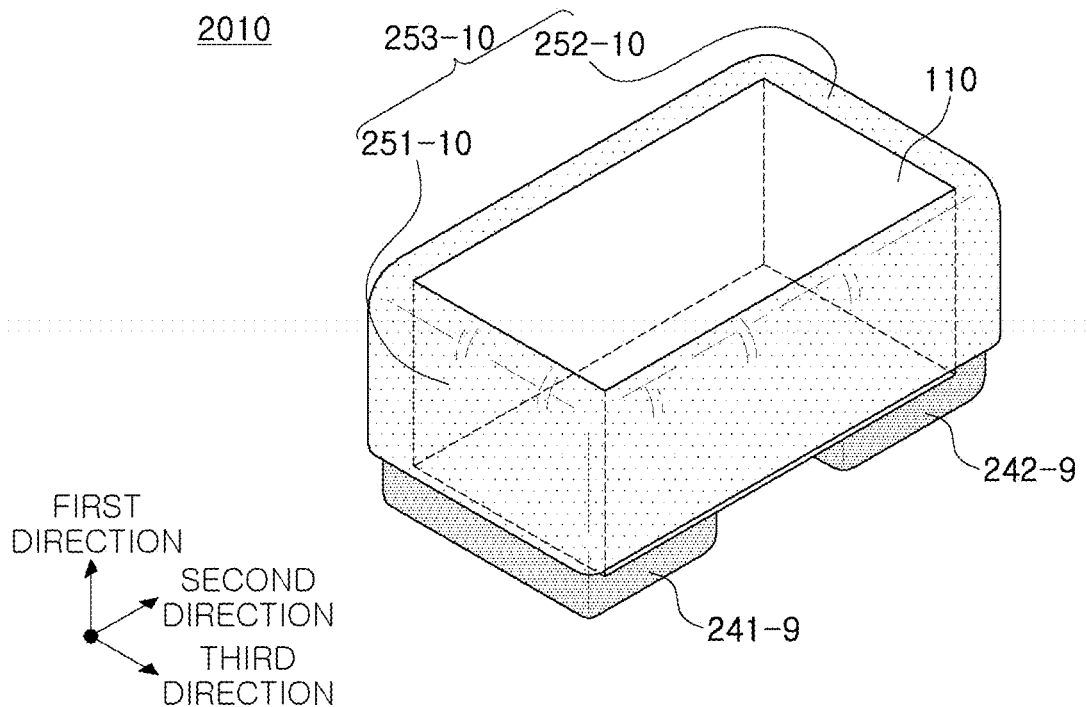
FIG. 39 illustrates a modified example of FIG. 37.

FIG. 39 illustrates a modified example 2010 of FIG. 37.

Referring to FIG. 39, in the modified example 2010 of the multilayer electronic component 2009 according to another exemplary embodiment of the present disclosure, first and second insulating layers 251-10 and 252-10 may be extended to the fifth and sixth surfaces 5 and 6 and connected to each other to be one insulating layer 253-10.

Figure 40:
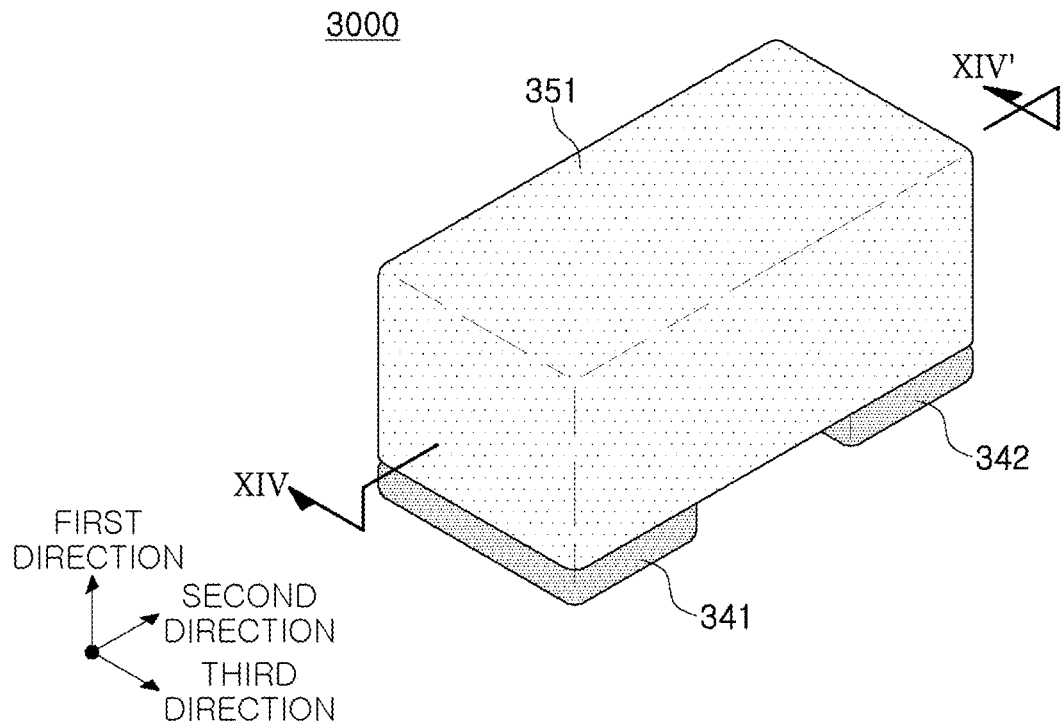
FIG. 40 is a perspective view schematically illustrating a multilayer electronic component according to another exemplary embodiment of the present disclosure.
Figure 41:
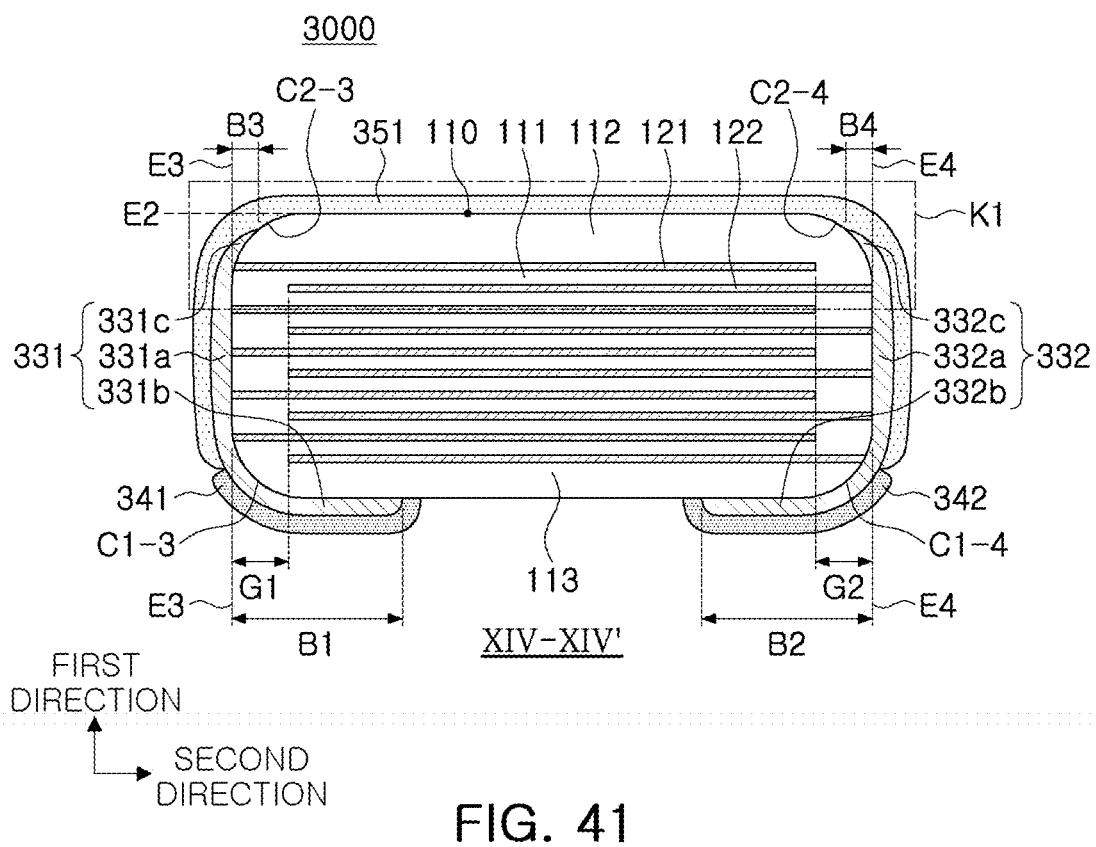
FIG. 41 is a cross-sectional view taken along line XIV-XIV' of FIG. 39.

FIG. 40 is a perspective view schematically illustrating a multilayer electronic component 3000 according to another exemplary embodiment of the present disclosure; FIG. 41 is a cross-sectional view taken along line XIV-XIV' of FIG. 39; and FIG. 42 is an enlarged view of a region K1 of FIG. 41.

Figure 42:
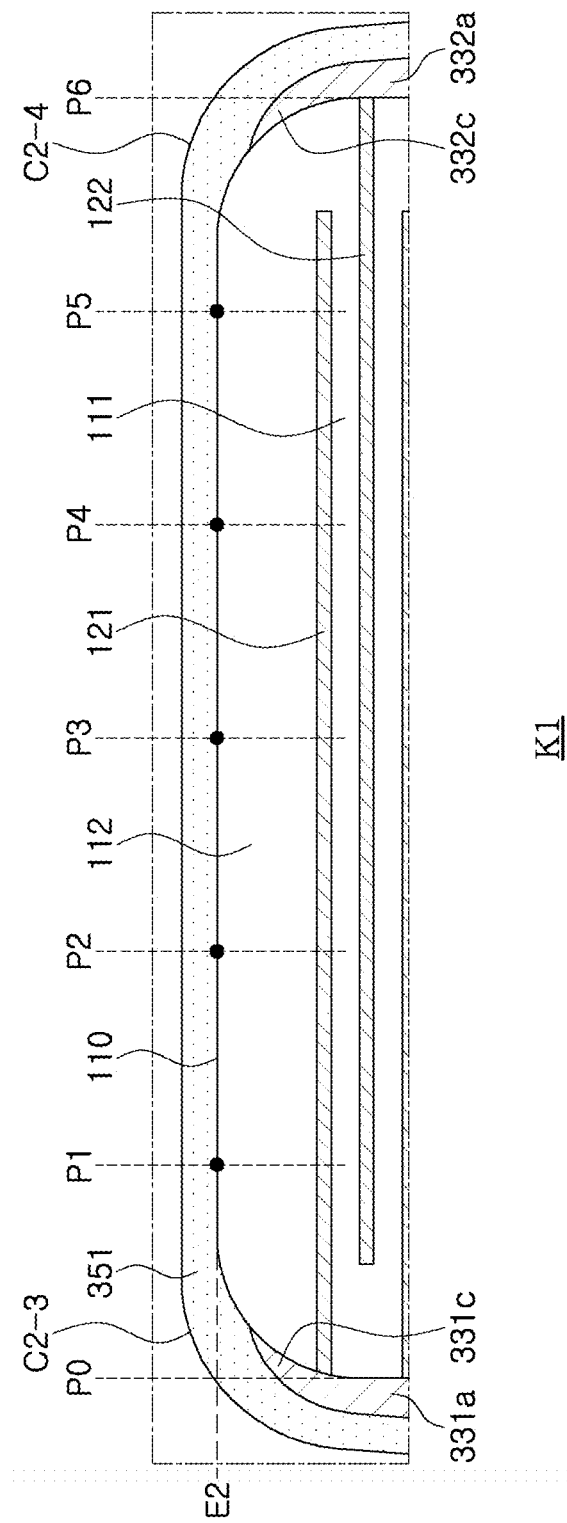
FIG. 42 is an enlarged view of a region K1 of FIG. 41.

Referring to FIGS. 40 through 42, the multilayer electronic component 3000 according to another exemplary embodiment of the present disclosure may include: a body 110 including a dielectric layer 111 and first and second internal electrodes 121 and 122 alternately disposed while having the dielectric layer interposed therebetween, and including first and second surfaces opposing each other in the first direction, third and fourth surfaces connected to the first and second surfaces and opposing each other in the second direction, and fifth and sixth surfaces connected to the first to fourth surfaces and opposing each other in the third direction; a first external electrode 331 including a first connection portion 331a disposed on the third surface, a first band portion 331b extending from the first connection portion onto a portion of the first surface, and a first corner portion 331c extending from the first connection portion onto a corner connecting the second and third surfaces of the body to each other; a second external electrode 332 including a second connection portion 332a disposed on the fourth surface, a second band portion 332b extending from the second connection portion onto a portion of the first surface, and a second corner portion 332c extending from the second connection portion onto a corner connecting the second and fourth surfaces of the body to each other; an insulating layer 351 disposed on the first and second connection portions 331a and 332a, and covering the second surface and the first and second corner portions; a first plating layer 341 disposed on the first band portion; and a second plating layer 342 disposed on the second band portion, wherein the insulating layer may include silicone-based resin.

In another exemplary embodiment, B3≤G1 and B4≤G2 when B3 indicates an average size of the first corner portion 331c in the second direction, measured from the extension line of the third surface to an end of the corner portion, B4 indicates an average size of the second corner portion 332c in the second direction, measured from the extension line of the fourth surface to an end of the corner portion, G1 indicates the average size of the region in the second direction, where the third surface and the second internal electrode are spaced apart from each other, and G2 indicates the average size of the region in the second direction, where the fourth surface and the first internal electrode are spaced apart from each other. Accordingly, it is possible to minimize volumes of the external electrodes 331 and 332, thereby increasing the capacitance of the multilayer electronic component 3000 per unit volume.

Here, B1≥G1 and B3≥G2 when B1 indicates an average size of the first band portion 331b in the second direction, measured from the extension line of the third surface to an end of the band portion, and B2 indicates an average size of the second band portion 332b in the second direction, measured from the extension line of the fourth surface to an end of the band portion. Accordingly, it is possible to improve the adhesion force by increasing the area where the multilayer electronic component is in contact with the solder when the multilayer electronic component is mounted on the board.

The multilayer electronic component 3000 according to another exemplary embodiment may include the body 110 including the dielectric layer 111 and the first and second internal electrodes 121 and 122 alternately disposed while having the dielectric layer interposed therebetween, and including the first and second surfaces opposing each other in the first direction, the third and fourth surfaces connected to the first and second surfaces and opposing each other in the second direction, the fifth and sixth surfaces connected to the first to fourth surfaces and opposing each other in the third direction. The body 110 of the multilayer electronic component 3000 may have the same configuration as the body 110 of the multilayer electronic component 1000, except that an end of the first or second surface of the body is contracted, as described below.

The external electrodes 331 and 332 may respectively be disposed on the third surface 3 and fourth surface 4 of the body 110. The external electrodes 331 and 332 may be the first and second external electrodes 331 and 332 respectively disposed on the third and fourth surfaces 3 and 4 of the body 110, and respectively connected to the first and second internal electrodes 121 and 122.

The external electrodes 331 and 332 may be the first external electrode 331 including the first connection portion 331a disposed on the third surface, the first band portion 331b extending from the first connection portion onto a portion of the first surface, and the first corner portion 331c extending from the first connection portion onto the corner connecting the second and third surfaces to each other; and the second external electrode 332 including the second connection portion 332a disposed on the fourth surface, the second band portion 332b extending from the second connection portion onto a portion of the first surface, and the second corner portion 332c extending from the second connection portion onto the corner connecting the second and fourth surfaces to each other. The first connection portion 331a may be connected to the first internal electrode 121 on the third surface, and the second connection portion 332a may be connected to the second internal electrode 122 on the fourth surface.

In another exemplary embodiment, the first or second connection portion 331a or 332a may be spaced apart from the fifth and sixth surfaces. Accordingly, the multilayer electronic component 3000 may have a further smaller size by minimizing proportions of the external electrodes 331 and 332.

The margin regions in which none of the internal electrodes 121 and 122 is disposed may overlap each other on the dielectric layer 111, and the step difference may thus occur due to the thicknesses of the internal electrodes 121 and 122. Accordingly, the corners connecting the first surface and the third to sixth surfaces and/or the corners connecting the second surface and the third to sixth surface may be contracted toward the center of the body 110 in the first direction, based on the first surface or the second surface. Alternatively, due to the contraction phenomenon in the sintering process of the body, the corners connecting the first surface 1 and the third to sixth surfaces 3, 4, 5 and 6 to each other and/or the corners connecting the second surface 2 and the third to sixth surfaces 3, 4, 5 and 6 to each other may be contracted toward the center of the body 110 in the first direction, based on the first surface or the second surface. Alternatively, the separate rounding process may be performed to round the corners connecting respective surfaces of the body 110 to each other in order to prevent the chipping defect or the like, and the corners connecting the first and third to sixth surfaces to each other and/or the corners connecting the second surface and the third to sixth surfaces to each other may thus each have the round shape.

The corners may include the 1-3 corner C1-3 connecting the first surface and the third surface to each other, the 1-4 corner C1-4 connecting the first surface and the fourth surface to each other, the 2-3 corner C2-3 connecting the second surface and the third surface to each other, and the 2-4 corner C2-4 connecting the second surface and the fourth surface to each other. In addition, the corners may include the 1-5 corner connecting the first surface and the fifth surface to each other, the 1-6 corner connecting the first surface and the sixth surface to each other, the 2-5 corner connecting the second surface and the fifth surface to each other, and the 2-6 corner connecting the second surface and the sixth surface to each other. However, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both the sides of the capacitance formation portion Ac in the third direction (i.e., width direction) to form the margin portions 114 and 115. In this case, the corner connecting the first surface and the fifth or sixth surface to each other and the corner connecting the second surface and the fifth or sixth surface to each other may not be contracted.

Meanwhile, the first to sixth surfaces of the body 110 may generally be the flat surfaces, and the non-flat regions may be the corners. In addition, the region of the external electrode 331 or 332, disposed on the corner of the body 110 may be the corner portion.

In this regard, the first or second corner portion 331c or 332c may be disposed below the extension line E2 of the second surface, and the first or second corner portion 331c or 332c may be spaced apart from the second surface 2. That is, none of the external electrodes 331 and 332 may be disposed on the second surface to further minimize the volumes of the external electrodes 331 and 332, thereby further increasing the capacitance of the multilayer electronic component 3000 per unit volume. In addition, the first corner portion 331c may be disposed on a portion of the 2-3 corner C2-3 connecting the third surface and the second surface to each other, and the second corner portion 332c may be disposed on a portion of the 2-4 corner C2-4 connecting the fourth surface and the second surface to each other.

The extension line E2 of the second surface may be defined as follows.

The extension line E2 of the second surface may indicate a straight line passing through a point where P2 and the second surface meet each other and a point where P4 and the second surface meet each other when drawing seven straight lines P0, P1, P2, P3, P4, P5, and P6 in the thickness direction to have equal intervals from the third surface to the fourth surface in the length direction in the length-thickness cross section (i.e., L-T cross section) cut in a center of the multilayer electronic component 3000 in the width direction.

Meanwhile, the external electrode 331 or 332 may be made of any material having the electrical conductivity such as the metal, may use the specific material determined in consideration of the electrical characteristic, the structural stability or the like, and may have the multilayer structure.

The external electrode 331 or 332 may be the fired electrode including the conductive metal and glass, or the resin-based electrode including the conductive metal and resin.

In addition, the external electrode 331 or 332 may be made by sequentially forming the fired electrode and the resin-based electrode on the body. In addition, the external electrode 331 or 332 may be formed by transferring a sheet including the conductive metal to the body or by transferring the sheet including the conductive metal to the fired electrode.

The conductive metal included in the external electrode 331 or 332 may use the material having the excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 331 or 332 may include at least one of nickel (Ni) and an alloy of nickel (Ni), thereby further improving its connectivity with the internal electrode 121 or 122 including nickel (Ni).

The insulating layer 351 may be disposed on the first and second connection portions 331*a* and 332*a*.

The first or second connection portion 331*a* or 332*a* may be a portion connected to the internal electrode 121 or 122, and thus be a pathway for the penetration of the plating solution in the plating process or the penetration of the moisture when the multilayer electronic component is actually used. In the present disclosure, the insulating layer 351 may be disposed on the connection portions 331*a* and 332*a*, thereby preventing the penetration of the external moisture or the penetration of the plating solution.

The insulating layer 351 may be in contact with the first and second plating layers 341 and 342. Here, the insulating layer 351 may be in contact with the first and second plating layers 341 and 342 to partially cover the ends thereof, or the first and second plating layers 341 and 342 may be in contact with the insulating layer 351 to partially cover the end thereof.

The insulating layer 353 may be disposed on the first and second connection portions 331*a* and 332*a*, and may cover the second surface and the first and second corner portions 331*c* and 332*c*. In addition, the insulating layer 353 may cover a region where an end of the first or second corner portion 331*c* or 332*c* and the body 110 are in contact with each other to prevent the pathway for the penetration of the moisture, thereby further improving the moisture resistance reliability of the multilayer electronic component.

The insulating layer 351 may be disposed on the second surface and extended to the first and second connection portions 331*a* and 332*a*. In addition, the insulating layer may cover the entire second surface when none of the external electrodes 331 and 332 is disposed on the second surface. Meanwhile, the insulating layer 351 may not be necessarily disposed on the second surface, the insulating layer 351 may not be disposed on the partial or entire second surface, and the insulating layer 351 may be separated into two layers and disposed on each of the first and second connection portions 331*a* and 332*a*. However, even in this case, the insulating layer may cover the entire first and second corner portions 331*c* and 332*c*. The insulating layer may be disposed below the extension line of the second surface when not disposed on the entire second surface. In addition, even when not disposed on the second surface, the insulating layer may be disposed on the first and second connection portions 331*a* and 332*a* and extended to the fifth and sixth surfaces to be one insulating layer.

In another exemplary embodiment, the insulating layer 351 may partially cover the fifth and sixth surfaces to improve the reliability of the multilayer electronic component. Here, portions of the fifth and sixth surfaces, which are not covered by the insulating layer, may be externally exposed.

Further, the insulating layer 351 may entirely cover the fifth and sixth surfaces. In this case, none of the fifth and sixth surfaces may be externally exposed to further improve the moisture resistance reliability.

The insulating layer 351 may serve to prevent the formation of the plating layers 341 and 342 on the external electrodes 331 and 332 on which the insulating layer 351 is disposed, and improve the sealing characteristic to minimize the penetration of the external moisture, plating solution or the like. The component, composition, average thickness and resultant effect of the insulating layer 351 may be the same as those the insulating layer 151, 251, 252 or 253 included in the multilayer electronic component 1000 or 2000 and various embodiments thereof, and descriptions thereof are thus omitted.

The first and second plating layers 341 and 342 may respectively be disposed on the first and second band portions 331*b* and 332*b*. The plating layers 341 and 342 may allow the multilayer electronic component to be more easily mounted on the board, be disposed on the band portions 331*b* and 332*b* to minimize the space in which the multilayer electronic component is mounted, and minimize the penetration of the plating solution to the internal electrode, thereby improving the reliability of the multilayer electronic component. One end of the first and second plating layer 341 or 342 may be in contact with the first surface, and the other end thereof may be in contact with the insulating layer 351.

The plating layer 341 or 342 is not limited to a particular type, may include at least one of copper (Cu), nickel (Ni), tin (Sn), silver (Ag), gold (Au), palladium (Pd) and alloys thereof, or may include a plurality of layers.

As a more specific example of the plating layer 341 or 342, the plating layer 341 or 342 may be a nickel (Ni) plating layer or a tin (Sn) plating layer, and may have the Ni plating layer and the Sn plating layer sequentially formed on the first and second band portion 331*b* or 332*b*.

In another exemplary embodiment, the insulating layer 351 may be in direct contact with the first and second external electrodes 331 and 332, and the first and second external electrodes 331 and 332 may each include the conductive metal and glass. Accordingly, none of the plating layers 341 and 342 may be disposed in a region where the insulating layer 351 is disposed on an outer surface of the first or second external electrode 331 or 332, thereby effectively suppressing the erosion of the external electrode by the plating solution.

In another exemplary embodiment, the insulating layer 351 may be in direct contact with the first and second external electrodes 331 and 332, and the first and second external electrodes 331 and 332 may each include the conductive metal and resin. Accordingly, none of the plating layers 341 and 342 may be disposed in a region where the insulating layer 351 is disposed on the outer surface of the first or second external electrode 331 or 332, thereby effectively suppressing the erosion of the external electrode by the plating solution.

In another exemplary embodiment, the first plating layer 341 may cover an end of the insulating layer 351, disposed on the first external electrode 331, and the second plating layer 342 may cover an end of the insulating layer 351, disposed on the second external electrode 332. Accordingly, it is possible to strengthen a bonding force of the insulating layer 351 and the plating layer 341 or 342, thereby improving the reliability of the multilayer electronic component 3000. In addition, it is possible to first form the insulating layer 351 before forming the plating layer 341 or 342 on the external electrode 331 or 332, thereby more reliably suppressing the penetration of the plating solution in the process of forming the plating layer. As the insulating layer is formed before the plating layer, the plating layer 341 or 342 may cover the end of the insulating layer 351.

In another exemplary embodiment, the insulating layer 351 may cover an end of the first plating layer 341, disposed on the first external electrode 331, and the insulating layer 351 may cover an end of the second plating layer 342, disposed on the second external electrode 332. Accordingly, it is possible to strengthen the bonding force of the insulating layer 351 and the plating layer 341 or 342, thereby improving the reliability of the multilayer electronic component 3000.

In another exemplary embodiment, an end of the first or second plating layer 341 or 342 and an end of the insulating layer 351 may be in contact with each other at their contact point on the first or second external electrode 331 or 332, and the end of the insulating layer and the end of the plating layer may each have a thickness smaller toward the contact point.

Accordingly, it is possible to minimize an area where the first or second plating layer 341 or 342 are in contact with the insulating layer 351 even when an average thickness of the first or second plating layer 341 or 342 and an average thickness of the insulating layer 351 are substantially the same as each other, thus improving the total bonding force of the multilayer electronic component 3000.

In another exemplary embodiment, the end of the first or second plating layer 341 or 342 and the end of the insulating layer 351 may be in contact with each other to form a recess having a concave shape toward the body 110. Accordingly, it is possible to minimize the area where the first or second plating layer 341 or 342 and the insulating layer 351 are in contact with each other, thereby reducing the possibility of occurrence of the delamination, and improving the adhesion force of the multilayer electronic component 3000.

In another exemplary embodiment, $1/20 \leq t3/t2 \leq 1/5$ when t2 indicates an average thickness of the insulating layer, and t3 indicates an average size of the insulating layer in the second direction, measured from a point positioned on an outermost tip in the second direction among the contact points to an outer surface of the first or second external electrode. Accordingly, it is possible to improve the adhesion force of the multilayer electronic component 3000 and the resistance to the penetration of the external moisture.

In another exemplary embodiment, the end of the first or second plating layer 341 or 342 and the end of the insulating layer 351 may be in contact with each other below the extension line of the first surface. In this case, it is possible to prevent or minimize the formation of the solder fillet on the third and fourth surfaces of the multilayer electronic component mounted on the board, thereby reducing the occurrence rate of the short circuit due to the solder between the multilayer electronic components. It is thus possible to further minimize the gap between the multilayer electronic components mounted on the board, thereby significantly improving the mounting density of the multilayer electronic components on the board.

In another exemplary embodiment, the insulating layer 351 may be extended from the first or second connection portion 331a or 332a to a portion of the first or second band portion 331b or 332b. In this case, the end of the first or second plating layer and the end of the insulating layer may be in contact with each other at their contact point on the first or second band portion 331b or 332b. Accordingly, it is possible to prevent the formation of the solder fillet on the connection portion when the multilayer electronic component is mounted on the board, thereby further reducing the occurrence rate of the short circuit due to the solder between the multilayer electronic components. It is thus possible to further minimize the gap between the multilayer electronic components mounted on the board, thereby significantly improving the mounting density of the multilayer electronic components on the board.

In another exemplary embodiment, the first and second plating layers 341 and 342 may respectively be extended to partially cover the first and second connection portions 331a and 332a. H1>H2 when H1 indicates the average size of the internal electrode in the first direction, disposed closest to the first surface 1 among the first and second internal electrodes 121 and 122, and H2 indicates the average size of the first or second plating layer 341 or 342 in the first direction, measured from the extension line of the first surface 1 to an end of the plating layer disposed on the first or second connection portion 331a or 332a. Accordingly, it is possible to suppress the plating solution from penetrating into the internal electrode during the plating process, thereby allowing the multilayer electronic component to have the improved reliability.

In another exemplary embodiment, H1<H2 when H1 indicates the average size of the region in the first direction, measured from the first surface 1 to the internal electrode disposed closest to the first surface among the first and second internal electrodes 121 and 122, and H2 indicates the average size of the plating layer 341 or 342 in the first direction, measured from the extension line of the first surface to the end of the plating layer 341 or 342 disposed on the first or second connection portion 331a or 332a. Accordingly, it is possible to improve the adhesion force by increasing the area where the multilayer electronic component is in contact with the solder when the multilayer electronic component is mounted on the board. H2<T/2 when T indicates the average size of the body 110 in the first direction. That is, H1<H2<T/2. The reason is that the moisture resistance reliability improved by the insulating layer may be reduced when H2 is T/2 or more.

In another exemplary embodiment, the first and second plating layers 341 and 342 may be disposed below the extension line of the first surface. It is thus possible to minimize the height of the solder when the multilayer electronic component is mounted on the board and to minimize the space in which the multilayer electronic component is mounted. In addition, the insulating layer 351 may be extended below the extension line of the first surface to be in contact with the first and second plating layers 341 and 342.

In another exemplary embodiment, $0.2 \leq B1/L \leq 0.4$ and $0.2 \leq B2/L \leq 0.4$ when L indicates the average size of the body in the second direction, B1 indicates an average size of the first band portion in the second direction, measured from the extension line of the third surface to an end of the band portion, and B2 indicates an average size of the second band portion in the second direction, measured from the extension line of the fourth surface to an end of the band portion.

When B1/L and B2/L are less than 0.2, it may be difficult to secure the sufficient adhesion force. On the other hand, when B2/L is greater than 0.4, the leakage current may occur between the first band portion 331b and the second band portion 332b under the high-voltage current, and the first band portion 331b and the second band portion 332b may be electrically connected with each other due to the plating spread or the like during the plating process.

In another exemplary embodiment, the multilayer electronic component may further include an additional insulating layer disposed on the first surface and between the first band portion 331b and the second band portion 332b.

Accordingly, it is possible to prevent the leakage current or the like which may occur between the first band electrode 331b and the second band electrode 332b under the high-voltage current.

The additional insulating layer is not limited to a particular type. For example, the additional insulating layer may include the glass material including silicon (Si) like the insulating layer 351. However, it is not necessary to limit the additional insulating layer and the insulating layer 351 to the same material, and the two insulating layers may be made of materials different from each other. For example, the additional insulating layer may include one or more selected from epoxy resin, acrylic resin, ethyl cellulose or the like. In addition, the additional insulating layer 161 may include one or more selected from titanium based oxide ($TiO_2$), $BaTiO_3$, silicon dioxide ($SiO_2$), aluminum oxide ($Al_2O_3$), barium oxide (BaO) or the like as the additive in addition to the polymer resin. The additional insulating layer may thus have the improved bonding force with the body or the external electrode.

In another exemplary embodiment, B3<B1 and B4<B2 when B1 indicates an average size of the first band portion in the second direction, measured from the extension line of the third surface to an end of the band portion, and B2 indicates an average size of the second band portion in the second direction, measured from the extension line of the fourth surface to an end of the band portion. The average length B1 of the first band portion 331b may be longer than the average length B3 of the first corner portion 331c, and the average length of the second band portion 332b may be longer than the average length B4 of the second corner portion 332c. Accordingly, it is possible to improve the adhesion force by increasing the area where the multilayer electronic component is in contact with the solder when the multilayer electronic component is mounted on the board.

In more detail, B3<B1 and B4<B2 when B1 indicates the average size of the first band portion 331b in the second direction, measured from the extension line of the third surface 3 to the end of the band portion, B2 indicates the average size of the first band portion 332b in the second direction, measured from the extension line of the fourth surface 4 to the end of the band portion, B3 indicates the average size of the first corner portion 331c in the second direction, measured from the extension line of the third surface 3 to an end of the corner portion, and B4 indicates the average size of the second corner portion 332c in the second direction, measured from the extension line of the fourth surface 4 to an end of the corner portion.

In another exemplary embodiment, an average thickness of the first or second plating layer 341 or 342 may be smaller than the average thickness of the insulating layer 351.

The insulating layer 351 may serve to prevent the penetration of the external moisture or plating solution. However, the insulating layer 351 may have weak connectivity with the plating layer 341 or 342, which may cause delamination of the plating layer. When the plating layer is delaminated, the adhesion force of the multilayer electronic component with the board 180 may be reduced. Here, the delamination of the plating layer may indicate that the plating layer is partially dropped or physically separated from the external electrode 331 or 332. The connectivity between the plating layer and the insulating layer may be weak. In this case, it may increase the possibility that a gap between interfaces of the insulating layer and the plating layer is widened or that a foreign material may infiltrate, which may allow the plating layer to be vulnerable to an external impact and then delaminated.

According to another exemplary embodiment of the present disclosure, the plating layer may have the average thickness made smaller than the average thickness of the insulating layer, thereby reducing the area where the plating layer and the insulating layer are in contact with each other. It is thus possible to suppress the occurrence of the delamination, thereby improving the adhesion force of the multilayer electronic component 3000 with the board.

The multilayer electronic component 3000 is not limited to a particular size.

However, in order for the multilayer electronic component to have the smaller size and simultaneously have the higher capacitance, it is necessary to increase the number of stacks by allowing the dielectric layer and the internal electrode to each have the smaller thickness. The multilayer electronic component 3000 having a size of 1005 (i.e., length×width of 1.0 mm×0.5 mm) or less may thus have the more remarkably improved reliability and the capacitance per unit volume according to the present disclosure.

Therefore, in consideration of the manufacturing error, the size of the external electrode and the like, when having the length of 1.1 mm or less and the width of 0.55 mm or less, the multilayer electronic component 3000 may have the more remarkably improved reliability according to the present disclosure. Here, the length of the multilayer electronic component 3000 may indicate the maximum size of the multilayer electronic component 30070 in the second direction, and the width of the multilayer electronic component 3000 may indicate the maximum size of the multilayer electronic component 3000 in the third direction.

As set forth above, the present disclosure may provide the multilayer electronic component having the higher reliability and the improved capacitance per unit volume by including the insulating layer disposed on the connection portion of the external electrode and the plating layer disposed on the band portion of the external electrode.

The present disclosure may also provide the multilayer electronic component which may be mounted in the minimum space.

The present disclosure may also provide the multilayer electronic component which may have the improved bonding force by minimizing the area in which the insulating layer and the plating layer are in contact with each other, and the improved adhesion force when mounted on the board.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface, and a first band portion extending from the first connection portion onto a portion of the first surface;
a second external electrode including a second connection portion disposed on the fourth surface, and a second band portion extending from the second connection portion onto a portion of the first surface;
a first insulating layer disposed on the first connection portion;
a second insulating layer disposed on the second connection portion;
a first plating layer disposed on the first band portion; and
a second plating layer disposed on the second band portion,
wherein an end of the first insulating layer and an end of the first plating layer are in contact with each other at a first contact point on the first external electrode, and an end of the second insulating layer and an end of the second plating layer are in contact with each other at a second contact point on the second external electrode,
t3/t2≤⅕ when 't2' indicates an average thickness of the first or second insulating layer, and 't3' indicates an average size of the first or second insulating layer in the second direction, measured from a point positioned on an outermost tip in the second direction among contact points between the end of the first or second plating layer and the end of the first or second insulating layer to an outer surface of the first or second external electrode, and
H1<H2 in which 'H1' indicates an average size of a region in the first direction, measured from the first surface to an internal electrode disposed closest to the first surface among the first and second internal electrodes, and 'H2' indicates an average size of the first or second plating layer in the first direction, measured from an extension line of the first surface to the end of the first or second plating layer disposed on the first or second connection portion.

2. The multilayer electronic component of claim 1,
wherein a thickness of the end of the first plating layer and a thickness of the end of the first insulating layer each decrease toward the first contact point, and
a thickness of the end of the second plating layer and a thickness of the end of the second insulating layer each decrease toward the second contact point.

3. The multilayer electronic component of claim 1,
wherein a portion in which the end of the first plating layer and the end of the first insulating layer are in contact with each other has a recess having a concave shape toward the body, and
a portion in which the end of the second plating layer and the end of the second insulating layer are in contact with each other has a recess having a concave shape toward the body.

4. The multilayer electronic component of claim 1, wherein ¹⁄₂₀≤t3/t2.

5. The multilayer electronic component of claim 1,
wherein the end of the first plating layer is disposed to cover a portion of the end of the first insulating layer, and the end of the second plating layer is disposed to cover a portion of the end of the second insulating layer.

6. The multilayer electronic component of claim 1,
wherein the end of the first insulating layer is disposed to cover a portion of the end of the first plating layer, and the end of the second insulating layer is disposed to cover a portion of the end of the second plating layer.

7. The multilayer electronic component of claim 1,
wherein H2<T/2 in which 'T' indicates an average size of the body in the first direction.

8. The multilayer electronic component of claim 1,
wherein 0.2≤B1/L≤0.4 and 0.2≤B2/L≤0.4 in which 'L' indicates an average size of the body in the second direction, 'B1' indicates an average size of the first band portion in the second direction, measured from an extension line of the third surface to an end of the first band portion, and 'B2' indicates an average size of the second band portion in the second direction, measured from an extension line of the fourth surface to an end of the second band portion.

9. The multilayer electronic component of claim 1,
further comprising an additional insulating layer disposed on the first surface and between the first band portion and the second band portion.

10. The multilayer electronic component of claim 1,
wherein the dielectric layer has an average thickness of 0.35 μm or less.

11. The multilayer electronic component of claim 1,
wherein the first or second internal electrode has an average thickness of 0.35 μm or less.

12. The multilayer electronic component of claim 1,
wherein the body further includes:
a capacitance formation portion including the first and second internal electrodes alternately disposed while having the dielectric layer interposed therebetween, and
a cover portion disposed on each of two surfaces of the capacitance formation portion in the first direction,
wherein the cover portion has an average size of 15 μm or less in the first direction.

13. The multilayer electronic component of claim 1,
wherein the first or second plating layer has an average thickness smaller than the average thickness of the first or second insulating layer.

14. The multilayer electronic component of claim 1,
wherein the first external electrode further includes a first side band portion extending from the first connection portion to portions of the fifth and sixth surfaces and the second external electrode further includes a second side band portion extending from the second connection portion to portions of the fifth and sixth surfaces, and
the sizes of the first and second side band portions in the second direction gradually increase toward the first surface.

15. The multilayer electronic component of claim 1,
wherein the first and second external electrodes are spaced apart from the fifth and sixth surfaces.

16. The multilayer electronic component of claim 1,
wherein the first and second external electrodes are spaced apart from the second surfaces.

17. The multilayer electronic component of claim 1,
wherein the first and second insulating layers are disposed to extend from the first and second connection portions onto the second surface.

18. The multilayer electronic component of claim 1,
wherein the first and second insulating layers are disposed to extend from the first and second connection portions onto the fifth and sixth surface.

19. The multilayer electronic component of claim 1,
wherein the first external electrode further includes a third band portion extending from the first connection portion to a portion of the second surface, and the second external electrode further includes a fourth band portion extending from the second connection portion to a portion of the second surface.

20. The multilayer electronic component of claim 1,
wherein the body includes a 1-3 corner connecting the first surface to the third surface, a 1-4 corner connecting the first surface to the fourth surface, a 2-3 corner connecting the second surface to the third surface, and a 2-4 corner connecting the second surface to the fourth surface,
wherein the 1-3 corner and the 2-3 corner have a form reducing in a direction of a center of the body taken in the first direction toward the third surface, and the 1-4 corner and the 2-4 corner have a form reducing in a direction of the center of the body taken in the first direction toward the fourth surface, and
wherein the first external electrode includes a corner portion disposed on the 1-3 corner and a corner portion extending from the first connection portion to the 2-3 corner, and the second external electrode includes a corner portion disposed on the 1-4 corner and a corner portion extending from the second connection portion to the 2-4 corner.

21. The multilayer electronic component of claim 20,
wherein B3≤G1 and B4≤G2 are satisfied, in which 'B3' is an average distance in the second direction from an extension line of the third surface to an end of the first corner portion, 'B4' is an average distance in the second direction from an extension line of the fourth surface to an end of the second corner portion, 'G1' is an average size of a region in which the third surface and the second internal electrode are spaced apart from each other, taken in the second direction, and 'G2' is an average size of a region in which the fourth surface and the first internal electrode are spaced apart from each other, taken in the second direction.

22. The multilayer electronic component of claim 1,
wherein the first external electrode includes a first connection electrode disposed on the third surface and a first band electrode disposed on the first surface and connected to the first connection electrode, and
wherein the second external electrode includes a second connection electrode disposed on the fourth surface and a second band electrode disposed on the first surface and connected to the second connection electrode.

23. The multilayer electronic component of claim 22,
wherein the first and second connection electrodes are spaced apart from the fifth and sixth surfaces.

24. The multilayer electronic component of claim 22
wherein the first and second connection electrodes are spaced apart from the second surfaces.

25. The multilayer electronic component of claim 22,
wherein the first external electrode further includes a third band electrode disposed on the second surface and connected to the first connection electrode, and the second external electrode further includes a fourth band electrode disposed on the second surface and connected to the second connection electrode.

26. The multilayer electronic component of claim 22,
wherein the first connection electrode and the second connection electrode include the same metal as a metal included in the first and second internal electrodes.

27. The multilayer electronic component of claim 22,
wherein the first connection electrode and the second connection electrode include fired electrodes including a conductive metal and glass.

28. The multilayer electronic component of claim 22,
wherein the first band electrode and the second band electrode are fired electrodes including a conductive metal and glass.

29. The multilayer electronic component of claim 22,
wherein the first connection electrode and the second connection electrode include plating layers.

30. The multilayer electronic component of claim 22,
wherein the first band electrode and the second band electrode include plating layers.

31. A multilayer electronic component comprising:
a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface, and a first band portion extending from the first connection portion onto a portion of the first surface;
a second external electrode including a second connection portion disposed on the fourth surface, and a second band portion extending from the second connection portion onto a portion of the first surface;
a first insulating layer disposed on the first connection portion;
a second insulating layer disposed on the second connection portion;
a first plating layer disposed on the first band portion; and
a second plating layer disposed on the second band portion,
wherein an end of the first insulating layer and an end of the first plating layer are in contact with each other at a first contact point on the first external electrode, and an end of the second insulating layer and an end of the second plating layer are in contact with each other at a second contact point on the second external electrode,
t3/t2≤⅕ when 't2' indicates an average thickness of the first or second insulating layer, and 't3' indicates an average size of the first or second insulating layer in the second direction, measured from a point positioned on an outermost tip in the second direction among contact points between the end of the first or second plating layer and the end of the first or second insulating layer to an outer surface of the first or second external electrode, and
the first and second insulating layer are not disposed on the second, fifth and sixth surfaces.

* * * * *